(12) United States Patent
Kim

(10) Patent No.: US 9,727,661 B2
(45) Date of Patent: Aug. 8, 2017

(54) DISPLAY DEVICE ACCESSING BROADCAST RECEIVER VIA WEB BROWSER AND METHOD OF CONTROLLING THEREFOR

(71) Applicant: LG ELECTRONICS INC., Seoul (KR)

(72) Inventor: Jeongsim Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 266 days.

(21) Appl. No.: 14/597,771

(22) Filed: Jan. 15, 2015

(65) Prior Publication Data

US 2015/0370915 A1 Dec. 24, 2015

(30) Foreign Application Priority Data

Jun. 20, 2014 (KR) .................. 10-2014-0075857
Jun. 20, 2014 (KR) .................. 10-2014-0075858

(51) Int. Cl.
*H04L 12/56* (2006.01)
*H04L 12/28* (2006.01)
*H04L 29/12* (2006.01)
*G06F 17/30* (2006.01)
*H04L 29/08* (2006.01)
*H04W 4/04* (2009.01)
*H04W 52/02* (2009.01)

(52) U.S. Cl.
CPC .. *G06F 17/30905* (2013.01); *G06F 17/30896* (2013.01); *H04L 61/103* (2013.01);
(Continued)

(58) Field of Classification Search
CPC ........... H04L 61/1511; H04L 29/12066; H04L 67/02; H04L 61/2007; H04L 61/2076;
(Continued)

(56) References Cited

U.S. PATENT DOCUMENTS 7,047,313 B1 * 5/2006 Broerman ............... H04L 29/06
709/238
7,987,228 B2 * 7/2011 McKeown ............... H04L 12/24
379/1.01
(Continued)

FOREIGN PATENT DOCUMENTS

EP 2 487 925 A2 8/2012

OTHER PUBLICATIONS

Anonymous, "VPNUK DNS Smart DNS with Whitelist Setup Instructions Smart TV", VPNUK Limited 2014, URL: https://vpnuk.net/setup-dns-smart-tv.html, Apr. 6, 2014, pp. 5-11 (14 pages total).

*Primary Examiner* — Wutchung Chu
(74) *Attorney, Agent, or Firm* — Birch, Stewart, Kolasch & Birch, LLP

(57) ABSTRACT

A display device accessing a broadcast receiver via a web browser according to one embodiment of the present invention includes a user interface unit configured to receive an input signal from a user, a broadcast service module configured to receive a broadcast signal, a communication module configured to perform data communication with a server and the broadcast receiver, a display module configured to display at least one or more contents and a controller, the controller configured to access a web address corresponding to the broadcast receiver via the web browser, the controller configured to receive an IP (internet protocol) address information mapped to the web address from a DNS (domain name server), the controller configured to access the broadcast receiver using the received IP address, the controller configured to receive data of content displayed on the broadcast receiver and control the data to be displayed on a screen of the display device.

16 Claims, 56 Drawing Sheets

(52) U.S. Cl.
CPC .......... *H04L 61/1511* (2013.01); *H04L 67/02* (2013.01); *H04L 67/025* (2013.01); *H04W 4/046* (2013.01); *H04W 52/0203* (2013.01); *H04L 61/2015* (2013.01); *H04L 61/6022* (2013.01); *Y02B 60/50* (2013.01)

(58) Field of Classification Search
CPC ............. H04L 61/2015; H04L 61/6009; H04L 61/103; H04L 61/15; H04L 61/1552; H04L 61/301; H04L 61/3025; H04L 29/12047; H04L 29/12
USPC ...................................... 370/395.54; 725/111
See application file for complete search history.

(56) References Cited

U.S. PATENT DOCUMENTS

| | | | | |
|---|---|---|---|---|
| 8,938,768 | B2* | 1/2015 | Kim | H04N 21/4227 725/109 |
| 9,137,281 | B2* | 9/2015 | Warrick | H04L 41/0893 |
| 2002/0116484 | A1* | 8/2002 | Podracky | H04L 41/069 709/223 |
| 2003/0229900 | A1* | 12/2003 | Reisman | G06F 17/30873 725/87 |
| 2006/0031921 | A1* | 2/2006 | Danforth | H04L 63/10 726/1 |
| 2006/0075269 | A1* | 4/2006 | Liong | G06F 1/3209 713/300 |
| 2009/0217359 | A1* | 8/2009 | Kikkawa | H04L 63/08 726/5 |
| 2010/0081375 | A1* | 4/2010 | Rosenblatt | G08C 17/02 455/41.1 |
| 2011/0209177 | A1* | 8/2011 | Sela | H04N 7/17318 725/39 |
| 2012/0054616 | A1* | 3/2012 | Mittal | G06F 17/30899 715/722 |
| 2013/0263170 | A1* | 10/2013 | Klein, III | H04N 21/478 725/23 |
| 2013/0318173 | A1* | 11/2013 | Kaplinger | H04L 61/301 709/206 |
| 2014/0150048 | A1 | 5/2014 | Oh et al. | |
| 2014/0244429 | A1* | 8/2014 | Clayton | G06Q 30/0631 705/26.7 |

* cited by examiner

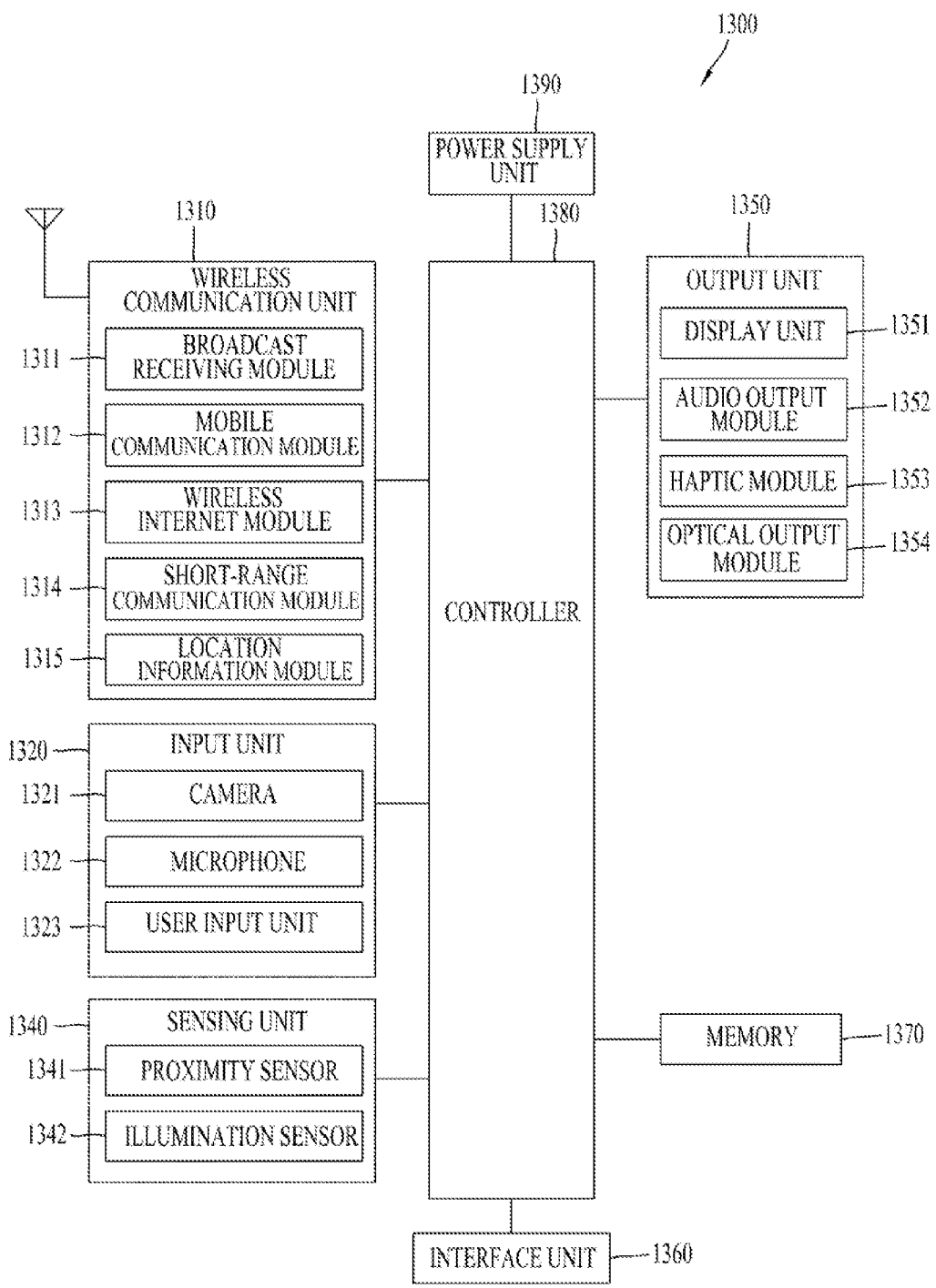

1

DISPLAY DEVICE ACCESSING BROADCAST RECEIVER VIA WEB BROWSER AND METHOD OF CONTROLLING THEREFOR

This application claims the benefit of the Korean Patent Application Korean Patent Application Nos. 10-2014-0075857 and 10-2014-0075858 filed on Jun. 20, 2014, respectively, which is hereby incorporated by reference as if fully set forth herein.

BACKGROUND OF THE INVENTION

Field of the Invention

The present invention relates to a technology applicable to various display devices, and more particularly, to a display device accessing a broadcast receiver using a web browser and web address information. In particular, the present invention relates to a display device configured to implement such various technological effects as a remote access, a remote control and the like using web address information assigned to each broadcast receiver and a method of controlling therefor.

Discussion of the Related Art

Generally, a broadcast receiver and a display device can receive a broadcast signal via a broadcast service module including at least one or more tuners. In addition, the display device can receive various data inputs from a user via a user interface. The display device can perform a data communication with a server including a DNS (domain name server) using various wired/wireless communication modules. In addition, the display device can include a volatile memory and a nonvolatile memory. For instance, the display device may correspond to a cellular phone, a smartphone, a computer, a tablet PC, a notebook, a netbook, a TV (television), other broadcast receiving devices or the like.

SUMMARY OF THE INVENTION

Accordingly, one embodiment of the present invention is directed to an apparatus and method thereof that substantially obviate one or more problems due to limitations and disadvantages of the related art.

An aspect by one embodiment of the present invention is to increase user convenience by accessing a broadcast receiver using a web browser.

Another aspect by a different embodiment of the present invention is to enable a user to easily and promptly access each application using a web browser by assigning web addresses according to a plurality of applications included in a broadcast receiver.

Another aspect by a further different embodiment of the present invention is to concretely define a solution that enables a user to control a broadcast receiver via a display device by accessing the broadcast receiver using a web browser and directly communicating with the broadcasting receiver.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device accessing a broadcast receiver via a web browser according to one embodiment of the present invention includes a user interface unit configured to receive an input signal from a user, a broadcast service module configured to receive a broadcast signal, a communication module configured to perform data communication with a server and the broadcast receiver, a display module configured to display at least one or more contents and a controller, the controller configured to access a web address corresponding to the broadcast receiver via the web browser, the controller configured to receive an IP (internet protocol) address information mapped to the web address from a DNS (domain name server), the controller configured to access the broadcast receiver using the received IP address, the controller configured to receive data of content displayed on the broadcast receiver and control the data to be displayed on a screen of the display device.

To further achieve these objects and other advantages and in accordance with the purpose of the invention, as embodied and broadly described herein, a method of controlling a display device accessing a broadcast receiver via a web browser includes the steps of accessing a web address corresponding to the broadcast receiver via the web browser, receiving IP (internet protocol) address information mapped to the web address from a DNS (domain name server), accessing the broadcast receiver using the received IP address and displaying data of content displayed on the broadcast receiver on a screen of the display device by receiving the data of the content from the broadcast receiver.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings:

FIG. 13a is a block diagram of a mobile terminal in accordance with the present invention.

DETAILED DESCRIPTION OF THE INVENTION

Description will now be given in detail according to embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and the embodiments presented herein are not limited by the accompanying drawings. As such, the present invention should be construed to extend to any alterations, equivalents and substitutes in addition to those which are particularly set out in the accompanying drawings.

Figure 1:
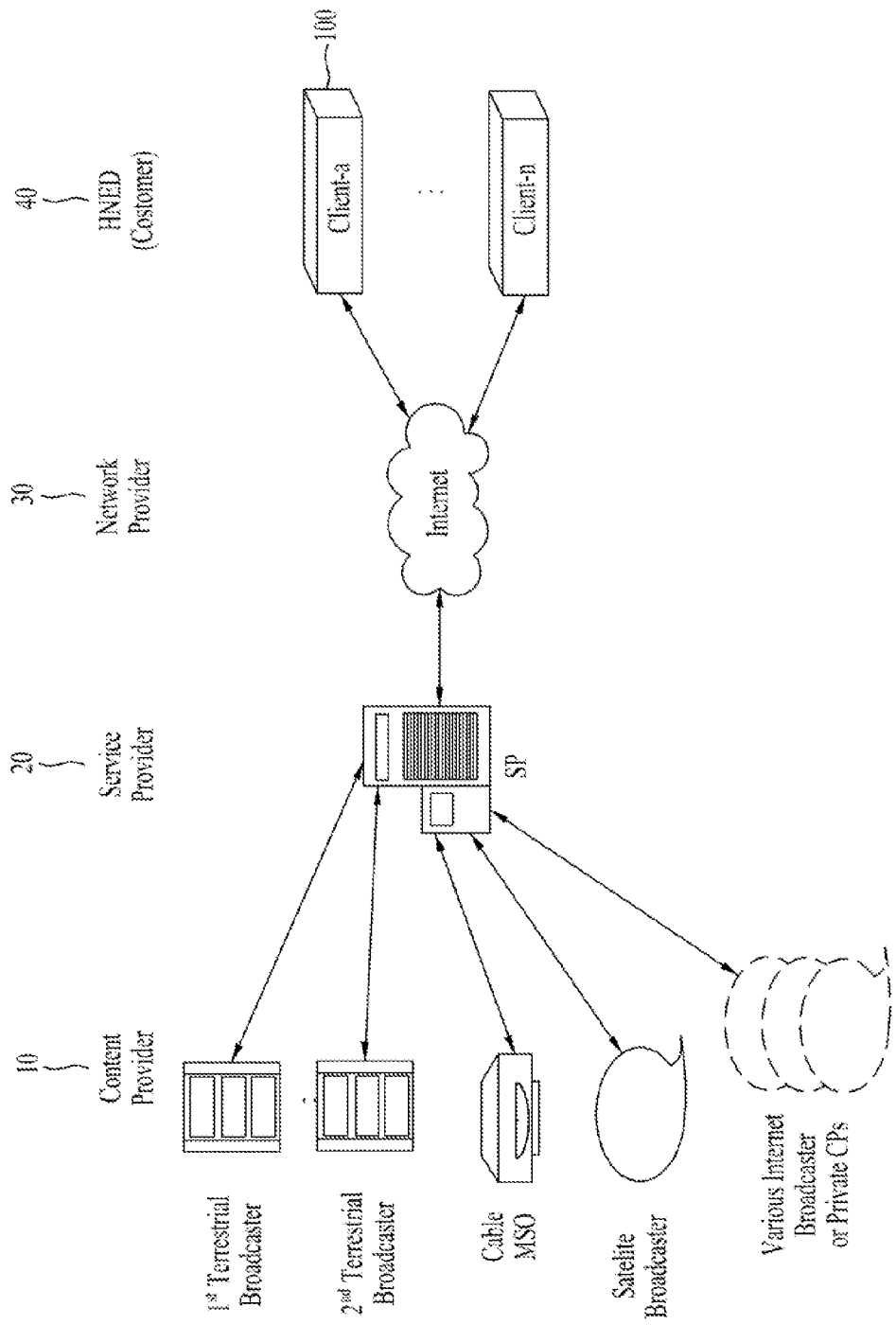
FIG. 1 is a schematic diagram illustrating a service system including a digital device according to one embodiment of the present invention.

In the following description, various embodiments according to an embodiment of the present invention are explained with reference to attached drawings. FIG. 1 illustrates a broadcast system including a digital receiver according to an embodiment of the present invention. Referring to FIG. 1, examples of a broadcast system comprising a digital receiver may include a content provider (CP) 10, a service provider (SP) 20, a network provider (NP) 30, and a home network end user (HNED) (Customer) 40. The HNED 40 includes a client 100, that is, a digital receiver.

Each of the CP 10, SP 20 and NP 30, or a combination thereof may be referred to as a server. The HNED 40 can also function as a server. The term 'server' means an entity that transmits data to another entity in a digital broadcast environment. Considering a server-client concept, the server can be regarded as an absolute concept and a relative concept. For example, one entity can be a server in a relationship with a first entity and can be a client in a relationship with a second entity.

The CP 10 is an entity that produces content. Referring to FIG. 1, the CP 10 can include a first or second terrestrial broadcaster, a cable system operator (SO), a multiple system operator (MSO), a satellite broadcaster, various Internet broadcasters, private content providers (CPs), etc. The content can include applications as well as broadcast content.

The SP 20 packetizes content provided by the CP 10. Referring to FIG. 1, the SP 20 packetizes content provided by the CP 10 into one or more services available for users. The SP 20 can provide services to the client 100 in a uni-cast or multi-cast manner. The CP 10 and the SP 20 can be configured in the form of one entity. For example, the CP 10 can function as the SP 20 by producing content and directly packetizing the produced content into services, and vice versa.

The NP 30 can provide a network environment for data exchange between the server 10 and/or 20 and the client 100. The NP 30 supports wired/wireless communication protocols and constructs environments therefor. In addition, the NP 30 can provide a cloud environment. The client 100 can construct a home network and transmit/receive data. The server can use and request a content protection means such as conditional access. In this instance, the client 100 can use a means such as a cable card or downloadable CAS (DCAS), which corresponds to the content protection means of the server.

In addition, the client 100 can use an interactive service through a network. In this instance, the client 100 can directly serve as the CP 10 and/or the SP 20 in a relationship with another client or indirectly function as a server of the other client.

Figure 2:
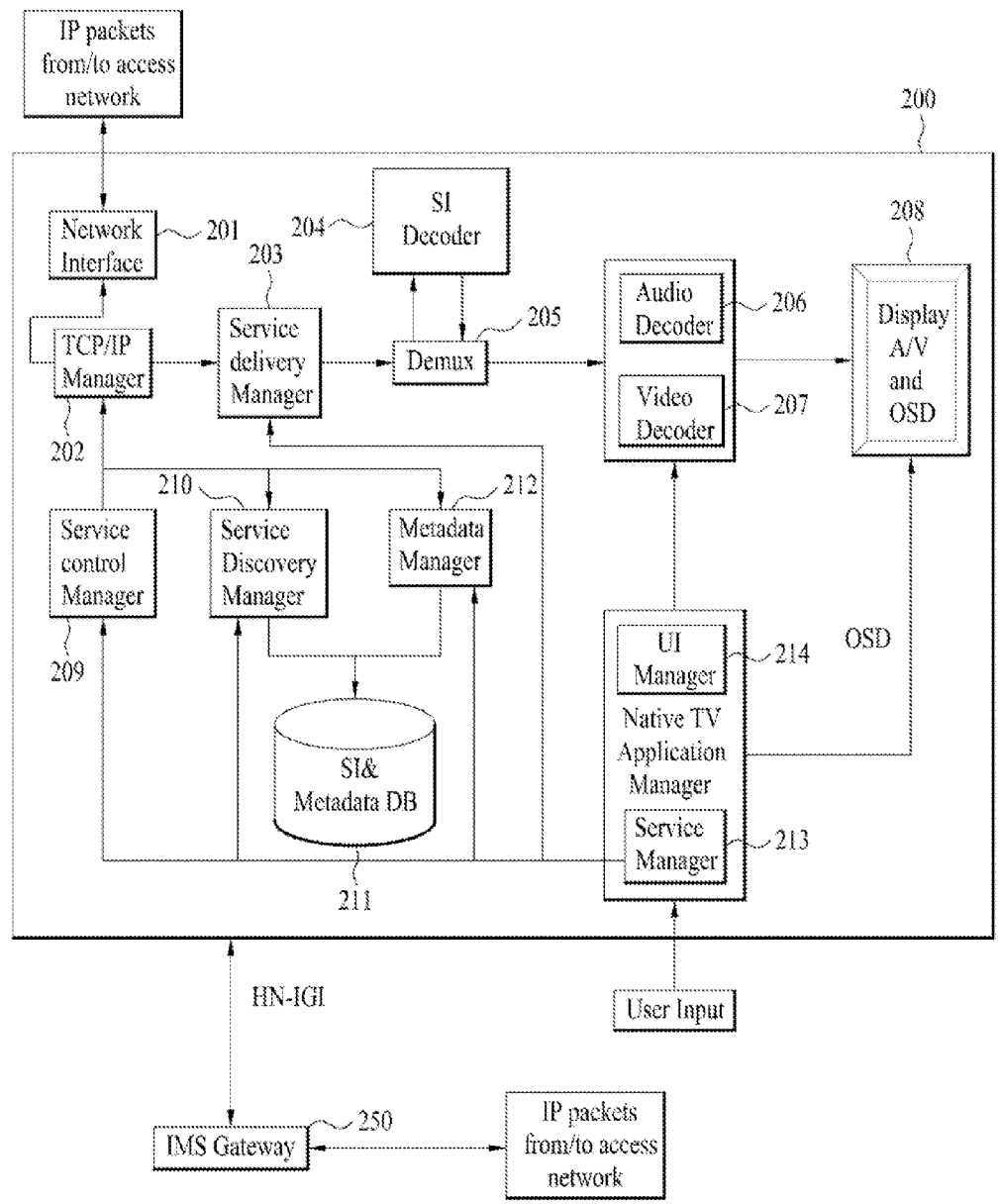
FIG. 2 is a block diagram showing a digital device according to one embodiment of the present invention.

FIG. 2 is a schematic diagram of a digital receiver 200 according to an embodiment of the present invention. The digital receiver 200 may correspond to the client 100 shown in FIG. 1. The digital receiver 200 may include a network interface 201, a TCP/IP manager 202, a service delivery manager 203, an SI (System Information, Service Information or Signaling Information) decoder 204, a demultiplexer 205, an audio decoder 206, a video decoder 207, a display A/V and OSD (On Screen Display) module 208, a service control manager 209, a service discovery manager 210, a SI & metadata database (DB) 211, a metadata manager 212, an application manager, etc.

The network interface 201 may receive or transmit IP packets including service data through a network. In other words, the network interface 201 may receive IP packets including at least one of text data, image data, audio data, and video data, used for SNS, as well as services and applications from a server connected thereto through a network. The TCP/IP manager 202 may involve delivery of IP packets transmitted to the digital receiver 200 and IP packets transmitted from the digital receiver 200, that is, packet delivery between a source and a destination. The TCP/IP manager 202 may classify received packets according to an appropriate protocol and output the classified packets to the service delivery manager 205, the service discovery manager 210, the service control manager 209, and the metadata manager 212.

The service delivery manager 203 may control classification and processing of service data. The service delivery manager 203 may control real-time streaming data, for example, using real-time protocol/real-time control protocol (RTP/RTCP). In other words, the service delivery manager 203 may parse a real-time streaming data packet, transmitted based on the RTP, according to the RTP and transmits the parsed data packet to the demultiplexer 205 or store the parsed data packet in the SI & metadata DB 211 under the control of the service manager 213. The service delivery manager 203 can feed back network reception information to the server based on the RTP.

The demultiplexer 205 may demultiplex audio data, video data, SI from a received packet through packet identifier (PID) filtering and transmit the demultiplexed data to corresponding processors, that is, the audio/video decoder 206/207 and the SI decoder 204. The SI decoder 204 may parse and/or decode SI data such as program specific information (PSI), program and system information protocol (PSIP), digital video broadcast-service information (DVB-SI), etc.

The SI decoder 204 may store the parsed and/or decoded SI data in the SI & metadata DB 211. The SI data stored in the SI & metadata DB 211 can be read or extracted and used by a component which requires the SI data. EPG data can also be read from the SI & metadata DB 211. This will be described below in detail. The audio decoder 206 and the video decoder 207 respectively may decode audio data and video data, which are demultiplexed by the demultiplexer 205. The decoded audio data and video data may be provided to the user through the display unit 208.

The application manager may include a service manager 213 and a user interface (UI) manager 214, administrate the overall state of the digital receiver 200, provides a UI, and manage other mangers. The UI manager 214 can receive a key input from the user and provide a graphical user interface (GUI) related to a receiver operation corresponding to the key input through OSD. The service manager 213 may control and manage service-related managers such as the service delivery manager 203, the service discovery manager 210, the service control manager 209, and the metadata manager 212.

The service manager 213 may configure a channel map and enable channel control at the request of the user based on the channel map. The service manager 213 may receive service information corresponding to channel from the SI decoder 204 and set audio/video PID of a selected channel to the demultiplexer 205 so as to control the demultiplexing procedure of the demultiplexer 205.

The application manager can configure an OSD image or control configuration of the OSD image to provide a window for SNS on a predetermined region of the screen when the user requests SNS. The application manager can configure the OSD image or control the configuration of OSD image such that the SNS window can be determined and provided at the request of the user in consideration of other services, for example, a broadcast service. In other words, when the digital receiver 200 may provide a service (for example, SNS) through an image on the screen, the digital receiver 200 may configure the image such that it can appropriately cope with requests in consideration of relationship with other services, priority, etc.

The application manager can receive data for SNS from a related external server such as an SNS providing server or a manufacturer-provided server and store the received data in a memory such that the data is used to configure OSD for providing SNS at the request of the user and SNS may be provided through a predetermined area of the screen. Furthermore, the digital receiver 200 can store data, related with a service and input by the user during the service, in the memory in a similar manner such that the data is used to configure the service and, if required, process the data into a form required for another digital receiver and transmit the processed data to the other digital receiver or a related service server.

In addition, the application manager, the controller or the digital receiver can control information or an action corresponding to a request of the user to be executed when the user makes the request while using the SNS. For example, when the user selects input data of another user or a region corresponding to the input data while using the SNS, the application manager, the controller or the digital receiver may control the first process and/or the second process for handling the selected data or region to be performed and control the first result and/or the second result to be output in an appropriate form. The first result and/or the second result can include information, an action, a related UI, etc. and be configured in various forms such as text, an image, audio/video data, etc. The first result and/or the second result can be manually or automatically provided and performed by the digital receiver.

When the user moves the first result (e.g. image data) to a broadcast program or broadcast service output area through drag & drop, the digital receiver can perform the second process (e.g., search process) on data relating to the first result using an electronic program guide (EPG) or electronic service guide (ESG) (referred to as 'broadcast guide' hereinafter) (i.e., a search engine) to provide a second result. Here, the second result can be provided in a form similar to the broadcast guide used as a search engine or provided as a separately configured UI. When the second result is provided in the form of the broadcast guide, other data can be provided with the second result. In this instance, the second result can be configured such that it is distinguished from other data so as to allow the user to easily recognize the second data. To discriminate the second result from other data, the second result can be highlighted, hatched, and provided in 3-dimensional (3D) form.

In the execution of the second process, the digital receiver can automatically determine the type of the second process and whether or not to perform the second process based on a position variation of the first result. In this instance, coordinate information of the screen can be used for determining whether the position of the first result is changed or for information on a changed position between the second process and the first result. For example, when a service and/or OSD may be displayed on the screen, the digital receiver can determine and store coordinate information about the displayed service and/or OSD. Accordingly, the digital receiver can be aware of coordinate information about a service and data being provided to the screen in advance and thus can recognize a variation in the position (information) of the first result based on the coordinate information and perform the second process based on the position of the first result.

The service discovery manager 210 may provide information required to select a service provider that provides a service. Upon receipt of a signal for selecting a channel from the service manager 213, the service discovery manager 210 discovers a service based on the received signal. The service control manager 209 may select and control a service. For example, the service control manager 209 may perform service selection and control using IGMP (Internet Group Management Protocol) or real time streaming protocol (RTSP) when the user selects a live broadcast service and using RTSP when the user selects a video on demand (VOD) service.

The schemes or protocols described in the specification are exemplified in order to aid in understanding of the present invention for convenience of explanations and the scope of the present invention is not limited thereto. Accordingly, the schemes or protocols can be determined in consideration of conditions different from the exemplified ones and other schemes or protocols can be used.

The metadata manager 212 may manage metadata regarding services and store metadata in the SI & metadata DB 211. The SI & metadata DB 211 may store SI data decoded by the SI decoder 204, metadata managed by the metadata manager 212, and information required to select a service provider, which is provided by the service discovery manager 210. In addition, the SI & metadata DB 211 can store system set-up data. An IMS (IP Multimedia Subsystem) gateway 250 may include functions required to access an IMS based IPTV services.

Figure 3:
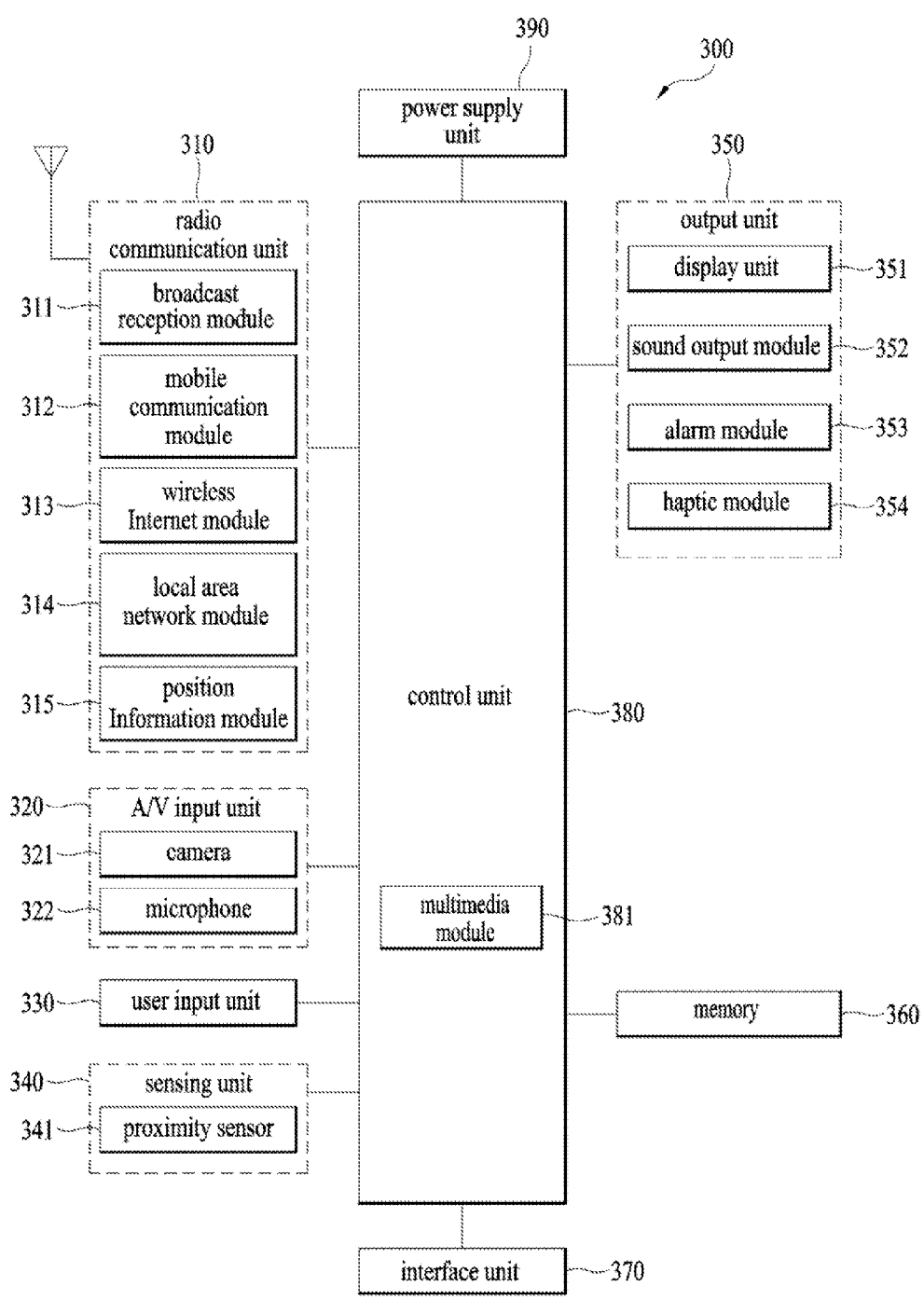
FIG. 3 is a block diagram showing the configuration of a digital device according to another embodiment of the present invention.

FIG. 3 is a block diagram of a mobile terminal 300 in accordance with an embodiment of the present invention. With reference to FIG. 3, the mobile terminal 300 includes a wireless communication unit 310, an A/V (audio/video) input unit 320, a user input unit 330, a sensing unit 340, an output unit 350, a memory 360, an interface unit 370, a controller 380, and a power supply unit 390. FIG. 3 shows the mobile terminal 300 having various components, but implementing all of the illustrated components is not a requirement. More or fewer components may be implemented according to various embodiments.

The wireless communication unit 310 typically includes one or more components which permit wireless communication between the mobile terminal 300 and a wireless communication system or network within which the mobile terminal 300 is located. For instance, the wireless communication unit 310 can include a broadcast receiving module 311, a mobile communication module 312, a wireless Internet module 313, a short-range communication module 314, and a position-location module 315.

The broadcast receiving module 311 receives a broadcast signal and/or broadcast associated information from an external broadcast managing server via a broadcast channel. The broadcast channel may include a satellite channel and a terrestrial channel. At least two broadcast receiving modules 311 can be provided in the mobile terminal 300 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this instance, the broadcast associated information can be received by the mobile communication module 312.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 311 may be configured to receive broadcast signals transmitted from various types of broadcast systems. By non-limiting example, such broadcasting systems may include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 311 can be configured to be suitable for other broadcasting systems as well as the above-noted digital broadcasting systems. The broadcast signal and/or broadcast associated information received by the broadcast receiving module 311 may be stored in a suitable device, such as the memory 360.

The mobile communication module 312 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 313 supports Internet access for the mobile terminal 300. This module may be internally or externally coupled to the mobile terminal 300. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution). Wireless Internet access by Wibro™, HSPDA, GSM, CDMA, WCDMA, or LTE is achieved via a mobile communication network. In this regard, the wireless Internet module 313 may be considered as being a kind of the mobile communication module 312 to perform the wireless Internet access via the mobile communication network.

The short-range communication module 314 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™, to name a few.

The position-location module 315 identifies or otherwise obtains the location of the mobile terminal 100. According to one embodiment, this module may be implemented with a global positioning system (GPS) module. The GPS module 315 can precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and one or more time information are then amended (or corrected) using another satellite. In addition, the GPS module 315 can calculate speed information by continuously calculating a real-time current location.

With continued reference to FIG. 3, the audio/video (A/V) input unit 320 is configured to provide audio or video signal input to the mobile terminal 300. As shown, the A/V input unit 320 includes a camera 321 and a microphone 322. The camera 321 receives and processes image frames of still pictures or video, which are obtained by an image sensor in a video call mode or a photographing mode. Furthermore, the processed image frames can be displayed on the display 351.

The image frames processed by the camera 321 can be stored in the memory 360 or can be transmitted to an external recipient via the wireless communication unit 310. Optionally, at least two cameras 321 can be provided in the mobile terminal 300 according to the environment of usage. The microphone 322 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 312 in a call mode. The microphone 322 typically includes assorted noise removing algorithms to remove noise generated in the course of receiving the external audio signal.

The user input unit 330 generates input data responsive to user manipulation of an associated input device or devices. Examples of such devices include a keypad, a dome switch, a touchpad (e.g., static pressure/capacitance), a jog wheel, and a jog switch. The sensing unit 340 provides sensing signals for controlling operations of the mobile terminal 300 using status measurements of various aspects of the mobile terminal. For instance, the sensing unit 340 may detect an open/closed status of the mobile terminal 100, the relative positioning of components (e.g., a display and keypad) of the mobile terminal 300, a change of position (or location) of the mobile terminal 300 or a component of the mobile terminal 300, a presence or absence of user contact with the mobile terminal 300, and an orientation or acceleration/deceleration of the mobile terminal 300. As an example, a mobile terminal 300 configured as a slide-type mobile terminal is considered. In this configuration, the sensing unit 340 may sense whether a sliding portion of the mobile terminal is open or closed. According to other examples, the sensing unit 340 senses the presence or absence of power provided by the power supply unit 390, and the presence or absence of a coupling or other connection between the interface unit 370 and an external device. According to one embodiment, the sensing unit 340 can include a proximity sensor 341.

The output unit 350 generates output relevant to the senses of sight, hearing, and touch. Furthermore, the output unit 350 includes the display 351, an audio output module 352, an alarm unit 353, a haptic module 354, and a projector module 355. The display 351 is typically implemented to visually display (output) information associated with the mobile terminal 300. For instance, if the mobile terminal is operating in a phone call mode, the display will generally provide a user interface (UI) or graphical user interface (GUI) which includes information associated with placing, conducting, and terminating a phone call. As another example, if the mobile terminal 300 is in a video call mode or a photographing mode, the display 351 may additionally or alternatively display images which are associated with these modes, the UI or the GUI.

The display module 351 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 300 may include one or more of such displays. Some of the displays can be implemented in a transparent or optical transmittive type, i.e., a transparent display. A representative example of the transparent display is the TOLED (transparent OLED). A rear configuration of the display 351 can be implemented as the optical transmittive type as well. In this configuration, a user can see an object located at the rear of a terminal body on a portion of the display 351 of the terminal body.

At least two displays 351 can be provided in the mobile terminal 300 in accordance with one embodiment of the mobile terminal 300. For instance, a plurality of displays can be arranged to be spaced apart from each other or to form a single body on a single face of the mobile terminal 300. Alternatively, a plurality of displays can be arranged on different faces of the mobile terminal 300.

If the display 351 and a sensor for detecting a touch action (hereinafter called 'touch sensor') are configured as a mutual layer structure (hereinafter called 'touch screen'), the display 351 is usable as an input device as well as an output device. In this instance, the touch sensor can be configured as a touch film, a touch sheet, or a touchpad.

The touch sensor can be configured to convert pressure applied to a specific portion of the display 351 or a variation of capacitance generated from a specific portion of the display 351 to an electronic input signal. Moreover, the touch sensor is configurable to detect pressure of a touch as well as a touched position or size. If a touch input is made to the touch sensor, a signal(s) corresponding to the touch input is transferred to a touch controller. The touch controller processes the signal(s) and then transfers the processed signal(s) to the controller 380. Therefore, the controller 380 is made aware when a prescribed portion of the display 351 is touched.

Referring to FIG. 3, a proximity sensor 341 can be provided at an internal area of the mobile terminal 300 enclosed by the touch screen or around the touch screen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 341 is more durable than a contact type sensor and also has utility broader than the contact type sensor.

The proximity sensor 341 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touch screen includes the electrostatic capacity proximity sensor, it is configured to detect the proximity of a pointer using a variation of an electric field according to the proximity of the pointer. In this configuration, the touch screen (touch sensor) can be considered as the proximity sensor.

For clarity and convenience of explanation, an action for enabling the pointer approaching the touch screen to be recognized as placed on the touch screen may be named 'proximity touch' and an action of enabling the pointer to actually come into contact with the touch screen may be named 'contact touch'. In addition, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 352 functions in various modes including a call-receiving mode, a call-placing mode, a recording mode, a voice recognition mode, and a broadcast reception mode to output audio data which is received from the wireless communication unit 310 or is stored in the memory 360. During operation, the audio output module 352 outputs audio relating to a particular function (e.g., call received, message received). The audio output module 352 may be implemented using one or more speakers, buzzers, other audio producing devices, and combinations of these devices.

The alarm unit 353 outputs a signal for announcing the occurrence of a particular event associated with the mobile terminal 300. Typical events include a call received, a message received and a touch input received. The alarm unit 353 can output a signal for announcing the event occurrence by way of vibration as well as video or audio signal. The video or audio signal can be output via the display 351 or the audio output module 352. Hence, the display 351 or the audio output module 352 can be regarded as a part of the alarm unit 353.

The haptic module 354 generates various tactile effects that can be sensed by a user. Vibration is a representative one of the tactile effects generated by the haptic module 354. The strength and pattern of the vibration generated by the haptic module 354 are controllable. For instance, different vibrations can be output by being synthesized together or can be output in sequence.

The haptic module 354 can generate various tactile effects as well as the vibration. For instance, the haptic module 354 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 354 can be implemented to enable a user to sense the tactile effect through a muscle sense of a finger or an arm as well as to transfer the tactile effect through direct contact. Optionally, at least two haptic modules 354 can be provided in the mobile terminal 300 in accordance with an embodiment of the mobile terminal 300.

The memory 360 is generally used to store various types of data to support the processing, control, and storage requirements of the mobile terminal 300. Examples of such data include program instructions for applications operating on the mobile terminal 300, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 360.

Moreover, data for various patterns of vibration and/or sound output in response to a touch input to the touch screen can be stored in the memory 360. The memory 360 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 300 can operate in association with a web storage for performing a storage function of the memory 360 on the Internet.

The interface unit 370 may be implemented to couple the mobile terminal 100 with external devices. The interface unit 370 receives data from the external devices or is supplied with power and then transfers the data or power to the respective elements of the mobile terminal 300 or enables data within the mobile terminal 300 to be transferred to the external devices. The interface unit 370 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 300 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 300 via the corresponding port.

When the mobile terminal 300 is connected to an external cradle, the interface unit 370 becomes a passage for supplying the mobile terminal 300 with a power from the cradle or a passage for delivering various command signals input from the cradle by a user to the mobile terminal 300. Each of the various command signals input from the cradle or the power can operate as a signal enabling the mobile terminal 300 to recognize that it is correctly loaded in the cradle.

The controller 380 typically controls the overall operations of the mobile terminal 300. For example, the controller 380 performs the control and processing associated with voice calls, data communications, and video calls. The controller 380 may include a multimedia module 381 that provides multimedia playback. The multimedia module 381 may be configured as part of the controller 380, or implemented as a separate component.

Moreover, the controller 380 can perform a pattern (or image) recognizing process for recognizing a writing input and a picture drawing input performed on the touch screen as characters or images, respectively. The power supply unit 390 provides power required by various components of the mobile terminal 300. The power may be internal power, external power, or combinations of internal and external power.

Various embodiments described herein may be implemented in a computer-readable medium using, for example, computer software, hardware, or some combination of computer software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 380.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 360, and executed by a controller or processor, such as the controller 380.

Figure 4:
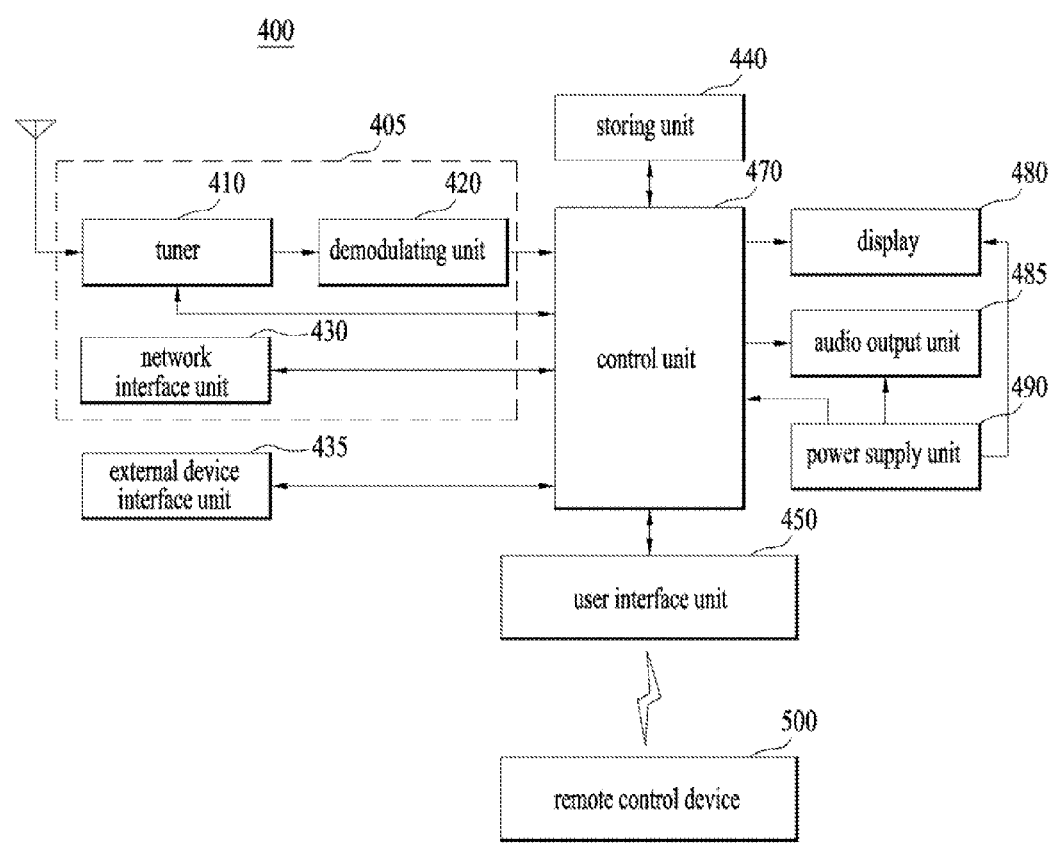
FIG. 4 is a diagram showing a digital device according to another embodiment of the present invention.

FIG. 4 illustrates a digital receiver according to another embodiment of the present invention. Referring to FIG. 4, a digital receiver 400 according to an embodiment of the present invention includes a broadcast receiving unit 405, an external device interface 435, a storage unit 440, a user input interface 450, a controller 470, a display unit 480, an audio output unit 485, a power supply unit 490, and a photographing unit. The broadcast receiving unit 305 may include at least one of one or more tuner 410, a demodulator 420, and a network interface 430. The broadcast receiving unit 405 may include the tuner 410 and the demodulator 420 without the network interface 430, or may include the network interface 430 without the tuner 410 and the demodulator 420. The broadcast receiving unit 405 may include a multiplexer to multiplex a signal, which is subjected to the tuner 410 and demodulated by the demodulator 420, and a signal received through the network interface 40. In addition, the broadcast receiving unit 405 can include a demultiplexer and demultiplex a multiplexed signal, a demodulated signal, or a signal received through the network interface 430.

The tuner 410 may receive a radio frequency (RF) broadcast signal by tuning to a channel selected by the user from among RF broadcast signals received through an antenna or all previously stored channels. The demodulator 420 may receive a digital IF (Intermediate Frequency) signal (DIF) converted by the tuner 410 and demodulate the DIF signal. A stream signal output from the demodulator 420 may be input to the controller 470. The controller 470 can control demultiplexing, audio/video signal processing, etc. Furthermore, the controller 470 can control output of an image through the display unit 480 and output of audio through the audio output unit 485.

The external device interface 435 may provide an environment for interfacing external devices with the digital receiver 400. To implement this, the external device interface 435 may include an A/V input/output unit or an RF communication unit. The external device interface 435 can be connected with external devices such as a digital versatile disk (DVD), a Blu-ray player, a game device, a camera, a camcorder, a computer (notebook computer), a Cloud and a mobile device (e.g., a Smart Phone, a tablet PC, and the like) in a wired/wireless manner.

The A/V input/output unit may include a USB (Universal Serial Bus) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc.

The RF communication unit can perform near field communication. The digital receiver 400 can be networked with other electronic apparatuses according to communication protocols such as Bluetooth, radio frequency identification (RFID), infrared data association (IrDA), ultra wideband (UWB), ZigBee, and digital living network alliance (DLNA), for example.

The network interface 430 may provide an interface for connecting the digital receiver 400 to wired/wireless networks. Using the network interface 430, the digital receiver can transmit/receive data to/from other users or other electronic apparatuses or access a predetermined web page through a network connected thereto or another network linked to the connected network. The network interface 430 can selectively receive a desired application from among publicly open applications through a network.

The storage unit 440 may store programs for signal processing and control and store a processed video, audio or data signal. In addition, the storage unit 440 may execute a function of temporarily storing a video, audio or data signal input from the external device interface 435 or the network interface 430. The storage unit 440 may store information about a predetermined broadcast channel through a channel memory function.

The storage unit 440 can store an application or a list of applications input from the external device interface 435 or the network interface 430. The storage unit 440 may store various platforms which will be described later. The storage unit 440 can include storage media of one or more types, such as a flash memory type, a hard disk type, a multimedia card micro type, a card type memory (e.g. SD or XD memory), RAM, EEPROM, etc. The digital receiver 400 may reproduce content files (a video file, a still image file, a music file, a text file, an application file, etc.) and provide them to the user.

While FIG. 4 illustrates an embodiment in which the storage unit 440 is separated from the controller 470, the configuration of the digital receiver 400 is not limited thereto and the storage unit 440 may be included in the controller 470. The user input interface 450 may transmit a signal input by the user to the controller 470 or deliver a signal output from the controller 470 to the user. For example, the user input interface 450 can receive control signals such as a power on/off signal, a channel selection signal, an image setting signal, etc. from the remote controller 500 or transmit control signals of the controller 470 to the remote controller 500 according to various communication schemes such as RF communication, IR communication, and the like.

The user input interface 450 can transmit control signals input through a power key, a channel key, a volume key, and a local key of a set value to the controller 470. The user input interface 450 can transmit a control signal input from a sensing unit which senses a gesture of the user or deliver a signal of the controller 470 to the sensing unit. Here, the sensing unit may include a touch sensor, a voice sensor, a position sensor, an action sensor, an acceleration sensor, a gyro sensor, a speed sensor, a tilt sensor, a temperature sensor, a pressure or back-pressure sensor, etc.

The controller 470 can generate and output a signal for video or audio output by demultiplexing streams input through the tuner 410, the demodulator 420 or the external device interface 435 or processing demultiplexed signals. A video signal processed by the controller 470 can be input to the display unit 380 and displayed as an image through the display unit 480. In addition, the video signal processed by the controller 470 can be input to an external output device through the external device interface 435.

An audio signal processed by the controller 470 can be applied to the audio output unit 485. Otherwise, the audio signal processed by the controller 470 can be applied to an external output device through the external device interface 435. The controller 470 may include a demultiplexer and an image processor, which are not shown in FIG. 4.

The controller 470 can control the overall operation of the digital receiver 300. For example, the controller 470 can control the tuner 410 to tune to an RF broadcast corresponding to a channel selected by the user or a previously stored channel. The controller 470 can control the digital receiver 400 according to a user command input through the user input interface 450 or an internal program. Particularly, the controller 470 can control the digital receiver 400 to be linked to a network to download an application or application list that the user desires to the digital receiver 400.

For example, the controller 470 may control the tuner 410 to receive a signal of a channel selected in response to a predetermined channel selection command received through the user input interface 450. In addition, the controller 470 may process a video, audio or data signal corresponding to the selected channel. The controller 470 may control information on a channel selected by the user to be output with a processed video or audio signal through the display unit 480 or the audio output unit 485.

Alternatively, the controller 470 may control a video signal or an audio signal received from an external apparatus, for example, a camera or a camcorder through the external device interface 435 to be output through the display unit 480 or the audio output unit 485 according to an external device image reproduction command received through the user input interface 450.

The controller 470 can control the display unit 480 to display images. For example, the controller 470 can control a broadcast image input through the tuner 410, an external input image received through the external device interface 435, an image input through the network interface 430, or an image stored in the storage unit 440 to be displayed on the display unit 480. Here, an image displayed on the display unit 480 can be a still image or video, and it can be a 2D or 3D image.

The controller 470 can control reproduction of content. Here, the content may be content stored in the digital receiver 400, received broadcast content, or content input from an external device. The content may include at least one of a broadcast image, an external input image, an audio file, a still image, an image of a linked web, and a text file.

The controller 470 can control display of applications or an application list, downloadable from the digital receiver 400 or an external network, when an application view menu is selected. The controller 470 can control installation and execution of applications downloaded from an external network in addition to various user interfaces. Furthermore, the controller 470 can control an image relating to an application executed by user selection to be displayed on the display unit 480. The digital receiver 400 may further include a channel browsing processor which generates a thumbnail image corresponding to a channel signal or an external input signal.

The channel browsing processor can receive a stream signal (e.g., TS) output from the demodulator 420 or a stream signal output from the external device interface 435 and extract an image from the received stream signal to generate a thumbnail image. The generated thumbnail image can be directly input to the controller 470 or can be encoded and then input to the controller 470. Also, the thumbnail image can be coded into a stream and then applied to the controller 470. The controller 470 can display a thumbnail list including a plurality of thumbnail images on the display unit 480 using thumbnail images input thereto. The thumbnail images included in the thumbnail list can be updated sequentially or simultaneously. Accordingly, the user can conveniently check content of a plurality of broadcast channels.

The display unit 480 may convert a video signal, a data signal, and an OSD signal processed by the controller 470 and a video signal and a data signal received from the external device interface 435 into RGB signals to generate driving signals. The display unit 480 may be a PDP, an LCD, an OLED, a flexible display, a 3D display or the like. The display unit 480 may be configured as a touch-screen and used as an input device rather than an output device. The audio output unit 485 receives a signal audio-processed by the controller 470, for example, a stereo signal, a 3.1 channel signal or a 5.1 channel signal, and outputs the received signal as audio. The audio output unit 485 can be configured as one of various speakers.

The digital receiver 400 may further include the sensing unit for sensing a gesture of the user, which includes at least one of a touch sensor, a voice sensor, a position sensor, and an action sensor, as described above. A signal sensed by the sensing unit can be delivered to the controller 470 through the user input interface 450. The digital receiver 400 may further include the photographing unit for photographing the user. Image information acquired by the photographing unit can be supplied to the controller 470. The controller 470 may sense a gesture of the user from an image captured by the photographing unit or a signal sensed by the sensing unit, or by combining the image and the signal.

The power supply unit 490 may supply power to the digital receiver 400. Particularly, the power supply unit 490 can supply power to the controller 470 which can be implemented as a system-on-chip (SoC), the display unit 480 for displaying images, and the audio output unit 485 for audio output.

The remote controller 500 may transmit user input to the user input interface 450. To achieve this, the remote controller 500 can use Bluetooth, RF communication, IR communication, UWB, ZigBee, etc. In addition, the remote controller 500 can receive audio, video or data signal output from the user input interface 350 and display the received signal or output the same as audio or vibration. The functions of the application manager shown in FIG. 2 can be divided and executed by the controller 470, the storage unit 440, the user interface 450, the display unit 480 and the audio output unit 485 which are controlled by the controller 470.

The digital receivers shown in FIGS. 2 and 4 are exemplary and components thereof can be integrated, added or omitted according to specifications thereof. That is, two or more components can be integrated into one component or one component can be subdivided into two or more components as required. The function executed by each component is exemplified to describe embodiments of the present invention and detailed operations or devices do not limit the scope of the present invention. Some of the components shown in FIG. 2 may be omitted or a component (not shown in FIG. 2) may be added as required. The digital receiver according to an embodiment of the present invention may not include the tuner and the demodulator, differently from the digital receivers shown in FIGS. 2 and 4, and may receive content through the network interface or the external device interface and reproduce the content.

The digital receiver is an example of image signal processors which process an image stored therein or an input image. Other examples of the image signal processors may include a set-top box (STB) which does not include the display unit 380 and the audio output unit 485 shown in FIG. 4, a DVD player, a Blu-ray player, a game device, a computer, etc.

Figure 5:
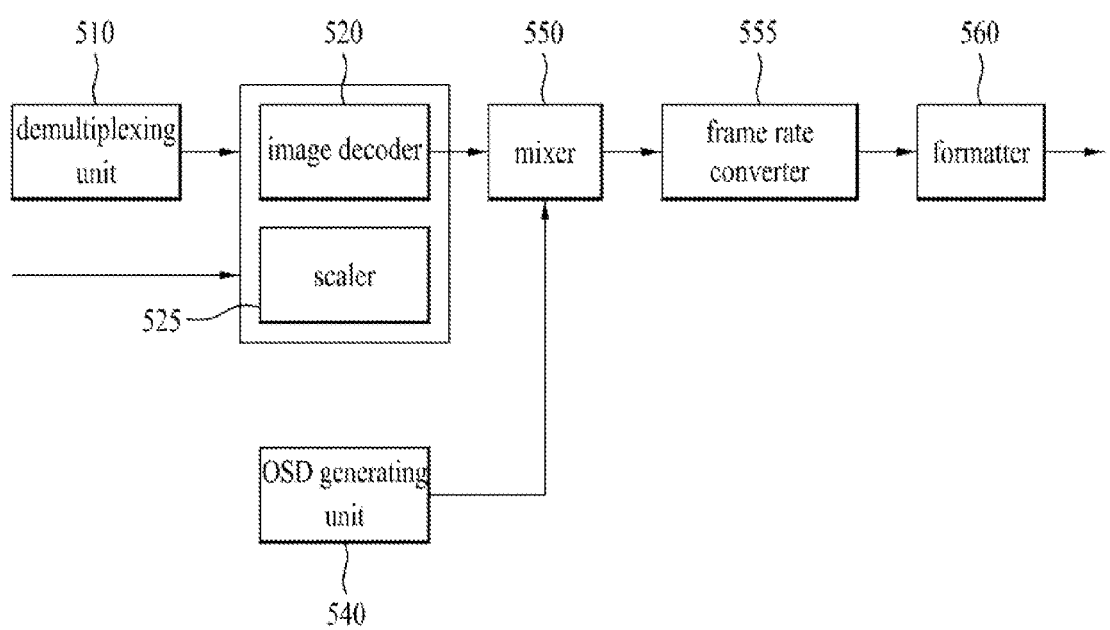
FIG. 5 is a block diagram showing the detailed configuration of each of controllers of FIGS. 2 to 4 according to one embodiment of the present invention.

FIG. 5 illustrates a digital receiver according to another embodiment of the present invention. Particularly, FIG. 5 shows a configuration for implementing a 3D digital receiver, which can be included in the configurations of FIGS. 2 and 3. The digital receiver according to an embodiment of the present invention may include a demultiplexer 510, an image processor 520, an OSD generator 540, a mixer 550, a frame rate converter (FRC) 555, and a 3D formatter (or an Output formatter) 560.

The demultiplexer 510 can demultiplex an input stream signal into an MPEG-2 TS image, an audio signal and a data signal, for example. The image processor can process a demultiplexed image signal using a video decoder 525 and a scaler 535. The video decoder 525 can decode the demultiplexed image signal and the scaler 535 can scale the resolution of the decoded image signal such that the image signal can be displayed.

The image signal decoded by the image processor 520 may be input to the mixer 550. The OSD generator 540 may generate OSD data automatically or according to user input. For example, the OSD generator 540 may generate data to be displayed on the screen of an output unit in the form of an image or text based on a control signal of a user input interface. OSD data generated by the OSD generator 540 may include various data such as a user interface image of the digital receiver, various menu screens, widget, icons, and information on ratings. The OSD generator 540 can generate a caption of a broadcast image or data for displaying EPG based broadcast information.

The mixer 550 may mix the OSD data generated by the OSD generator 540 and the image signal processed by the image processor 520. The mixer 550 may provide the mixed signal to the 3D formatter 560. By mixing the decoded image signal and the OSD data, OSD may be overlaid on a broadcast image or external input image. The frame rate converter (FRC) 555 may convert a frame rate of input video. For example, the frame rate converter 555 can convert the frame rate of an input 60 Hz video to a frame rate of 120 Hz or 240 Hz, according to an output frequency of the output unit. The frame rate converter 555 may be bypassed when frame conversion is not executed.

The 3D formatter 560 may change the output of the frame rate converter 555, which is input thereto, into a form suitable for the output format of the output unit. For example, the 3D formatter 560 can output an RGB data signal. In this instance, this RGB data signal can be output according to low voltage differential signaling (LVDS) or mini-LVDS. When a 3D image signal output from the frame rate converter 555 is input to the 3D formatter 560, the 3D formatter 560 can format the 3D image signal such that the 3D image signal is matched to the output format of the output unit, to thereby support a 3D service.

An audio processor may audio-process a demultiplexed audio signal. The audio processor can support various audio formats. For example, when audio signals are encoded in MPEG-2, MPEG-4, advanced audio coding (AAC), high efficiency-AAC (HE-AAC), AC-3 and bit sliced audio coding (BSAC) formats, the audio processor can include decoders corresponding to the formats to process the audio signals. Furthermore, the audio processor can control base, treble and volume.

In addition, a data processor can process a demultiplexed data signal. For example, when a demultiplexed data signal is encoded, the data processor can decode the encoded demultiplexed data signal. Here, the encoded data signal may be EPG information including broadcast information such as the start time and end time (or duration) of a broadcast program which is broadcast through each channel.

Figure 6:
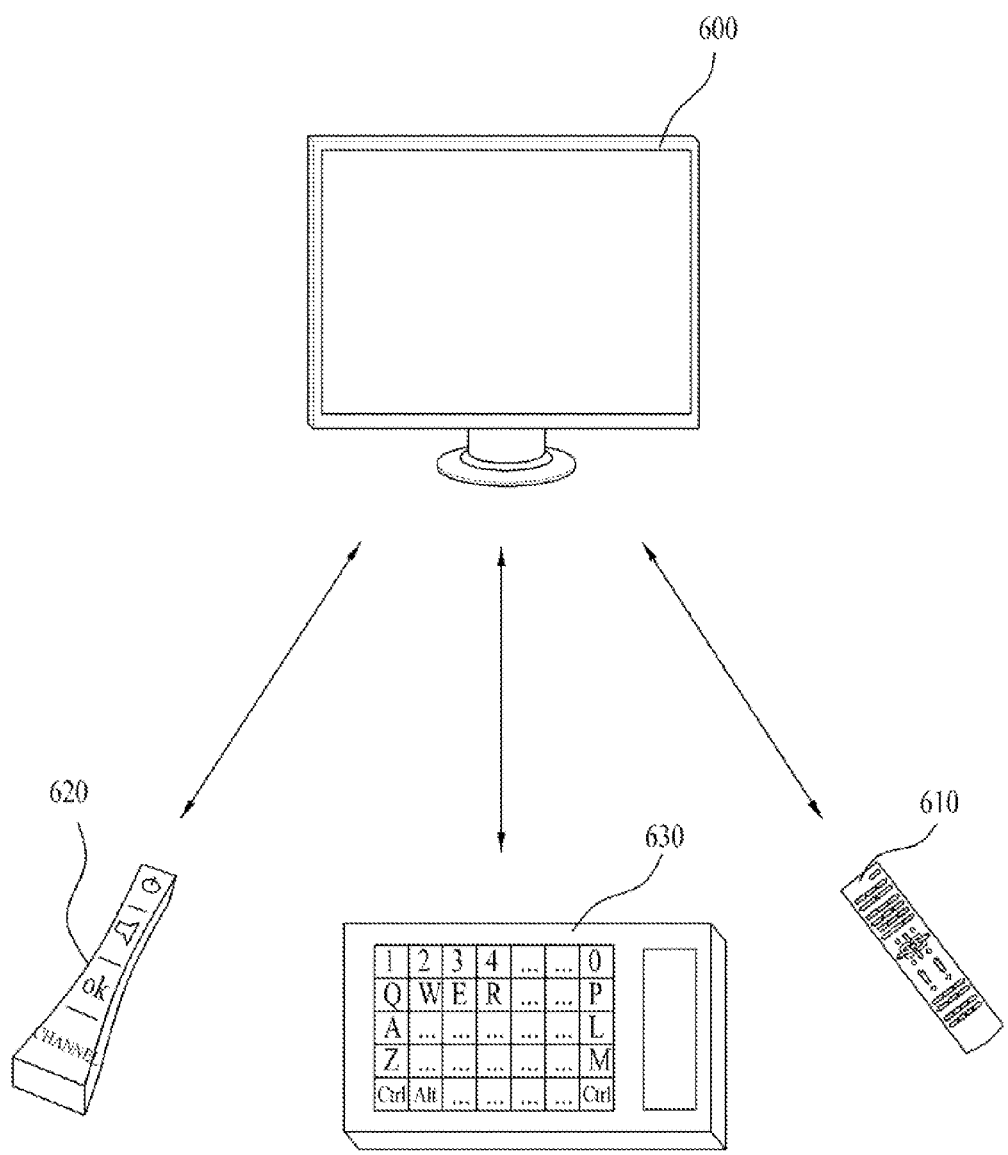
FIG. 6 is a diagram showing an input unit connected to each of the digital devices of FIGS. 2 to 4 according to one embodiment of the present invention.

FIG. 6 illustrates remote controllers of a digital receiver according to an embodiment of the present invention. To execute various operations for implementing the present invention according to embodiments, various user interface devices (UIDs) which can communicate with a digital receiver 600 in a wired/wireless manner can be used as remote controllers.

The remote controllers can use various communication protocols such as Bluetooth, RFID, IrDA, UWB, ZigBee, DLNA, etc. UIDs can include a mobile device (e.g., a smart phone, a tablet PC, and the like), a magic remote controller 620 and a remote controller 630 equipped with a keyboard and a touch pad in addition to a general remote controller 610.

The magic remote controller 620 may include a gyro sensor mounted therein to sense vibration of a user's hand or rotation. That is, the magic remote controller 620 can move a pointer according to up, down, left and right motions of the user such that the user can easily execute a desired action, for example, easily control a channel or a menu. The remote controller 630 including the keyboard and touch pad can facilitate text input through the keyboard and control of movement of a pointer and magnification and reduction of a picture or video through the touch pad.

The digital device described in the present specification can be operated by based on WebOS platform. Hereinafter, a WebOS based process or algorithm may be performed by the controller of the above-described digital device. The controller includes the controllers of FIGS. 2 to 5 and has wide concepts. Accordingly, hereinafter, a component for processing WebOS based services, applications, content, etc., including software, firmware or hardware in a digital device is referred to a controller.

Such a WebOS based platform may improve development independency and functional extensibility by integrating services, applications, etc. based on a Luna-service bus, for example, and increase application development productivity based on web application framework. In addition, system resources, etc. may be efficiently used via a WebOS process and resource management to support multitasking. A WebOS platform described in the present specification may be available or loaded not only for stationary devices such as personal computers (PCs), TVs and set top boxes (STBs) but also for mobile devices such as cellular phones, smartphones tablet PCs, laptops, and wearable devices.

A software structure for a digital device is a monolithic structure which solves conventional problems depending on markets, is a single process and closed product based on multi-threading, and has difficulties in terms of external applications. In pursuit of new platform based development, cost innovation via chipset replacement and UI application and external application development efficiency, layering and componentization are performed to obtain a 3-layered structure and an add-on structure for an add-on, a single source product and an open application. Recently, modular design of a software structure has been conducted in order to provide a web open application programming interface (API) for an echo system and modular architecture of a functional unit or a native open API for a game engine, and thus a multi-process structure based on a service structure has been produced.

Figure 7:
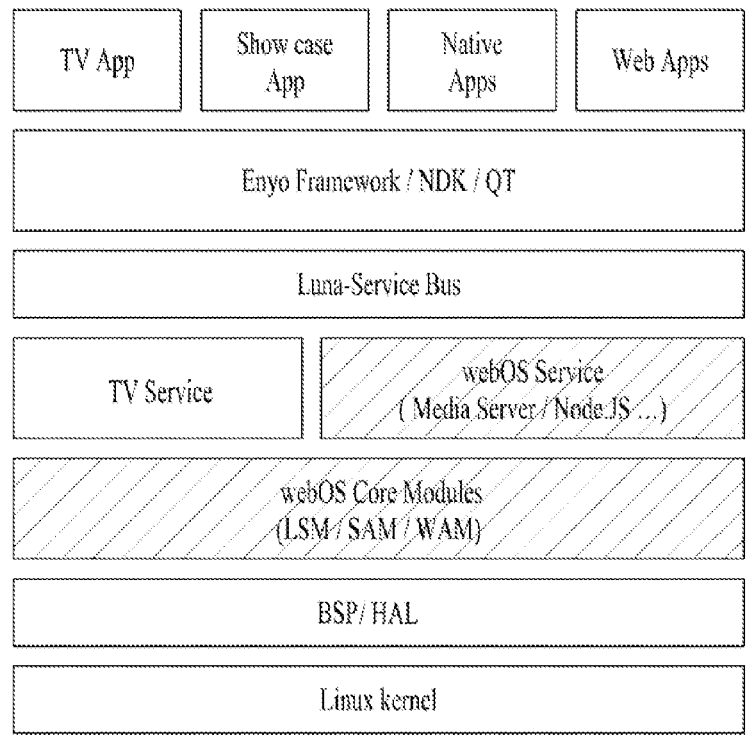
FIG. 7 is a diagram illustrating WebOS architecture according to one embodiment of the present invention.

FIG. 7 is a diagram illustrating WebOS architecture according to one embodiment of the present invention. The architecture of a WebOS platform will now be described with reference to FIG. 7. The platform may be largely divided into a kernel, a webOS core platform based on a system library, an application, a service, etc.

The architecture of the WebOS platform has a layered structure. OS is provided at a lowest layer, system library(s) are provided at a next highest layer and applications are provided at the highest layer. First, the lowest layer is an OS layer including a Linux kernel such that Linux is included as an OS of the digital device.

At layers higher than the OS layer, a board support package (BSP)/hardware abstraction layer (HAL) layer, a WebOS core modules layer, a service layer, a Luna-service bus layer and an Enyo framework/native developer's kit (NDK)/QT layer are sequentially provided. At the highest layer, an application layer is provided. One or more layers of the above-described WebOS layered structure may be omitted and a plurality of layers may be combined to one layer and one layer may be divided into a plurality of layers.

The WebOS core module layer may include a Luna surface manager (LSM) for managing a surface window, etc., a system & application manager (SAM) for managing execution and performance status of applications, etc., and a web application manager (WAM) for managing web applications based on WebKit. The LSM manages an application window displayed on a screen. The LSM may control display hardware (HW) and provide a buffer for rendering content necessary for applications, and compose and output results of rendering a plurality of applications on a screen.

The SAM manages policy according to several conditions of systems and applications. The WAM is based on Enyo framework, because a WebOS regards a web application as a basic application. An application may use a service via a Luna-service bus. A service may be newly registered via a bus and the application may detect and use a desired service.

The service layer may include services having various service levels, such as a TV service, a WebOS service, etc. The WebOS service may include a media server, Node.JS, etc. and, in particular, the Node.JS service supports JavaScript, for example. The WebOS service may be communicated to a Linux process implementing function logic via a bus. This WebOS service is largely divided into four parts, migrates from a TV process and an existing TV to a WebOS, is developed as services which differ between manufacturers, WebOS common services and Javascripts, and is composed of the Node.JS service used via Node.JS.

The application layer may include all applications supportable by a digital device, such as a TV application, a showcase application, a native application, a web application, etc. Applications on the WebOS may be divided into a web application, a palm development kit (PDK) application, a Qt Meta Language or Qt Modeling Language (QML) application, etc. according to implementation methods.

The web application is based on a WebKit engine and is performed on WAM runtime. Such a web application is based on Enyo framework or may be developed and performed based on general HTML5, cascading style sheets (CSS) and JavaScripts.

The PDK application includes a native application developed with C/C++ based on a PDK provided for a third party or an external developer. The PDK refers to a set of development libraries and tools provided to enable a third party to develop a native application (C/C++) such as games. For example, the PDK application may be used to develop applications requiring high performance.

The QML application is a native application based on Qt and includes basic applications provided along with the WebOS platform, such as card view, home dashboard, virtual keyboard, etc. QML is a markup language of a script format, not C++. The native application is an application which is developed and compiled using C/C++ and is executed in the binary form and has an advantage such as high execution speed.

Figure 8:
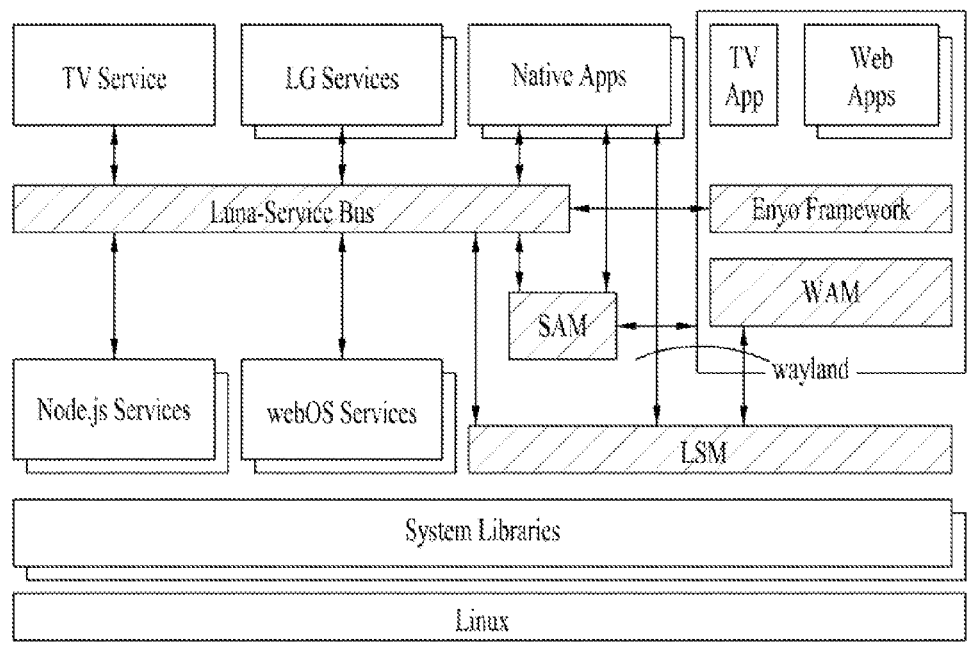
FIG. 8 is a diagram illustrating architecture of a WebOS device according to one embodiment of the present invention.

FIG. 8 is a diagram illustrating the architecture of a WebOS device according to one embodiment of the present invention. FIG. 8 is a block diagram based on a runtime of a WebOS device and is described with reference to the layered structure of FIG. 7. Hereinafter, a description will be given with reference to FIGS. 7 and 8.

Referring to FIG. 8, services, applications and WebOS core modules are included on a system OS (Linux) and system libraries and communication therebetween may be performed via a Luna-service bus. Node.JS services based on HTML5 such as e-mail, contact or calendar, CSS, Javascript, etc., WebOS services such as logging, backup, file notify, database (DB), activity manager, system policy, audio daemon (AudioD), update, media server, etc., TV services such as electronic program guide (EPG), personal video recorder (PVR), data broadcasting, etc., CP services such as voice recognition, Now on, notification, search, auto content recognition (ACR), contents list browser (CBOX), wfdd, digital media remastering (DMR), remote application, download, Sony Philips digital interface format (SDPIF), etc., native applications such as PDK applications, browsers, QML applications, a UI-related TV applications based on Enyo framework and web applications are processed via WebOS core modules such as the above-described SAM, WAM and LSM via the Luna-service bus. The TV applications and the web applications are not necessarily based on Enyo framework or related to UI.

The CBOX may manage metadata and lists of content of external devices such as USB drivers, DLNA devices or Cloud servers connected to a TV. The CBOX may output content listing of various content containers such as USB, data management system (DMS), DVR, Cloud server, etc. as an integrated view. The CBOX may display various types of content listings such as pictures, music or video and manage metadata thereof. The CBOX may output content of an attached storage in real time. For example, if a storage device such as a USB is plugged in, the CBOX should immediately output a content list of the storage device. At this time, a standardized method for processing the content listing may be defined. The CBOX may accommodate various connection protocols.

The SAM is used to improve module complexity and extensibility. For example, an existing system manager processes several functions such as system UI, window management, web application runtime and UX constraint processing via one process and thus has high implementation complexity. In order to solve such a problem, the SAM divides main functions and clarifies an interface between functions, thereby decreasing implementation complexity.

The LSM is supported to independently develop and integrate a system UX such as card view, launcher, etc. and to easily cope with change in product requirements. The LSM maximally uses hardware resources to enable multitasking if a plurality of application screens is composed using an app-on-app method and may provide a window management mechanism for 21:9 and a multi-window.

The LSM supports implementation of a system UI based on a QML and improves development productivity. QML UX may easily configure a view using a screen layout and UI components based on model view controller (MVC) and easily develop code for processing user input. An interface between the QML and the WebOS component is achieved via a QML extensibility plug-in and graphic operation of an application may be based on Wayland protocol, luna-service call, etc.

The LSM is an abbreviation for a Luna surface manager and functions as an application window compositor. The LSM composes and outputs independently developed applications, UI components, etc. on a screen. When components such as recent applications, showcase applications or launcher applications render respective content, the LSM defines an output area, a linkage method, etc. as a compositor. The LSM functioning as a compositor performs processing such as graphic composition, focus management, input events, etc. At this time, the LSM receives event, focus, etc. from an input manager, and a remote controller, a HID such as a mouse and keyboard, a joystick, a game pad, a remote application, a pen touch, etc. may be included as an input manager.

The LSM supports multiple window models and may be simultaneously executed in all applications as a system UI. The LSM may support launcher, recents, setting, notification, system keyboard, volume UI, search, finger gesture, voice recognition (speech to text (STT), text to speech (TTS), natural language processing (NLP), etc.), pattern gesture (camera or mobile radio control unit (MRCU)), live menu, ACR, etc.

Figure 9:
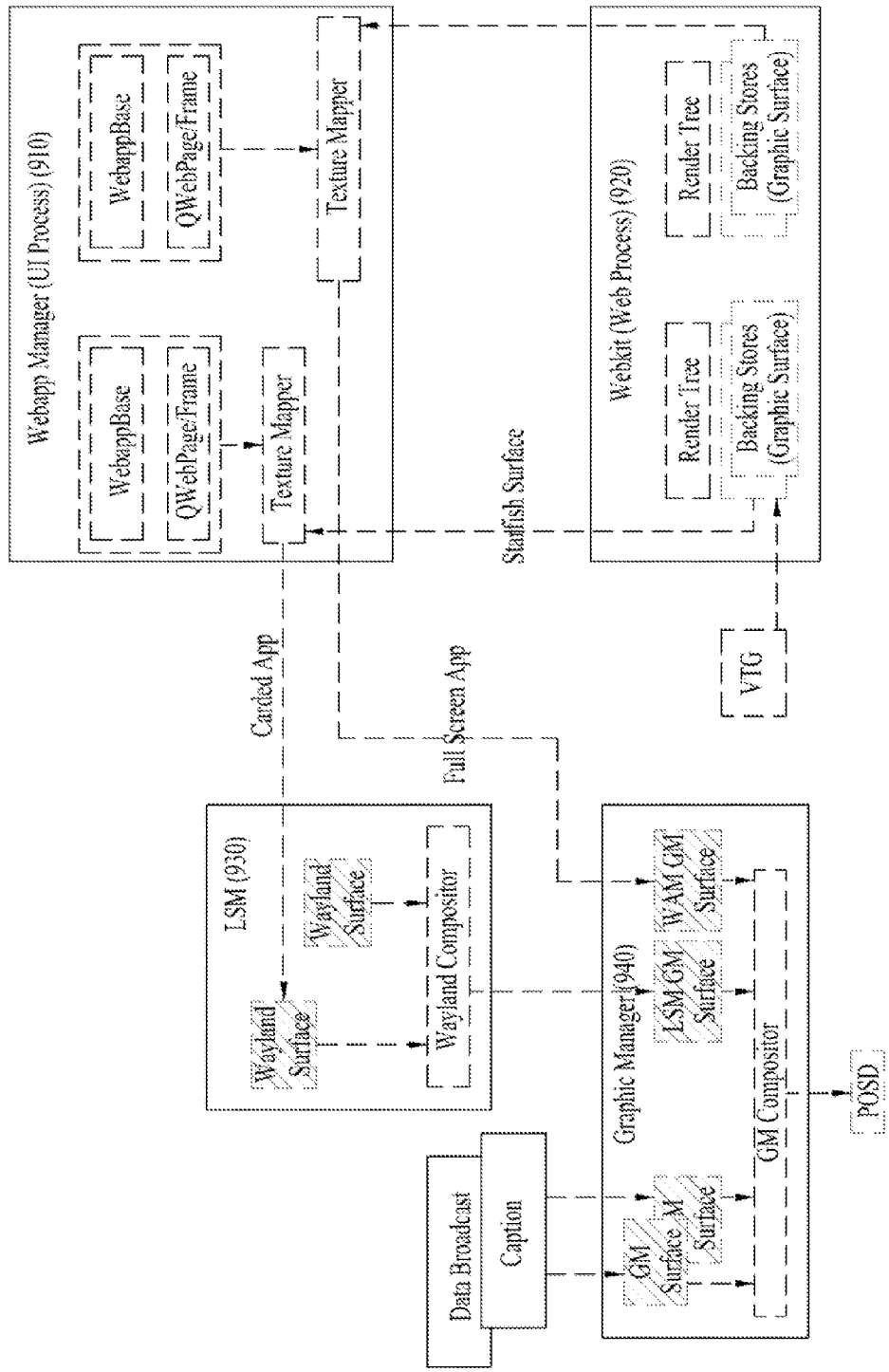
FIG. 9 is a diagram illustrating a graphic composition flow in a WebOS device according to one embodiment of the present invention.

FIG. 9 is a diagram illustrating a graphic composition flow in a WebOS device according to one embodiment of the present invention. Referring to FIG. 9, graphic composition processing may be performed via a web application manager 910 functioning as a UI process, a WebKit 920 functioning as a web process, an LSM 930 and a graphics manager (GM) 940.

When the web application manager 910 generates web application based graphics data (or application) as a UI process, the generated graphics data is delivered to the LSM if the graphics data is not a fullscreen application. The web application manager 910 receives an application generated by the WebKit 920 in order to share a graphic processing unit (GPU) memory for graphic management between the UI process and the web process and delivers the application to the LSM 930 if the application is not a fullscreen application. If the application is a fullscreen application, the LSM 930 may bypass the application. In this instance, the application is directly delivered to the graphics manager 940.

The LSM 930 transmits the received UI application to a Wayland compositor via a Wayland surface and the Wayland compositor appropriately processes the UI application and delivers the processed UI application to the graphics manager. The graphics data received from the LSM 930 is delivered to the graphics manager compositor via the LSM GM surface of the graphics manager 940, for example.

The fullscreen application is directly delivered to the graphics manager 940 without passing through the LSM 930 as described above and is processed in the graphics manager compositor via the WAM GM surface. The graphics manager processes and outputs all graphics data in the webOS device and receives and outputs data passing through the above-described LSM GM surface, data passing through a WAM GM surface, and graphics data passing through a GM surface, such as a data broadcasting application or a caption application, on a screen. The function of the GM compositor is equal or similar to the above-described compositor.

Figure 10:
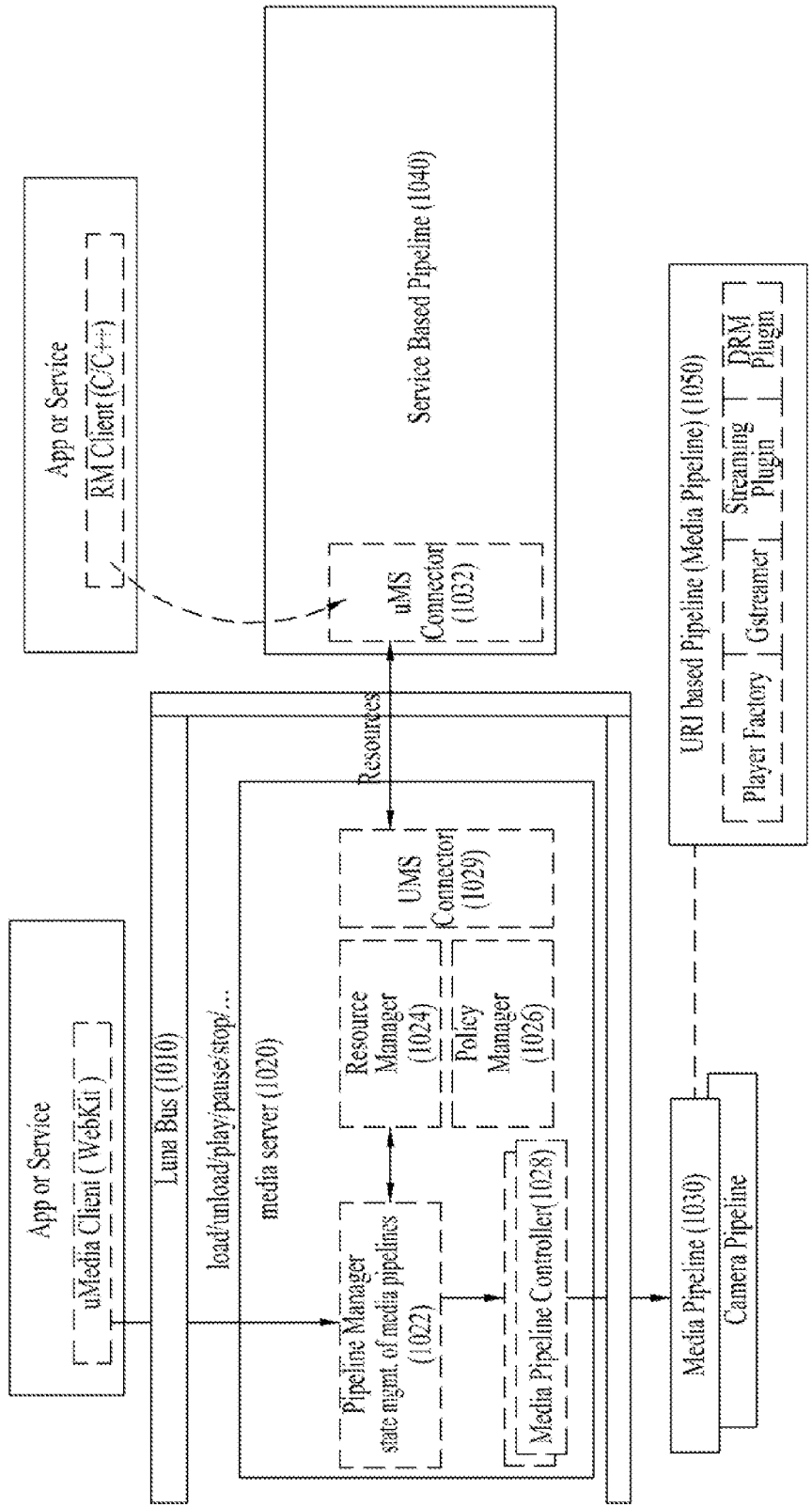
FIG. 10 is a diagram illustrating a media server according to one embodiment of the present invention.
Figure 11:
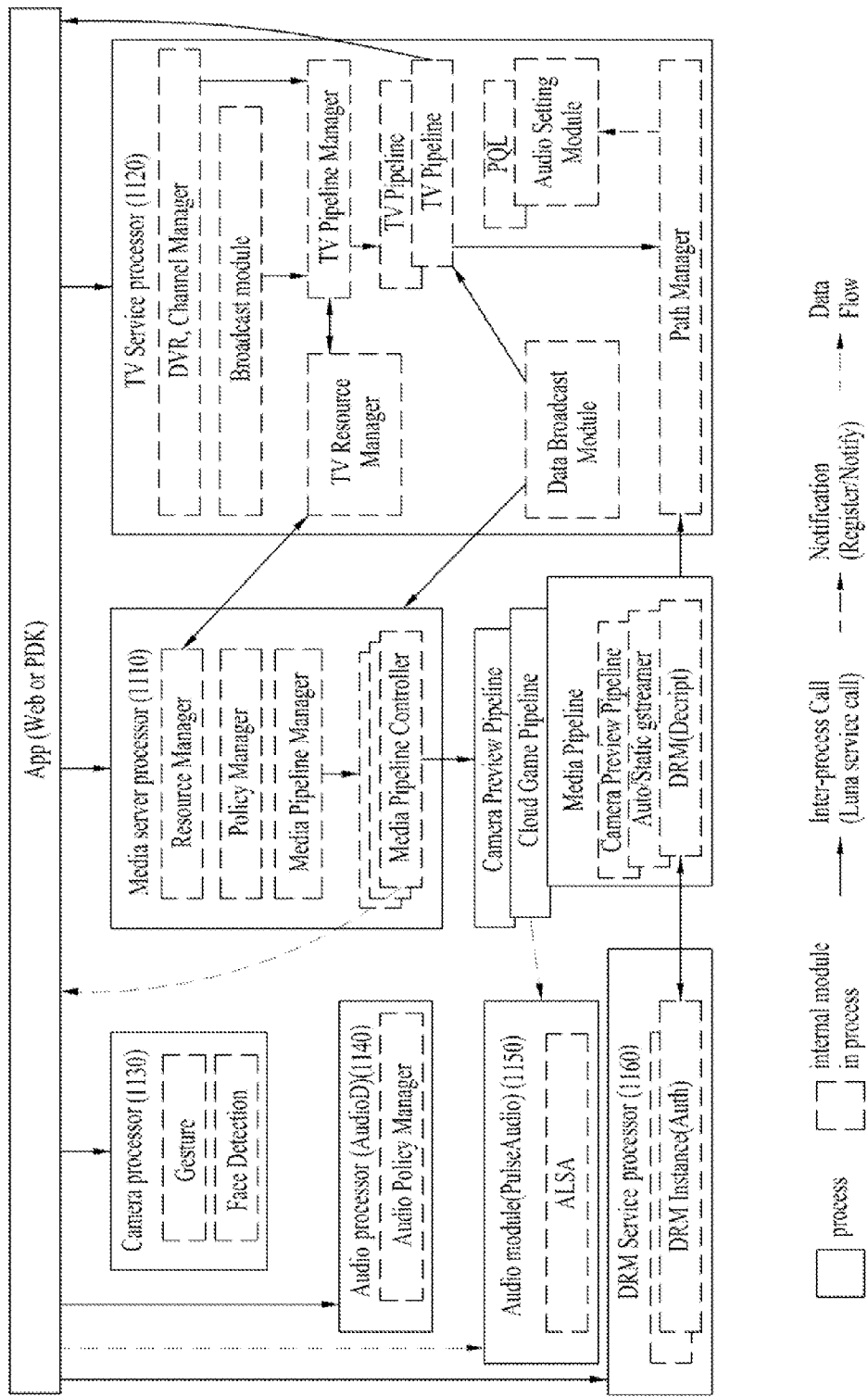
FIG. 11 is a block diagram showing the configuration of a media server according to one embodiment of the present invention.
Figure 12:
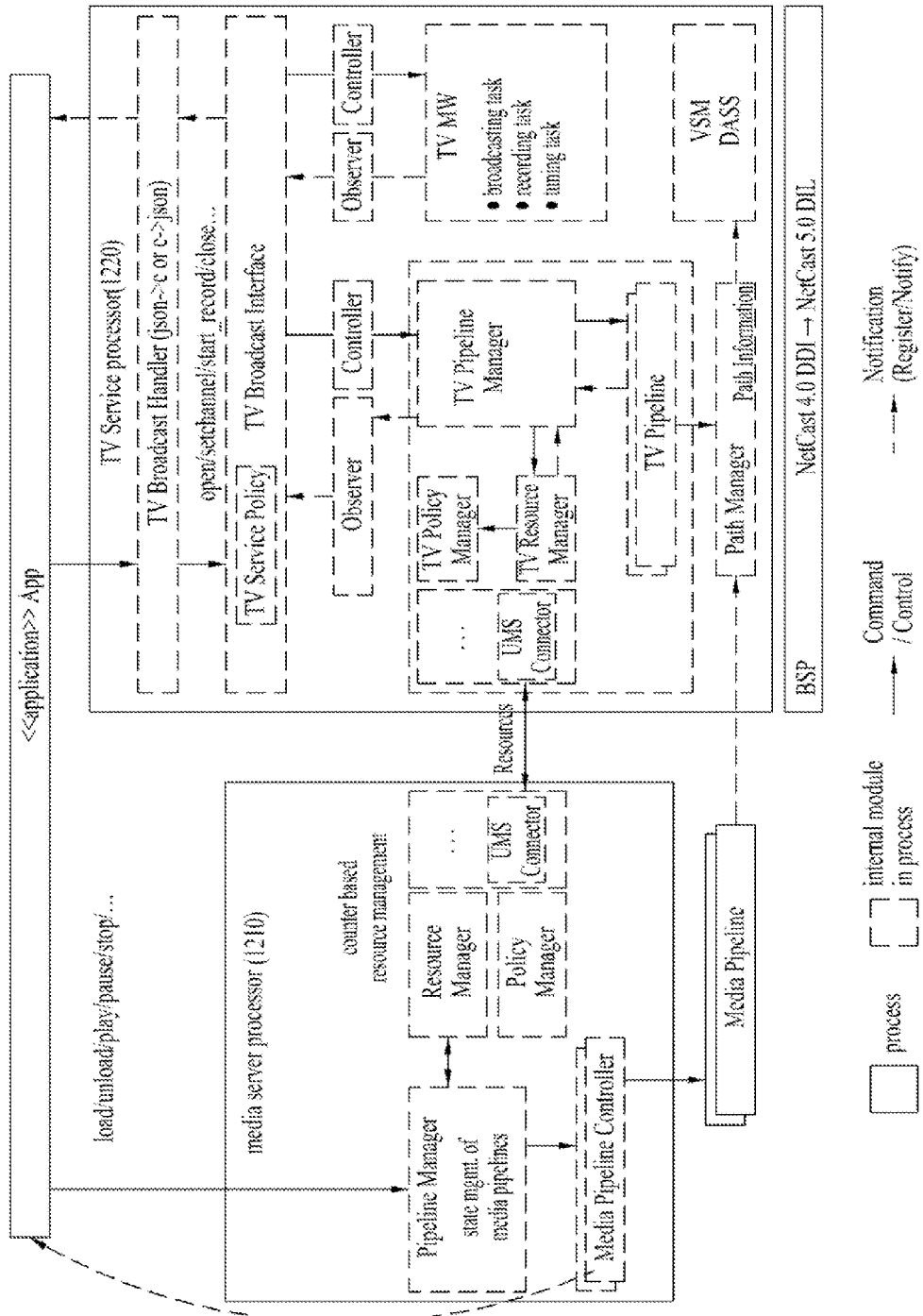
FIG. 12 is a diagram illustrating a relationship between a media server and a TV service according to one embodiment of the present invention.

FIG. 10 is a diagram illustrating a media server according to one embodiment of the present invention, FIG. 11 is a block diagram of a media server according to one embodiment of the present invention, and FIG. 12 is a diagram illustrating a relationship between a media server and a TV service according to one embodiment of the present invention.

The media server supports execution of a variety of multimedia in a digital device and manages necessary resources. The media server may efficiently use hardware resources necessary for media play. For example, the media server requires audio/video hardware resources for multimedia execution and efficiently manages a resource use status to efficiently use resources. In general, a stationary device having a screen larger than that of a mobile device requires more hardware resources upon multimedia execution and requires high encoding/decoding rate and graphics data transfer rate due to a large amount of data. The media server should perform not only streaming or file playback but also broadcasting, recording and tuning tasks, a task for simultaneously viewing and recording, and a task for simultaneous displaying a sender and a recipient on a screen upon video call. It is difficult for the media server to simultaneously perform several tasks due to restriction in hardware resources such as an encoder, a decoder, a tuner, a display engine, etc. in chipset units. For example, the media server restricts a use scenario or performs processing using user input.

The media server may make system stability robust, and may remove a playback pipeline, in which errors occur during media playback, per pipeline, such that other media play is not influenced even when errors occur. Such a pipeline is a chain for connecting unit functions such as decoding, analysis, output, etc. upon a media playback request, and required unit functions may be changed according to media type, etc.

The media server may have extensibility and may add a new type of pipeline without influencing an existing implementation method. For example, the media server may accommodate a camera pipeline, a video conference (Skype) pipeline, a third-party pipeline, etc. The media server may process general media playback and TV task execution as separate services because the interface of the TV service is different from that of media playback. The media server supports operation such as "setchannel", "channelup", "channeldown", "channeltuning" and "recordstart" in relation to the TV service and support operation such as "play", "pause" and "stop" in relation to general media playback, that is, supports different operations with respect to the TV service and general media playback and processes the TV service and media playback as separate services.

The media server may control or manage a resource management function. Hardware resource assignment or recovery in a device is conducted by the media server. In particular, the TV service process delivers a task which is being executed and a resource assignment status to the media server. The media server secures resources to execute a pipeline whenever media is executed, allows media execution due to priority (e.g., policy) upon media execution request, and performs resource recovery of another pipeline, based on a resource status of each pipeline. The predefined execution priority and resource information necessary for a specific request are managed by a policy manager and the resource manager communicates with the policy manager to process resource assignment and recovery.

The media server may have identifiers (IDs) for all operations related to playback. For example, the media server may send a command to a specific pipeline based on the ID. The media server may send respective commands to pipelines for playback of two or more media. The media server is responsible for playing back a HTML5 standard media.

The media server performs a service process of a TV pipeline according to a TV restructuralization range. The media server may be designed and implemented regardless of the TV restructuralization range. If the separate service process of the TV is not performed, the TV may be wholly re-executed when errors occurs in a specific task. The media server is also referred to as uMS, that is, a micro media server. The media player is a media client and means WebKit for HTML5 video tag, camera, TV, Skype or second screen, for example.

The media server mainly manages micro resources such as a resource manager or a policy manager. The media server also controls playback of web standard media content. The media server may manage pipeline controller resources. The media server supports extensibility, reliability, efficient resource usage, etc., for example. In other words, the uMS, that is, the micro media server, manages and controls resource usage for appropriate processing within the WebOS device, such as resources such as cloud game, MVPD (pay service, etc.), camera preview, second screen or Skype, and TV resources. A pipeline is used upon usage of each resource, for example, and the media server may manage and control generation, deletion, use of a pipeline for resource management.

The pipeline may be generated when a media related to a task starts a sequence of request, decoding streaming and parsing such as video output. For example, in association with a TV service and an application, watching, recording, channel tuning, etc. are controlled and performed via pipelines individually generated according to requests thereof with respect to resource usage.

Referring to FIG. 10, a processing structure of a media server will be described in detail. In FIG. 10, an application or service is connected to a media server 1020 via a Luna-service bus 1010 and the media server 1020 is connected to and managed by pipelines generated via the Luna-service bus 1010. The application or service includes various clients according to properties thereof and may exchange data with the media server 1020 or the pipeline via the clients.

The clients include a uMedia client (WebKit) for connection with the media server 1020 and a resource manager (RM) client (C/C++), for example. The application including the uMedia client is connected to the media server 1020 as described above. More specifically, the uMedia client corresponds to the below-described video object, for example, and uses the media server 1020, for video operation by a request, etc.

The video operation relates to a video status and may include all status data related to the video operation, such as loading, unloading, play (playback or reproduction), pause, stop, etc. Such video operations or statuses may be processed by generating individual pipelines. Accordingly, the uMedia client transmits status data related to the video operation to the pipeline manager 1022 in the media server.

The media server 1022 acquires information about resources of the current device via data communication with the resource manager 1024 and requests assignment of resources corresponding to the status data of the uMedia client. At this time, the pipeline manager 1022 or the resource manager 1024 controls resource assignment via data communication with the policy manager 1026 if necessary. For example, if resources to be assigned according to the request of the pipeline manager 1022 are not present or are lacking in the resource manager 1024, resource assignment may be appropriately performed according to priority comparison of the policy manager 1026.

The pipeline manager 1022 requests to generate a pipeline for operation according to the request of the uMedia client from the media pipeline controller 102, with respect to resources assigned according to resource assignment of the resource manager 1024. The media pipeline controller 1028 generates a necessary pipeline under control of the pipeline manager 1022. As shown, a media pipeline, a camera pipeline, a pipeline related to playback, pause or stop may be generated. The pipeline includes pipelines for HTML5, web CP, Smartshare playback, thumbnail extraction, NDK, cinema, multimedia and hypermedia information coding experts group (MHEG), etc. The pipeline may include a service-based pipeline and a URI based pipeline (media pipeline), for example.

Referring to FIG. 10, the application or service including the RM client may not be directly connected to the media server 1020, because the application or service can directly process a media. In other words, if the application or service directly processes a media, the media server may not be used. At this time, for pipeline generation and usage, resource management is necessary and, at this time, a uMS connector is used. When a resource management request for direct media processing of the application or service is received, the uMS connector communicates with the media server 1020 including the resource manager 1024. The media server 1020 also includes a uMS connector.

Accordingly, the application or service may cope with the request of the RM client via resource management of the resource manager 1024 via the uMS connector. The RM client may process services such as native CP, TV service, second screen, flash player, You Tube media source extensions (MSE), cloud game, Skype, etc. In this instance, as described above, the resource manager 1024 may manage resources via appropriate data communication with the policy manager 1026 if necessary for resource management.

The URI based pipeline does not directly process the media unlike the above-RM client but processes the media via the media server 1020. The URI based pipeline may include player factory, Gstreamer, streaming plug-in, digital rights management (DRM) plug-in pipelines. An interface method between the application and the media services is as follows.

An interface method using a service in a web application may be used. In this method, a Luna call method using a palm service bridge (PSB) and a method of using Cordova may be used, in which a display is extended to a video tag. In addition, a method of using HTML5 standard related to a video tag or media element may be used. A method of using a service in PDK may be used.

Alternatively, a method of using in existing CP may be used. For backward compatibility, plug-in of an existing platform may be extended and used based on Luna. Lastly, an interface method using a non-WebOS may be used. In this instance, a Luna bus may be directly called to perform interfacing.

Seamless change is processed by a separate module (e.g., TVwin) and refers to a process of first displaying a TV program on a screen without a WebOS before or duration WebOS booting and then performing seamless processing. This is used for the purpose of first providing a basic function of a TV service, for fast response to a power-on request of a user, because a booting time of a WebOS is late. The module is a part of a TV service process and supports seamless change for providing fast booting and a basic TV function, factory mode, etc. The module is responsible for switching from the non-WebOS mode to the WebOS mode.

FIG. 11 shows the processing structure of the media server. In FIG. 11, a solid box denotes a process component and a dotted box denotes an internal processing module of the process. A solid arrow denotes an inter-process call, that is, a Luna-service call and a dotted arrow denotes notification such as register/notify or data flow. The service, the web application or the PDK application (hereinafter, referred to as "application") is connected to various service processing components via a Luna-service bus and is operated or controlled via the service processing components.

A data processing path is changed according to application type. For example, if the application includes image data related to a camera sensor, the image data is transmitted to and processed by a camera processor 1130. At this time, the camera processor 1130 includes a gesture or face detection module and processes image data of the received application. The camera processor 1130 may generate a pipeline via a media server processor 1110 with respect to data which requires use of a pipeline according to user selection or automatically and process the data.

Alternatively, if the application includes audio data, the audio may be processed via an audio processor (AudioD) 1140 and an audio module (PulseAudio) 1150. For example, the audio processor 1140 processes the audio data received from the application and transmits the processed audio data to the audio module 1150. At this time, the audio processor 1140 may include an audio policy manager to determine processing of the audio data. The processed audio data is processed by the audio module 1150. The application or a pipeline related thereto may notify the audio module 1150 of data related to audio data processing. The audio module 1150 includes advanced Linux sound architecture (ALSA).

Alternatively, if the application includes or processes (hereinafter, referred to as "includes") content subjected to DRM, the content data is transmitted to a DRM service processor 1160 and the DRM service processor 1160 generates a DRM instance and processes the content data subjected to DRM. The DRM service processor 1160 is connected to a DRM pipeline in a media pipeline via a Luna-service bus, for processing of the content data subjected to DRM.

Hereinafter, processing of an application including media data or TV service data (e.g., broadcast data) will be described. FIG. 12 shows the media server processor and the TV service processor of FIG. 11 in detail. Accordingly, a description will be given with reference to FIGS. 11 and 12. First, if the application includes TV service data, the application is processed by the TV service processor 1120/1220.

The TV service processor 1120 includes at least one of a DVR/channel manager, a broadcast module, a TV pipeline manager, a TV resource manager, a data broadcast module, an audio setting module, a path manager, etc., for example. In FIG. 12, the TV service processor 1220 may include a TV broadcast handler, a TV broadcast interface, a service processor, TV middleware (MW), a path manager and a BSP (NetCast). The service processor may mean a module including a TV pipeline manager, a TV resource manager, a TV policy manager, a USM connector, etc., for example. In the present specification, the TV service processor may have the configuration of FIG. 11 or FIG. 12 or a combination thereof. Some components may be omitted or other components may be added.

The TV service processor 1120/1220 transmits DVR or channel related data to a DVR/channel manager and transmits the DVR or channel related data to the TV pipeline manager to generate and process a TV pipeline, based on attribute or type of the TV service data received from the application. If the attribute or type of the TV service data is broadcast content data, the TV service processor 1120 generates and processes a TV pipeline via the TV pipeline manager, for processing of the data via a broadcast module.

Alternatively, a JavaScript standard object notation (json) file or a file written in c is processed by the TV broadcast handler and transmitted to the TV pipeline manager via a TV broadcast interface to generate and process a TV pipeline. In this instance, the TV broadcast interface may transmit the data or file passing through the TV broadcast handler to the TV pipeline manager based on TV service policy and refer to the data or file upon generating a pipeline.

The TV pipeline manager generates one or more pipelines according to a request for generation of a TV pipeline from the processing module or manager of the TV service processor, under control of the TV resource manager. The TV resource manager may be controlled by the TV policy manager, in order to request a resource assignment status for a TV service according to a request for generation of a TV pipeline of the TV pipeline manager, and may perform data communication with the media server processor 1110/1210 via a uMS connector. The resource manager in the media server processor 1110/1210 sends the resource assignment status for the TV service according to the request of the TV resource manager. For example, if the resource manager in the media server processor 1110/1210 determines that the resources for the TV service are already assigned, the TV resource manager may be notified that assignment of all resources is completed. At this time, the resource manager in the media server processor may remove a predetermined TV pipeline according to a predetermined criterion or priority of TV pipelines already assigned for the TV service along with notification and request generation of a TV pipeline for the requested TV service. Alternatively, the TV resource manager may appropriately remove a TV pipeline or may add or newly establish a TV pipeline according to a status report of the resource manager in the media server processor 1110/1210.

The BSP supports backward compatibility with an existing digital device. The generated TV pipelines may appropriately operate under control of the path manager in the processing procedure. The path manager may determine or control the processing path or procedure of the pipelines in consideration of the TV pipeline in the processing procedure and the operation of the pipelines generated by the media server processor 1110/1210.

Next, if the application includes media data, not TV service data, the application is processed by the media server processor 1110/1210. The media server processor 1110/1210 includes a resource manager, a policy manager, a media pipeline manager, a media pipeline controller, etc. As pipelines generated under control of the media pipeline manager and the media pipeline controller, a camera preview pipeline, a cloud game pipeline, a media pipeline, etc. may be generated. The media pipeline may include streaming protocol, auto/static streamer, DRM, etc. and the processing flow thereof may be determined under control of the path manager. For a detailed description of the processing procedure of the media server processor 1110/1210, refer to the description of FIG. 10 and a repeated description will be omitted. In the present specification, the resource manager in the media server processor 1110/1210 may perform resource management to a counter base, for example.

Figure 13B:
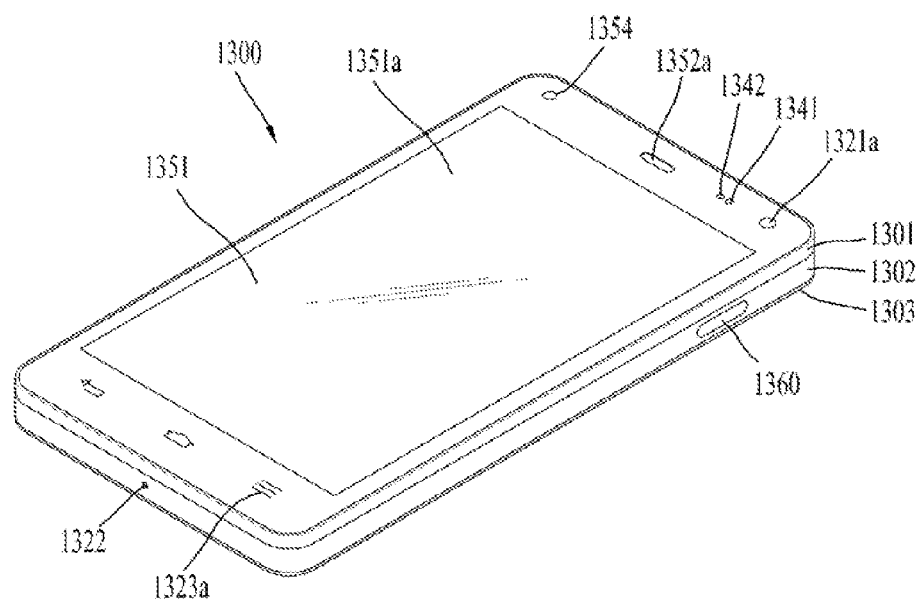
FIGS. 13b and 13c are conceptual views of one example of the mobile terminal, viewed from different directions.
Figure 13C:
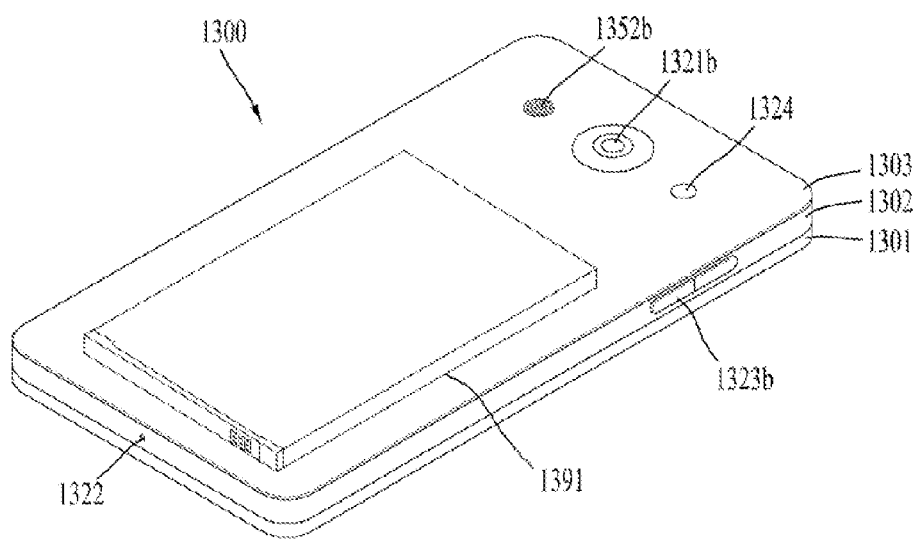

Reference is now made to FIGS. 13*a* and 13*c*, where FIG. 13*a* is a block diagram of a mobile terminal in accordance with the present invention, and FIGS. 13*b* and 13*c* are conceptual views of one example of the mobile terminal, viewed from different directions. The mobile terminal 1300 is shown having components such as a wireless communication unit 1310, an input unit 1320, a sensing unit 1340, an output unit 150, an interface unit 1360, a memory 1370, a controller 1380, and a power supply unit 1390. Implementing all of the illustrated components is not a requirement, and that greater or fewer components may alternatively be implemented.

Referring now to FIG. 13*a*, the mobile terminal 1300 is shown having wireless communication unit 1310 configured with several commonly implemented components. For instance, the wireless communication unit 1310 typically includes one or more components which permit wireless communication between the mobile terminal 1300 and a wireless communication system or network within which the mobile terminal is located.

The wireless communication unit 1310 typically includes one or more modules which permit communications such as wireless communications between the mobile terminal 1300 and a wireless communication system, communications between the mobile terminal 1300 and another mobile terminal, communications between the mobile terminal 1300 and an external server. Further, the wireless communication unit 1310 typically includes one or more modules which connect the mobile terminal 1300 to one or more networks. To facilitate such communications, the wireless communication unit 1310 includes one or more of a broadcast receiving module 111, a mobile communication module 1312, a wireless Internet module 1313, a short-range communication module 1314, and a location information module 1315.

The input unit 1320 includes a camera 121 for obtaining images or video, a microphone 1322, which is one type of audio input device for inputting an audio signal, and a user input unit 1323 (for example, a touch key, a push key, a mechanical key, a soft key, and the like) for allowing a user to input information. Data (for example, audio, video, image, and the like) is obtained by the input unit 1320 and may be analyzed and processed by controller 1380 according to device parameters, user commands, and combinations thereof.

The sensing unit 1340 is typically implemented using one or more sensors configured to sense internal information of the mobile terminal, the surrounding environment of the mobile terminal, user information, and the like. For example, in FIG. 1A, the sensing unit 1340 is shown having a proximity sensor 1341 and an illumination sensor 1342.

If desired, the sensing unit 1340 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 1322, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 1300 may be configured to utilize information obtained from sensing unit 1340, and in particular, information obtained from one or more sensors of the sensing unit 1340, and combinations thereof.

The output unit 1350 is typically configured to output various types of information, such as audio, video, tactile output, and the like. The output unit 1350 is shown having a display unit 1351, an audio output module 1352, a haptic module 1353, and an optical output module 1354. The display unit 1351 may have an inter-layered structure or an integrated structure with a touch sensor in order to facilitate a touch screen. The touch screen may provide an output interface between the mobile terminal 1300 and a user, as well as function as the user input unit 1323 which provides an input interface between the mobile terminal 1300 and the user.

The interface unit 1360 serves as an interface with various types of external devices that can be coupled to the mobile terminal 1300. The interface unit 1360, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 1300 may perform assorted control functions associated with a connected external device, in response to the external device being connected to the interface unit 1360.

The memory 1370 is typically implemented to store data to support various functions or features of the mobile terminal 1300. For instance, the memory 1370 may be configured to store application programs executed in the mobile terminal 1300, data or instructions for operations of the mobile terminal 1300, and the like. Some of these application programs may be downloaded from an external server via wireless communication. Other application programs may be installed within the mobile terminal 1300 at time of manufacturing or shipping, which is typically the case for basic functions of the mobile terminal 1300 (for example, receiving a call, placing a call, receiving a message, sending a message, and the like). It is common for application programs to be stored in the memory 1370, installed in the mobile terminal 1300, and executed by the controller 1380 to perform an operation (or function) for the mobile terminal 1300.

The controller 1380 typically functions to control overall operation of the mobile terminal 1300, in addition to the operations associated with the application programs. The controller 1380 may provide or process information or functions appropriate for a user by processing signals, data, information and the like, which are input or output by the various components depicted in FIG. 1A, or activating application programs stored in the memory 1370. As one example, the controller 1380 controls some or all of the components illustrated in FIGS. 13*a*-13*c* according to the execution of an application program that have been stored in the memory 1370.

The power supply unit 1390 can be configured to receive external power or provide internal power in order to supply appropriate power required for operating elements and components included in the mobile terminal 1300. The power supply unit 1390 may include a battery, and the battery may be configured to be embedded in the terminal body, or configured to be detachable from the terminal body.

Referring still to FIG. 13a, various components depicted in this figure will now be described in more detail. Regarding the wireless communication unit 1310, the broadcast receiving module 1311 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 1311 may be utilized to facilitate simultaneously receiving of two or more broadcast channels, or to support switching among broadcast channels.

The external broadcast managing entity is generally a system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 1311 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this instance, received by the mobile communication module 1312.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 1311 may be stored in a suitable device, such as a memory 1370.

The mobile communication module 1312 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 1312 include audio call signals, video (telephony) call signals, or various formats of data to support communication of text and multimedia messages.

The wireless Internet module 1313 is configured to facilitate wireless Internet access. This module may be internally or externally coupled to the mobile terminal 1300. The wireless Internet module 1313 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 1313 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 1313 performs such wireless Internet access. As such, the Internet module 1313 may cooperate with, or function as, the mobile communication module 1312.

The short-range communication module 1314 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 1314 in general supports wireless communications between the mobile terminal 1300 and a wireless communication system, communications between the mobile terminal 1300 and another mobile terminal 1300, or communications between the mobile terminal and a network where another mobile terminal 1300 (or an external server) is located, via wireless area networks. One example of the wireless area networks is a wireless personal area networks.

In some embodiments, another mobile terminal (which may be configured similarly to mobile terminal 1300) may be a wearable device, for example, a smart watch, a smart glass or a head mounted display (HMD), which can exchange data with the mobile terminal 1300 (or otherwise cooperate with the mobile terminal 1300). The short-range communication module 1314 may sense or recognize the wearable device, and permit communication between the wearable device and the mobile terminal 1300. In addition, when the sensed wearable device is a device which is authenticated to communicate with the mobile terminal 1300, the controller 1380, for example, may cause transmission of data processed in the mobile terminal 1300 to the wearable device via the short-range communication module 1314. Hence, a user of the wearable device may use the data processed in the mobile terminal 1300 on the wearable device. For example, when a call is received in the mobile terminal 1300, the user may answer the call using the wearable device. Also, when a message is received in the mobile terminal 1300, the user can check the received message using the wearable device.

The location information module 1315 is generally configured to detect, calculate, derive or otherwise identify a position of the mobile terminal. As an example, the location information module 1315 includes a Global Position System (GPS) module, a Wi-Fi module, or both. If desired, the location information module 1315 may alternatively or additionally function with any of the other modules of the wireless communication unit 1310 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 1320 may be configured to permit various types of input to the mobile terminal 1300. Examples of such input include audio, image, video, data, and user input. Image and video input is often obtained using one or more cameras 1321. Such cameras 1321 may process image frames of still pictures or video obtained by image sensors in a video or image capture mode. The processed image frames can be displayed on the display unit 1351 or stored in memory 1370. In some cases, the cameras 1321 may be arranged in a matrix configuration to permit a plurality of images having various angles or focal points to be input to the mobile terminal 1300. As another example, the cameras 1321 may be located in a stereoscopic arrangement to acquire left and right images for implementing a stereoscopic image.

The microphone 1322 is generally implemented to permit audio input to the mobile terminal 1300. The audio input can be processed in various manners according to a function being executed in the mobile terminal 1300. If desired, the microphone 1322 may include assorted noise removing algorithms to remove unwanted noise generated in the course of receiving the external audio.

The user input unit 1323 is a component that permits input by a user. Such user input may enable the controller 1380 to control operation of the mobile terminal 1300. The user input unit 1323 may include one or more of a mechanical input element (for example, a key, a button located on a front and/or rear surface or a side surface of the mobile terminal 1300, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 1340 is generally configured to sense one or more of internal information of the mobile terminal, surrounding environment information of the mobile terminal, user information, or the like. The controller 1380 generally cooperates with the sending unit 1340 to control operation of the mobile terminal 1300 or execute data processing, a function or an operation associated with an application program installed in the mobile terminal based on the sensing provided by the sensing unit 1340. The sensing unit 1340 may be implemented using any of a variety of sensors, some of which will now be described in more detail.

The proximity sensor 1341 may include a sensor to sense presence or absence of an object approaching a surface, or an object located near a surface, by using an electromagnetic field, infrared rays, or the like without a mechanical contact. The proximity sensor 1341 may be arranged at an inner region of the mobile terminal covered by the touch screen, or near the touch screen.

The proximity sensor 1341, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 1341 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 1341 may sense proximity touch, and proximity touch patterns (for example, distance, direction, speed, time, position, moving status, and the like).

In general, controller 1380 processes data corresponding to proximity touches and proximity touch patterns sensed by the proximity sensor 1341, and cause output of visual information on the touch screen. In addition, the controller 1380 can control the mobile terminal 1300 to execute different operations or process different data according to whether a touch with respect to a point on the touch screen is either a proximity touch or a contact touch.

A touch sensor can sense a touch applied to the touch screen, such as display unit 1351, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 1351, or convert capacitance occurring at a specific part of the display unit 1351, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 1380. Accordingly, the controller 1380 may sense which region of the display unit 1351 has been touched. Here, the touch controller may be a component separate from the controller 1380, the controller 1380, and combinations thereof.

In some embodiments, the controller 1380 may execute the same or different controls according to a type of touch object that touches the touch screen or a touch key provided in addition to the touch screen. Whether to execute the same or different control according to the object which provides a touch input may be decided based on a current operating state of the mobile terminal 1300 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 1380, for example, may calculate a position of a wave generation source based on information sensed by an illumination censor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 1321 typically includes at least one a camera sensor (CCD, CMOS etc.), a photo sensor (or image sensors), and a laser sensor Implementing the camera 1321 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 1351 is generally configured to output information processed in the mobile terminal 1300. For example, the display unit 1351 may display execution screen information of an application program executing at the mobile terminal 1300 or user interface (UI) and graphic user interface (GUI) information in response to the execution screen information. In some embodiments, the display unit 1351 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 1352 is generally configured to output audio data. Such audio data may be obtained from any of a number of different sources, such that the audio data may be received from the wireless communication unit 1310 or may have been stored in the memory 1370. The audio data may be output during modes such as a signal reception mode, a call mode, a record mode, a voice recognition mode, a broadcast reception mode, and the like. The audio output module 1352 can provide audible output related to a particular function (e.g., a call signal reception sound, a message reception sound, etc.) performed by the mobile terminal 1300. The audio output module 1352 may also be implemented as a receiver, a speaker, a buzzer, or the like.

A haptic module 1353 can be configured to generate various tactile effects that a user feels, perceive, or otherwise experience. A typical example of a tactile effect generated by the haptic module 1353 is vibration. The strength, pattern and the like of the vibration generated by the haptic module 1353 can be controlled by user selection or setting by the controller. For example, the haptic module 1353 may output different vibrations in a combining manner or a sequential manner.

Besides vibration, the haptic module 1353 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 1353 can also be implemented to allow the user to feel a tactile effect through a muscle sensation such as the user's fingers or arm, as well as transferring the tactile effect through direct contact. Two or more haptic modules 1353 may be provided according to the particular configuration of the mobile terminal 1300.

An optical output module 1354 can output a signal for indicating an event generation using light of a light source. Examples of events generated in the mobile terminal 1300 may include message reception, call signal reception, a missed call, an alarm, a schedule notice, an email reception, information reception through an application, and the like. A signal output by the optical output module 1354 may be implemented so the mobile terminal emits monochromatic light or light with a plurality of colors. The signal output may be terminated as the mobile terminal senses that a user has checked the generated event, for example.

The interface unit 1360 serves as an interface for external devices to be connected with the mobile terminal 1300. For example, the interface unit 1360 can receive data transmitted from an external device, receive power to transfer to elements and components within the mobile terminal 1300, or transmit internal data of the mobile terminal 1300 to such external device. The interface unit 1360 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 1300 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 1360.

When the mobile terminal 1300 is connected with an external cradle, the interface unit 1360 can serve as a passage to allow power from the cradle to be supplied to the mobile terminal 1300 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 1370 can store programs to support operations of the controller 1380 and store input/output data (for example, phonebook, messages, still images, videos, etc.). The memory 1370 may store data related to various patterns of vibrations and audio which are output in response to touch inputs on the touch screen. The memory 1370 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 1300 may also be operated in relation to a network storage device that performs the storage function of the memory 1370 over a network, such as the Internet.

The controller 1380 may typically control the general operations of the mobile terminal 1300. For example, the controller 1380 may set or release a lock state for restricting a user from inputting a control command with respect to applications when a status of the mobile terminal meets a preset condition. The controller 1380 can also perform the controlling and processing associated with voice calls, data communications, video calls, and the like, or perform pattern recognition processing to recognize a handwriting input or a picture drawing input performed on the touch screen as characters or images, respectively. In addition, the controller 1380 can control one or a combination of those components in order to implement various embodiments disclosed herein.

The power supply unit 1390 receives external power or provide internal power and supply the appropriate power required for operating respective elements and components included in the mobile terminal 1300. The power supply unit 1390 may include a battery, which is typically rechargeable or be detachably coupled to the terminal body for charging. The power supply unit 1390 may include a connection port. The connection port may be configured as one example of the interface unit 1360 to which an external charger for supplying power to recharge the battery is electrically connected.

As another example, the power supply unit 1390 may be configured to recharge the battery in a wireless manner without use of the connection port. In this example, the power supply unit 1390 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 13*b* and 13*c*, the mobile terminal 1300 is described with reference to a bar-type terminal body. However, the mobile terminal 1300 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 1300 will generally include a case (for example, frame, housing, cover, and the like) forming the appearance of the terminal. In this embodiment, the case is formed using a front case 1301 and a rear case 1302. Various electronic components are incorporated into a space formed between the front case 1301 and the rear case 1302. At least one middle case may be additionally positioned between the front case 1301 and the rear case 1302.

The display unit 1351 is shown located on the front side of the terminal body to output information. As illustrated, a window 1351*a* of the display unit 1351 may be mounted to the front case 1301 to form the front surface of the terminal body together with the front case 1301. In some embodiments, electronic components may also be mounted to the rear case 102. Examples of such electronic components include a detachable battery 1391, an identification module, a memory card, and the like. Rear cover 1303 is shown covering the electronic components, and this cover may be detachably coupled to the rear case 1302. Therefore, when the rear cover 1303 is detached from the rear case 1302, the electronic components mounted to the rear case 1302 are externally exposed.

As illustrated, when the rear cover 1303 is coupled to the rear case 1302, a side surface of the rear case 1302 is partially exposed. In some cases, upon the coupling, the rear case 1302 may also be completely shielded by the rear cover 1303. In some embodiments, the rear cover 1303 may include an opening for externally exposing a camera 1321*b* or an audio output module 1352*b*.

The cases 1301, 1302, 1303 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 1300 may be configured such that one case forms the inner space. In this example, a mobile terminal 1300 having a uni-body is formed so synthetic resin or metal extends from a side surface to a rear surface.

If desired, the mobile terminal 1300 may include a waterproofing unit for preventing introduction of water into the terminal body. For example, the waterproofing unit may include a waterproofing member which is located between the window 1351*a* and the front case 1301, between the front case 1301 and the rear case 1302, or between the rear case 1302 and the rear cover 1303, to hermetically seal an inner space when those cases are coupled.

FIGS. 13*b* and 13*c* depict certain components as arranged on the mobile terminal. However, alternative arrangements are possible and within the teachings of embodiments of the invention. Some components may be omitted or rearranged. For example, the first manipulation unit 1323*a* may be located on another surface of the terminal body, and the second audio output module 1352*b* may be located on the side surface of the terminal body.

The display unit 1351 outputs information processed in the mobile terminal 1300. The display unit 1351 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 1351 may be implemented using two display devices, which can implement the same or different display technology. For instance, a plurality of the display units 1351 may be arranged on one side, either spaced apart from each other, or these devices may be integrated, or these devices may be arranged on different surfaces.

The display unit 1351 may also include a touch sensor which senses a touch input received at the display unit. When a touch is input to the display unit 1351, the touch sensor may be configured to sense this touch and the controller 1380, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 1351*a* and a display on a rear surface of the window 1351*a*, or a metal wire which is patterned directly on the rear surface of the window 1351*a*. Alternatively, the touch sensor may be integrally formed with the display. For example, the touch sensor may be disposed on a substrate of the display or within the display.

The display unit 1351 may also form a touch screen together with the touch sensor. Here, the touch screen may serve as the user input unit 1323 (see FIG. 1A). Therefore, the touch screen may replace at least some of the functions of the first manipulation unit 1323*a*.

The first audio output module 1352*a* may be implemented in the form of a speaker to output voice audio, alarm sounds, multimedia audio reproduction, and the like. The window 1351*a* of the display unit 1351 will typically include an aperture to permit audio generated by the first audio output module 1352*a* to pass. One alternative is to allow audio to be released along an assembly gap between the structural bodies (for example, a gap between the window 1351*a* and the front case 1301). In this instance, a hole independently formed to output audio sounds may not be seen or is otherwise hidden in terms of appearance, thereby further simplifying the appearance and manufacturing of the mobile terminal 1300.

The optical output module 1354 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 1354 to stop the light output.

The first camera 1321*a* can process image frames such as still or moving images obtained by the image sensor in a capture mode or a video call mode. The processed image frames can then be displayed on the display unit 1351 or stored in the memory 1370. The first and second manipulation units 1323*a* and 1323*b* are examples of the user input unit 1323, which may be manipulated by a user to provide input to the mobile terminal 1300. The first and second manipulation units 1323*a* and 1323*b* may also be commonly referred to as a manipulating portion, and may employ any tactile method that allows the user to perform manipulation such as touch, push, scroll, or the like. The first and second manipulation units 1323*a* and 1323*b* may also employ any non-tactile method that allows the user to perform manipulation such as proximity touch, hovering, or the like.

FIG. 13*b* illustrates the first manipulation unit 1323*a* as a touch key, but possible alternatives include a mechanical key, a push key, a touch key, and combinations thereof. Input received at the first and second manipulation units 1323*a* and 1323*b* may be used in various ways. For example, the first manipulation unit 1323*a* may be used by the user to provide an input to a menu, home key, cancel, search, or the like, and the second manipulation unit 1323*b* may be used by the user to provide an input to control a volume level being output from the first or second audio output modules 1352*a* or 1352*b*, to switch to a touch recognition mode of the display unit 1351, or the like.

As another example of the user input unit 1323, a rear input unit may be located on the rear surface of the terminal body. The rear input unit can be manipulated by a user to provide input to the mobile terminal 1300. The input may be used in a variety of different ways. For example, the rear input unit may be used by the user to provide an input for power on/off, start, end, scroll, control volume level being output from the first or second audio output modules 1352*a* or 1352*b*, switch to a touch recognition mode of the display unit 1351, and the like. The rear input unit may be configured to permit touch input, a push input, or combinations thereof.

The rear input unit may be located to overlap the display unit 1351 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 1323*a* in the rear input unit. As such, in situations where the first manipulation unit 1323*a* is omitted from the front side, the display unit 1351 can have a larger screen. As a further alternative, the mobile terminal 1300 may include a finger scan sensor which scans a user's fingerprint. The controller 1380 can then use fingerprint information sensed by the finger scan sensor as part of an authentication procedure. The finger scan sensor may also be installed in the display unit 1351 or implemented in the user input unit 1323.

The microphone 1322 is shown located at an end of the mobile terminal 1300, but other locations are possible. If desired, multiple microphones may be implemented, with such an arrangement permitting the receiving of stereo sounds.

The interface unit 1360 may serve as a path allowing the mobile terminal 1300 to interface with external devices. For example, the interface unit 1360 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 1300. The interface unit 1360 may be implemented in the form of a socket for accommodating an external card, such as Subscriber Identification Module (SIM), User Identity Module (UIM), or a memory card for information storage.

The second camera 1321b is shown located at the rear side of the terminal body and includes an image capturing direction that is substantially opposite to the image capturing direction of the first camera unit 1321a. If desired, second camera 1321a may alternatively be located at other locations, or made to be moveable, in order to have a different image capturing direction from that which is shown.

The second camera 1321b can include a plurality of lenses arranged along at least one line. The plurality of lenses may also be arranged in a matrix configuration. The cameras may be referred to as an "array camera." When the second camera 1321b is implemented as an array camera, images may be captured in various manners using the plurality of lenses and images with better qualities.

As shown in FIG. 13c, a flash 1324 is shown adjacent to the second camera 1321b. When an image of a subject is captured with the camera 1321b, the flash 1324 may illuminate the subject. As shown in FIG. 13c, the second audio output module 1352b can be located on the terminal body. The second audio output module 1352b may implement stereophonic sound functions in conjunction with the first audio output module 1352a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 1311 may be retractable into the terminal body. Alternatively, an antenna may be formed using a film attached to an inner surface of the rear cover 1303, or a case that includes a conductive material.

A power supply unit 1390 for supplying power to the mobile terminal 1300 may include a battery 1391, which is mounted in the terminal body or detachably coupled to an outside of the terminal body. The battery 1391 may receive power via a power source cable connected to the interface unit 1360. Also, the battery 1391 can be recharged in a wireless manner using a wireless charger. Wireless charging may be implemented by magnetic induction or electromagnetic resonance.

The rear cover 1303 is shown coupled to the rear case 1302 for shielding the battery 191, to prevent separation of the battery 1391, and to protect the battery 1391 from an external impact or from foreign material. When the battery 1391 is detachable from the terminal body, the rear case 1303 may be detachably coupled to the rear case 1302.

An accessory for protecting an appearance or assisting or extending the functions of the mobile terminal 1300 can also be provided on the mobile terminal 1300. As one example of an accessory, a cover or pouch for covering or accommodating at least one surface of the mobile terminal 1300 may be provided. The cover or pouch may cooperate with the display unit 1351 to extend the function of the mobile terminal 1300. Another example of the accessory is a touch pen for assisting or extending a touch input to a touch screen.

Figure 14:
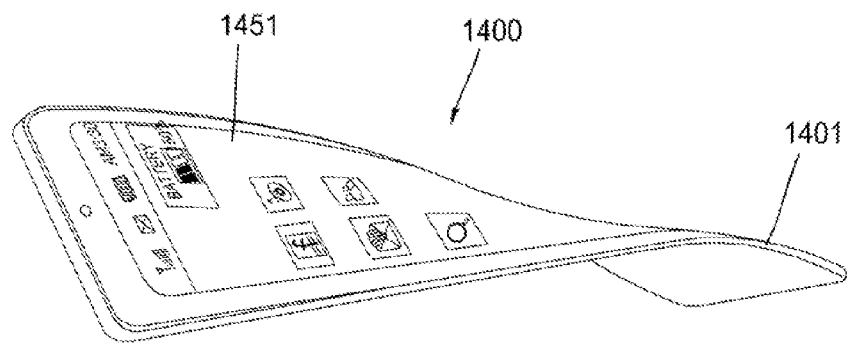
FIG. 14 is a conceptual view of a deformable mobile terminal according to an alternative embodiment of the present invention.

FIG. 14 is a conceptual view of a deformable mobile terminal according to an alternative embodiment of the present invention. In this figure, mobile terminal 1400 is shown having display unit 1451, which is a type of display that is deformable by an external force. This deformation, which includes display unit 1451 and other components of mobile terminal 1400, may include any of curving, bending, folding, twisting, rolling, and combinations thereof. The deformable display unit 1451 may also be referred to as a "flexible display unit." In some implementations, the flexible display unit 1451 may include a general flexible display, electronic paper (also known as e-paper), and combinations thereof. In general, mobile terminal 1400 may be configured to include features that are the same or similar to that of mobile terminal 1300 of FIGS. 13a-13c.

The flexible display of mobile terminal 1400 is generally formed as a lightweight, non-fragile display, which still exhibits characteristics of a conventional flat panel display, but is instead fabricated on a flexible substrate which can be deformed as noted previously. The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When the flexible display unit 1451 is not deformed (for example, in a state with an infinite radius of curvature and referred to as a first state), a display region of the flexible display unit 1451 includes a generally flat surface. When the flexible display unit 1451 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized so a light emission of each unit pixel (sub-pixel) arranged in a matrix configuration is controlled independently. The unit pixel denotes an elementary unit for representing one color.

According to one alternative embodiment, the first state of the flexible display unit 1451 may be a curved state (for example, a state of being curved from up to down or from right to left), instead of being in flat state. In this embodiment, when an external force is applied to the flexible display unit 1451, the flexible display unit 1451 may transition to the second state such that the flexible display unit is deformed into the flat state (or a less curved state) or into a more curved state.

If desired, the flexible display unit 1451 may implement a flexible touch screen using a touch sensor in combination with the display. When a touch is received at the flexible touch screen, the controller 1380 can execute certain control corresponding to the touch input. In general, the flexible touch screen is configured to sense touch and other input while in both the first and second states. One option is to configure the mobile terminal 1400 to include a deformation sensor which senses the deforming of the flexible display unit 1451. The deformation sensor may be included in the sensing unit 1340.

The deformation sensor may be located in the flexible display unit 1451 or the case 201 to sense information related to the deforming of the flexible display unit 1451. Examples of such information related to the deforming of the flexible display unit 251 may be a deformed direction, a deformed degree, a deformed position, a deformed amount of time, an acceleration that the deformed flexible display unit 1451 is restored, and the like. Other possibilities include most any type of information which can be sensed in response to the curving of the flexible display unit or sensed while the flexible display unit 251 is transitioning into, or existing in, the first and second states.

In some embodiments, controller 1380 or other component can change information displayed on the flexible display unit 1451, or generate a control signal for controlling a function of the mobile terminal 1400, based on the information related to the deforming of the flexible display unit 1451. Such information is typically sensed by the deformation sensor. The mobile terminal 1400 is shown having a case 1401 for accommodating the flexible display unit 1451. The case 1401 can be deformable together with the flexible display unit 1451, taking into account the characteristics of the flexible display unit 1451.

A battery located in the mobile terminal 1400 may also be deformable in cooperation with the flexible display unit 1461, taking into account the characteristic of the flexible display unit 1451. One technique to implement such a battery is to use a stack and folding method of stacking battery cells. The deformation of the flexible display unit 1451 not limited to perform by an external force. For example, the flexible display unit 1451 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 1300. In such a device, the wearable device generally has functionality that is less than the cooperating mobile terminal. For instance, the short-range communication module 1314 of a mobile terminal 1300 may sense or recognize a wearable device that is near-enough to communicate with the mobile terminal. In addition, when the sensed wearable device is a device which is authenticated to communicate with the mobile terminal 1300, the controller 1380 may transmit data processed in the mobile terminal 1300 to the wearable device via the short-range communication module 1314, for example. Hence, a user of the wearable device can use the data processed in the mobile terminal 1300 on the wearable device. For example, when a call is received in the mobile terminal 1300, the user can answer the call using the wearable device. Also, when a message is received in the mobile terminal 1300, the user can check the received message using the wearable device.

Figure 15:
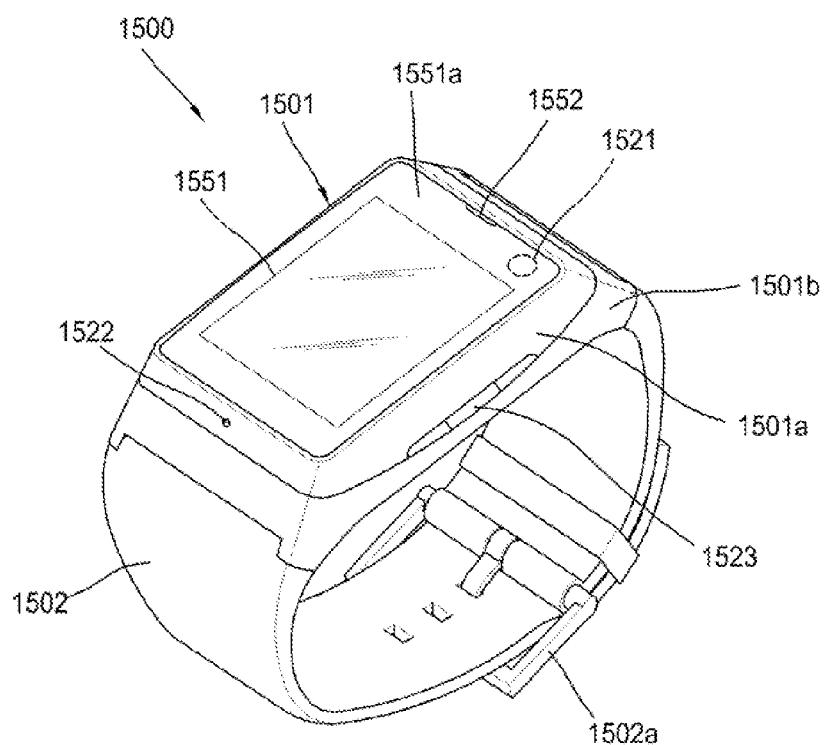
FIG. 15 is a conceptual view of a wearable mobile terminal according to another alternative embodiment of the present invention.

FIG. 15 is a perspective view illustrating one example of a watch-type mobile terminal 300 in accordance with another embodiment. As illustrated in FIG. 15, the watch-type mobile terminal 1500 includes a main body 1501 with a display unit 1551 and a band 1502 connected to the main body 301 to be wearable on a wrist. In general, mobile terminal 1500 may be configured to include features that are the same or similar to that of mobile terminal 1300 of FIGS. 13*a*-13*c*.

The main body 1501 may include a case having a certain appearance. As illustrated, the case may include a first case 1501*a* and a second case 1501*b* cooperatively defining an inner space for accommodating various electronic components. Other configurations are possible. For instance, a single case may alternatively be implemented, with such a case being configured to define the inner space, thereby implementing a mobile terminal 1500 with a uni-body.

The watch-type mobile terminal 1500 can perform wireless communication, and an antenna for the wireless communication can be installed in the main body 1501. The antenna may extend its function using the case. For example, a case including a conductive material may be electrically connected to the antenna to extend a ground area or a radiation area.

The display unit 1551 is shown located at the front side of the main body 301 so that displayed information is viewable to a user. In some embodiments, the display unit 1551 includes a touch sensor so that the display unit can function as a touch screen. As illustrated, window 1551*a* is positioned on the first case 1501*a* to form a front surface of the terminal body together with the first case 1501*a*.

The illustrated embodiment includes audio output module 1552, a camera 1521, a microphone 1522, and a user input unit 1523 positioned on the main body 1501. When the display unit 1551 is implemented as a touch screen, additional function keys may be minimized or eliminated. For example, when the touch screen is implemented, the user input unit 1523 may be omitted.

The band 1502 is commonly worn on the user's wrist and may be made of a flexible material for facilitating wearing of the device. As one example, the band 1502 may be made of fur, rubber, silicon, synthetic resin, or the like. The band 1502 may also be configured to be detachable from the main body 1501. Accordingly, the band 1502 may be replaceable with various types of bands according to a user's preference.

In one configuration, the band 1502 may be used for extending the performance of the antenna. For example, the band may include therein a ground extending portion electrically connected to the antenna to extend a ground area. The band 1502 may include fastener 1502*a*. The fastener 1502*a* may be implemented into a buckle type, a snap-fit hook structure, a Velcro® type, or the like, and include a flexible section or material. The drawing illustrates an example that the fastener 1502*a* is implemented using a buckle.

Figure 16:
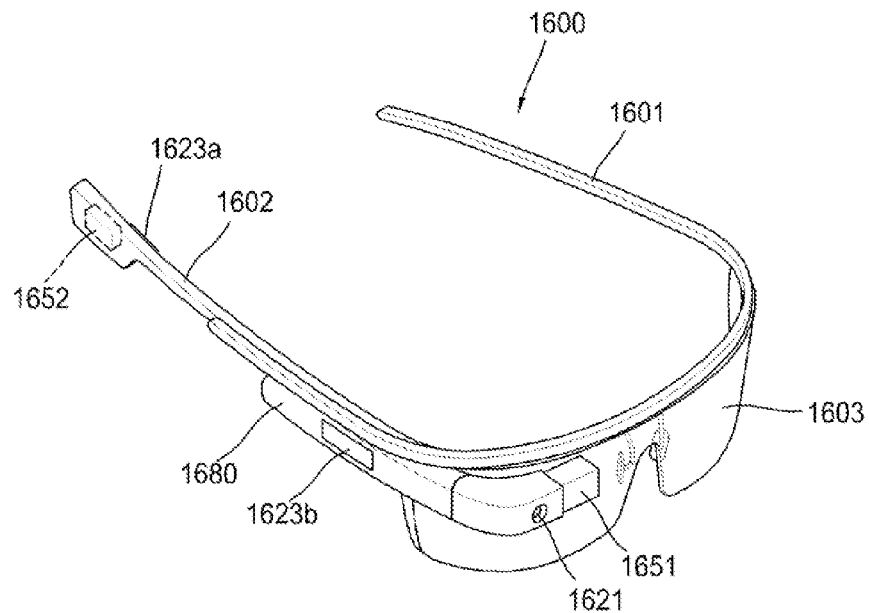
FIG. 16 is a conceptual view of a wearable mobile terminal according to another alternative embodiment of the present invention.

FIG. 16 is a perspective view illustrating one example of a glass-type mobile terminal 1600 according to another embodiment. The glass-type mobile terminal 1600 can be wearable on a head of a human body and provided with a frame (case, housing, etc.) therefor. The frame may be made of a flexible material to be easily worn. The frame of mobile terminal 1600 is shown having a first frame 1601 and a second frame 1602, which can be made of the same or different materials. In general, mobile terminal 1600 may be configured to include features that are the same or similar to that of mobile terminal 1300 of FIGS. 13*a*-13*c*.

The frame may be supported on the head and defines a space for mounting various components. As illustrated, electronic components, such as a control module 1680, an audio output module 1652, and the like, may be mounted to the frame part. Also, a lens 1603 for covering either or both of the left and right eyes may be detachably coupled to the frame part.

The control module 1680 controls various electronic components disposed in the mobile terminal 1600. The control module 1680 may be understood as a component corresponding to the aforementioned controller 1380. FIG. 16 illustrates that the control module 1680 is installed in the frame part on one side of the head, but other locations are possible.

The display unit 1651 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 1600, the display unit 1651 may be located to correspond to either or both of the left and right eyes. FIG. 16 illustrates that the display unit 1651 is located on a portion corresponding to the right eye to output an image viewable by the user's right eye.

The display unit 1651 may project an image into the user's eye using a prism. Also, the prism may be formed from optically transparent material such that the user can view both the projected image and a general visual field (a range that the user views through the eyes) in front of the user. In such a manner, the image output through the display unit 1651 may be viewed while overlapping with the general visual field. The mobile terminal 1600 may provide an augmented reality (AR) by overlaying a virtual image on a realistic image or background using the display.

The camera 1621 may be located adjacent to either or both of the left and right eyes to capture an image. Since the camera 1621 is located adjacent to the eye, the camera 1621 can acquire a scene that the user is currently viewing. The camera 1621 may be positioned at most any location of the mobile terminal. In some embodiments, multiple cameras 1621 may be utilized. Such multiple cameras 1621 may be used to acquire a stereoscopic image.

The glass-type mobile terminal 1600 may include user input units 1623a and 1623b, which can each be manipulated by the user to provide an input. The user input units 1623a and 1623b may employ techniques which permit input via a tactile input. Typical tactile inputs include a touch, push, or the like. The user input units 1623a and 1623b are shown operable in a pushing manner and a touching manner as they are located on the frame part and the control module 1680, respectively.

If desired, mobile terminal 1600 may include a microphone which processes input sound into electric audio data, and an audio output module 1652 for outputting audio. The audio output module 1652 may be configured to produce audio in a general audio output manner or an osteoconductive manner. When the audio output module 1652 is implemented in the osteoconductive manner, the audio output module 1652 may be closely adhered to the head when the user wears the mobile terminal 16400 and vibrate the user's skull to transfer sounds.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 1311 of FIG. 1A is typically configured inside the mobile terminal 1300 to receive broadcast signals transmitted by the BT. Global Positioning System (GPS) satellites for locating the position of the mobile terminal 1300, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 1315 is generally configured to detect, calculate, or otherwise identify a position of the mobile terminal. As an example, the location information module 1315 may include a Global Position System (GPS) module, a Wi-Fi module, or both. If desired, the location information module 1315 may alternatively or additionally function with any of the other modules of the wireless communication unit 1310 to obtain data related to the position of the mobile terminal.

A typical GPS module 1315 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 1300. This technology typically includes the use of a Wi-Fi module in the mobile terminal 1300 and a wireless access point for communicating with the Wi-Fi module. The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 1300, based on the location information request message (or signal) of the mobile terminal 1300. The information of the wireless AP may be transmitted to the Wi-Fi location determination server through the mobile terminal 1300, or may be transmitted to the Wi-Fi location determination server from the wireless AP.

The information of the wireless AP extracted based on the location information request message of the mobile terminal 1300 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 1300 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 1300 using at least one wireless AP information extracted from the database. A method for extracting (analyzing) location information of the mobile terminal 1300 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter. In addition to these position location methods, various algorithms may be used to extract (analyze) location information of a mobile terminal. Such extracted location information may be transmitted to the mobile terminal 1300 through the Wi-Fi location determination server, thereby acquiring location information of the mobile terminal 1300.

The mobile terminal 1300 can acquire location information by being connected to at least one wireless AP. The number of wireless APs required to acquire location information of the mobile terminal 1300 may be variously changed according to a wireless communication environment within which the mobile terminal 1300 is positioned. As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 1300 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

When the NFC module operates in a card mode, the mobile terminal may transmit card information on a general IC card to the outside. More specifically, if a mobile terminal having card information on a payment card (e.g., a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this instance, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. The present features can be embodied in several forms without departing from the characteristics thereof.

Figure 17:
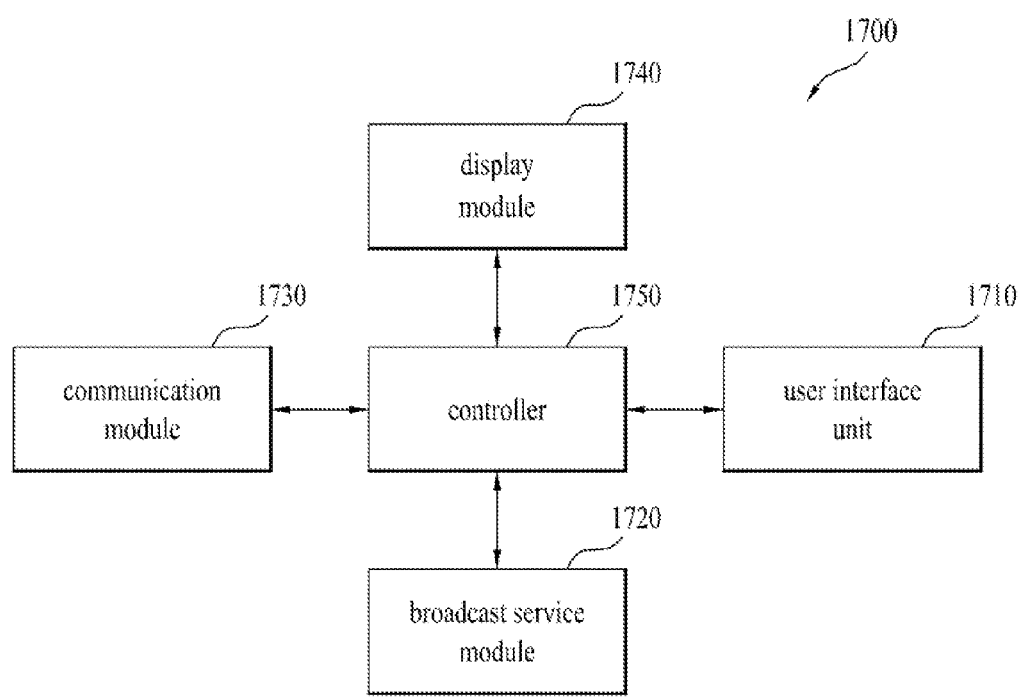
FIG. 17 is a block diagram illustrating configuration modules of a display device according to one embodiment of the present invention.

FIG. 17 is a block diagram illustrating configuration modules of a display device according to a different embodiment of the present invention. The modules of the display device shown in FIG. 17 can be added or modified with reference to the aforementioned FIG. 1 to FIG. 16. The scope of right of the present invention is not determined by elements described in FIG. 1 to FIG. 17. Instead, the scope of right of the present invention should be construed according to items written on the claims in principle. As shown in FIG. 17, a display device 1700 according to a different embodiment of the present invention includes a user interface unit 1730, a broadcast service module 1720, a communication module 1730, a display module 1740, a controller 1750 and the like.

The user interface unit 1710 can receive an input of a specific signal from a user. The user interface unit 1710 can receive a web browser output request signal and specific web address information from a user. The user interface unit 1710 can receive a specific signal via a touch panel, which is connected with the display module 1740 of the display device 1700, and can receive a specific signal using an IR (infrared ray) signal received from a sensor module.

The broadcast service module 1720 receives a broadcast signal including a broadcast program data from a broadcasting station, a CP (content provider) and the like and can process the received broadcast signal. The broadcast service module 1720 can include a tuner, a demultiplexer, an image decoder, a scalar, a mixer, a frame rate converter, a formatter and the like. The broadcast service module 1720 receives a broadcast signal, decodes the received broadcast signal and can transmit broadcast time information included in the broadcast signal to the controller 1750.

The communication module 1730 can perform data communication with an external device or an external server using various wired/wireless communication protocols. The external device can include a bio device and a mobile device. The external server can include a domain name server.

The display module 1740 processes content data corresponding to at least one or more contents received by the display device according to one embodiment of the present invention and can display the content data on a screen. The content data can be received from a broadcast receiver performing data communication with the display device 1700. The display module 1740 can display the at least one or more contents on a screen with a screen format identical to a screen format displayed by a private broadcast receiver. The display module 1740 determines a screen size by processing the content data based on a screen size of the display device 1700 and can display the content data.

The controller 1750 performs a function of generally managing functions of at least one or more modules shown in FIG. 17 including the user interface unit 1710, the broadcast service module 1720, the communication module 1730, the display module 1740 and the like. Regarding this, it shall be described in more detail with reference to FIG. 18 to FIG. 58 in the following.

Figure 18:
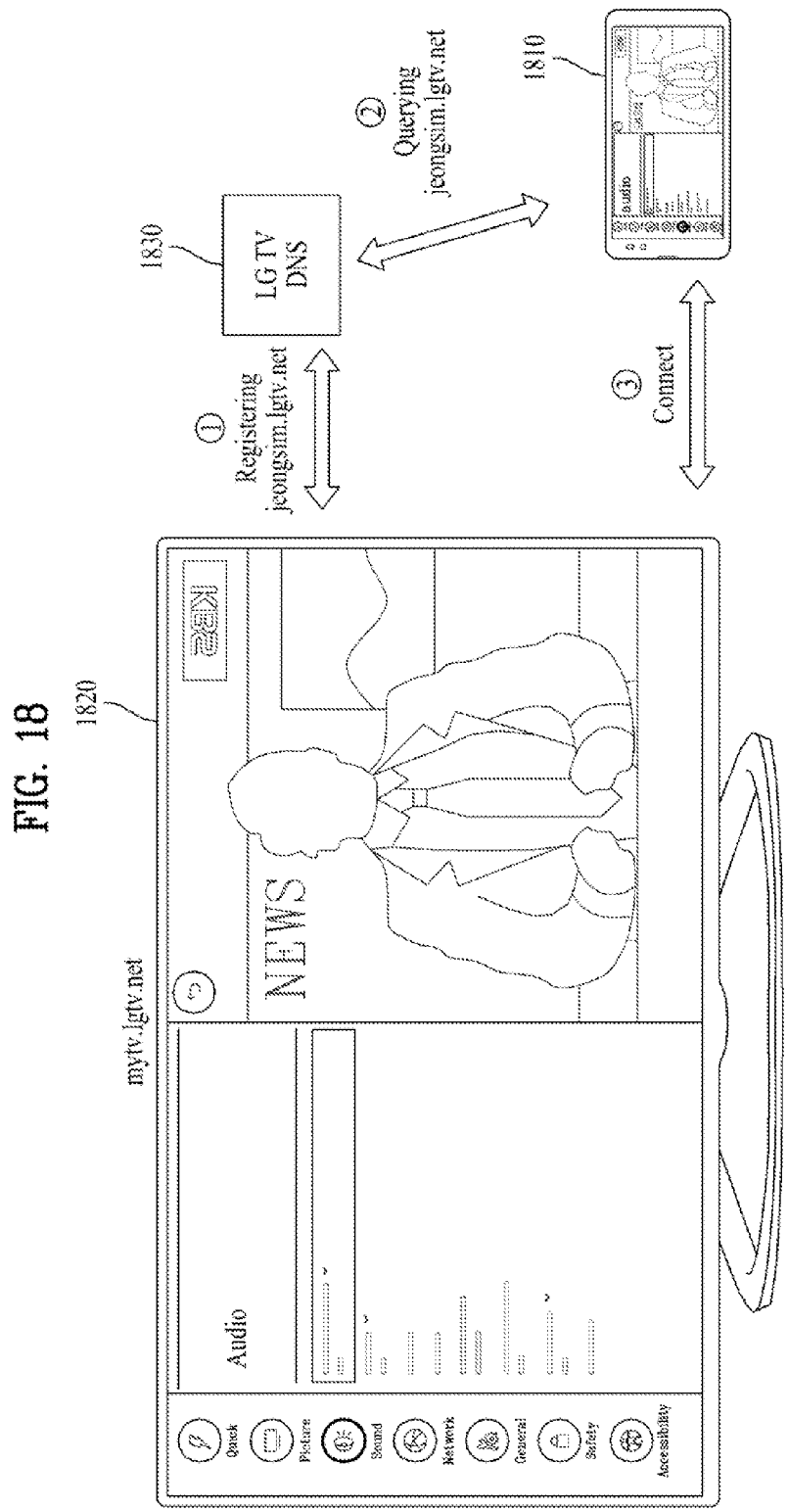
FIG. 18 is a diagram illustrating an example that a display device accesses a broadcast receiver using a web browser according to one embodiment of the present invention.

FIG. 18 is a diagram illustrating an example that a display device accesses a broadcast receiver using a web browser according to one embodiment of the present invention. According to one embodiment of the present invention, a controller of a display device 1810 accesses a web address corresponding to the broadcast receiver via a web browser, receives IP (internet protocol) address information, which is mapped to the web address, from a DNS (domain name server), accesses the broadcast receiver using the received IP address, receives content data displayed on the broadcast receiver and can display the content data on a screen.

The web address can be automatically generated based on a user name set to the broadcast receiver. The DNS can store a MAC address, a web address and an IP address of the broadcast receiver by mapping to each other. The DNS receives the IP address of the broadcast receiver from a DHCP (dynamic host configuration protocol) server with a predetermined interval to update the IP address of the broadcast receiver.

Having received a transmission request signal of an IP address corresponding to the web address, the DNS receives allocation of the IP address of the broadcast receiver from the DHCP server and can then transmit the IP address to the display device.

As shown in FIG. 18, a display device 1810 according to one embodiment of the present invention can perform data communication with a broadcast receiver 1820 via a web browser. A web address of the broadcast receiver 1820 itself can be automatically generated by the device according to a name set to the broadcast receiver 1820. The broadcast receiver 1820 can register the web address at a DNS (domain name server) 1830. The DNS 1830 can store a MAC address, a web address and an IP address of the broadcast receiver 1820 by mapping to each other. If a user inputs the web address by executing a web browser included in the display device 1810, a controller of the display device 1810 according to one embodiment of the present invention can receive IP address information mapped to the web address from the DNS. The controller of the display device 1810 according to one embodiment of the present invention can directly perform data communication with the broadcast receiver 1820 using the received IP address.

In this instance, the controller of the display device 1810 according to one embodiment of the present invention receives content data displayed on the broadcast receiver 1820 and can control the content data to be displayed on a screen of the display device. In this instance, a screen identical to a screen displayed on the broadcast receiver 1820 in size can be displayed on the screen of the display device as it is. Or, a screen different from the screen displayed on the broadcast receiver 1820 in size can be displayed on the screen of the display device based on a screen size of the display device 1810. In particular, if the data of the content displayed on the broadcast receiver 1820 is received, the controller of the display device 1810 according to one embodiment of the present invention reprocesses the data of the content based on the screen size of the display device and can control the data of the content to be displayed on the screen of the display device.

Figure 19:
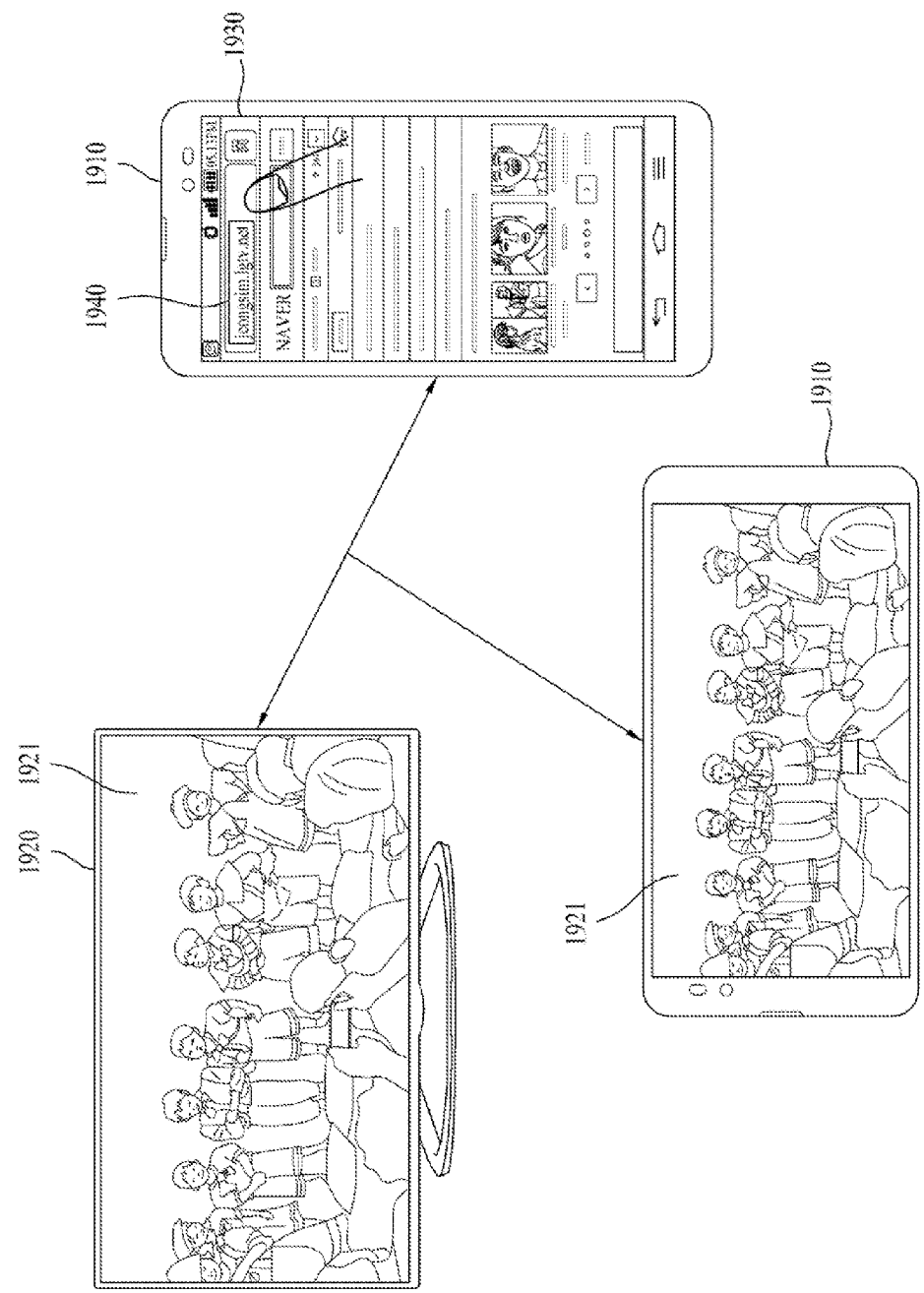
FIG. 19 is a diagram illustrating a different example that a display device accesses a broadcast receiver using a web browser according to one embodiment of the present invention.

FIG. 19 is a diagram illustrating a different example that a display device accesses a broadcast receiver using a web browser according to one embodiment of the present invention. As shown in FIG. 19, if a user inputs a web address 1940 corresponding to a broadcast receiver 1920 via a web browser 1930 and accesses the broadcast receiver, a controller of a display device 1910 according to one embodiment of the present invention receives data of contents 1921 displayed on the broadcast receiver 1920 and can control the content to be displayed on a screen of the display device using the data of the received contents 1921. In this instance, the display device 1910 according to one embodiment of the present invention can control the contents 1921 to be displayed on the screen of the display device in a horizontal mode according to a type of the contents displayed on the broadcast receiver 1920. For instance, as shown in FIG. 19, if the contents correspond to a real-time broadcast program, the controller can control the real-time broadcast program to be displayed on the screen of the display device in the horizontal mode.

In addition, if a user inputs a web address corresponding to the broadcast receiver 1920 using a web browser 1940 and accesses the broadcast receiver, a controller of a display device 1910 according to one embodiment of the present invention can control contents identical to contents currently displayed on the broadcast receiver 1920 to be displayed or can control a predetermined home screen (not depicted) of the broadcast receiver 1920 to be displayed.

Figure 20:
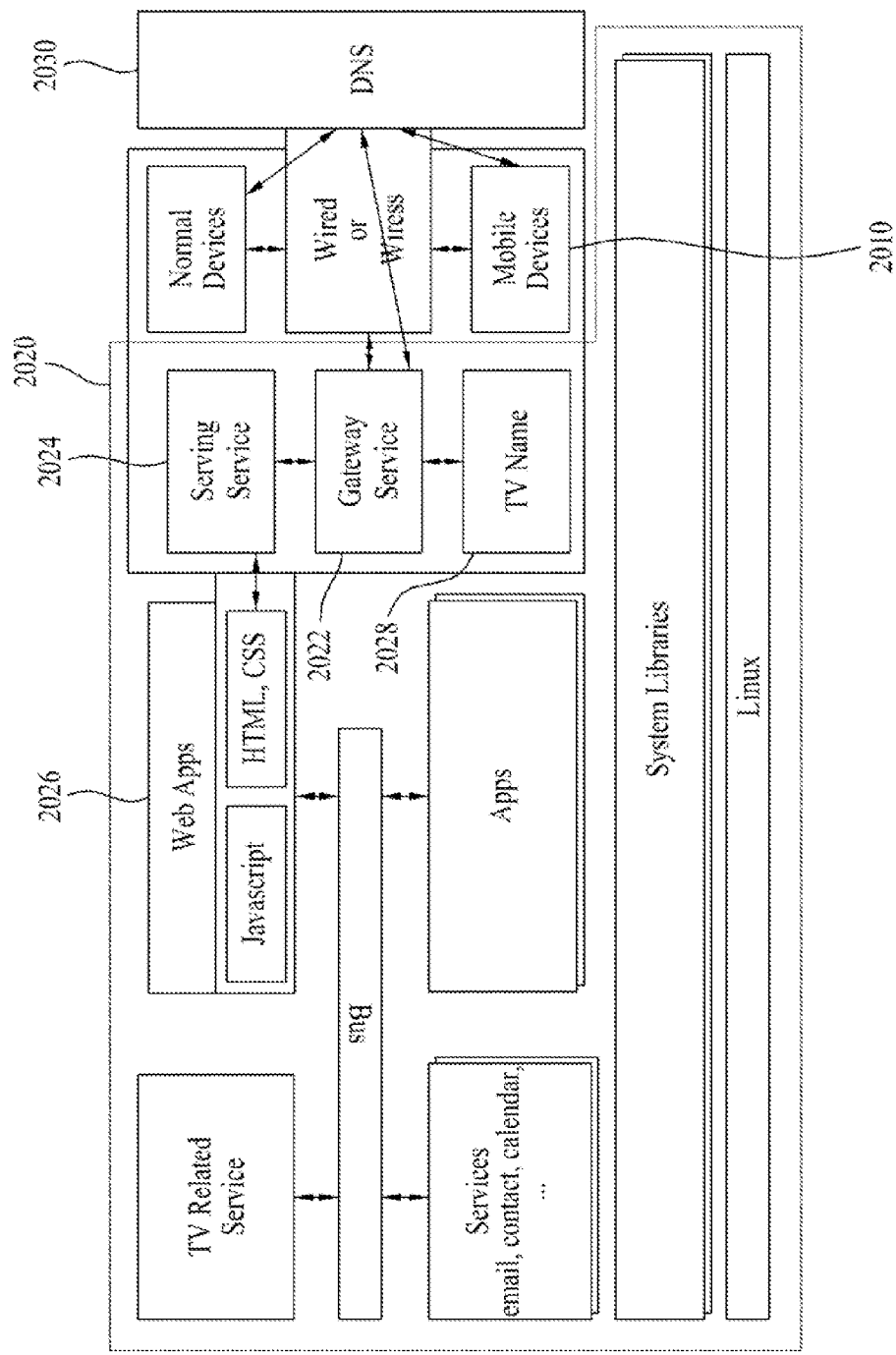
FIG. 20 is a diagram illustrating an example that a display device performs data communication with a broadcast receiver according to one embodiment of the present invention.

FIG. 20 is a diagram illustrating an example that a display device performs data communication with a broadcast receiver according to one embodiment of the present invention. As shown in FIG. 20, a broadcast receiver 2020, which performs data communication with a display device 2010 according to one embodiment of the present invention, can include a serving service 2024 and a gateway service 2022 and can transceive data between a DNS 2030 and the display device 2010 via the gateway service 2022. The broadcast receiver 2020 can include at least one or more applications 2026 and the applications 2026 can include a real-time broadcast program application, a channel information application, an EPG (electronic program guide) application, a setting application and a user setting application. In addition, the applications can be generated using a web language including Java script, HTML (hypertext markup language) and CSS (cascading style sheets). The broadcast receiver 2020 can register a web address of the broadcast receiver 2020 automatically generated based on a name 2028 of the broadcast receiver, which is generated by a user or automatically, at the DNS 2030 via the gateway service 2022. In this instance, the DNS 2030 can store a MAC address, a web address and an IP address of the broadcast receiver 2020 by mapping to each other.

If the display device 2010 according to one embodiment of the present invention receives the IP address of the broadcast receiver 2020 from the DNS 2030, accesses the broadcast receiver 2020 and requests data transmission of a specific application 2026 included in the broadcast receiver 2020, the broadcast receiver 2020 does not process data of the specific application 2026 configured by Java script, HTML, CSS and the like and delivers the data to the serving service 2024 as it is. The serving service 2024 delivers the data of the application 2026 to the gateway service 2022 to transmit the data to the display device 2010.

The controller of the display device 2010 according to one embodiment of the present invention can control the data of the specific application 2026 to be displayed on a screen as it is. When designing a broadcast receiver and a display device as mentioned earlier in FIG. 18 to FIG. 20, the display device such as a smartphone can use application data included in a broadcast receiver as it is without an additional processing step. Hence, unlike a legacy pairing or N-screen, it can implement a fast and efficient technical effect. Moreover, similar to accessing a web server via a web browser, a user can access a broadcast receiver without such an additional process as a Bluetooth connection process like a legacy pairing and can use all contents of the broadcast receiver on such a display device as a smartphone.

Figure 21:
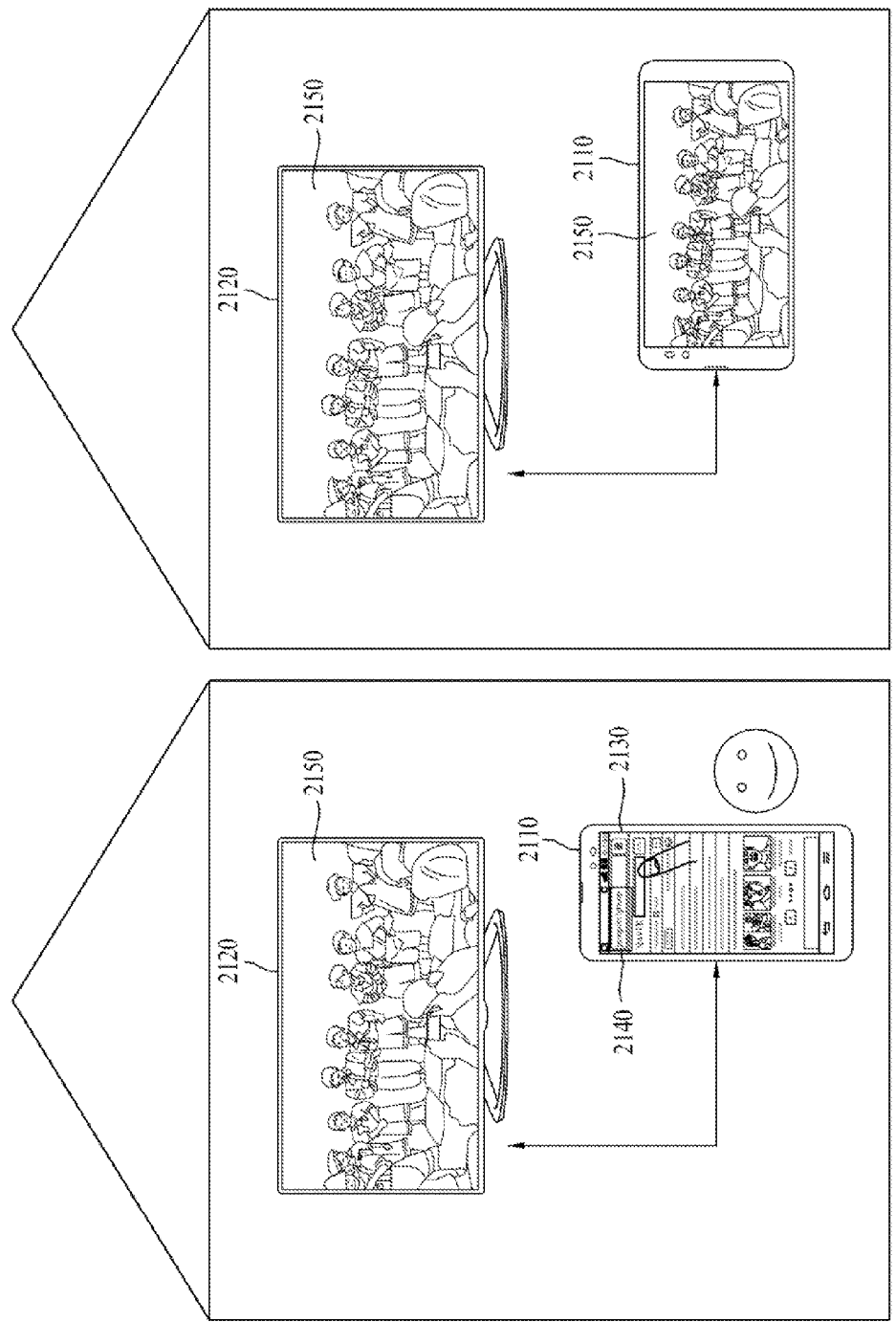
FIG. 21 is a diagram illustrating an example that a display device accesses a broadcast receiver positioned at a short distance according to one embodiment of the present invention.

FIG. 21 is a diagram illustrating an example that a display device accesses a broadcast receiver positioned at a short distance according to one embodiment of the present invention. As shown in FIG. 21, if a user inputs a web address 2140 corresponding to a broadcast receiver 2120 via a web browser 2130 and accesses the broadcast receiver, a controller of a display device 2110 according to one embodiment of the present invention receives data of contents 2150 displayed on the broadcast receiver 2120 and can control the content 2150 to be displayed on a screen of the display device using the data of the received contents 2150.

And, as shown in FIG. 21, if a user inputs a web address corresponding to a broadcast receiver 2120 using a web browser 2140 of a display device 2110 such as a smartphone and accesses the broadcast receiver in a short distance from the broadcast receiver located at the inside of a house, the display device can control contents identical to contents 2150 currently displayed on the broadcast receiver 2120 to be displayed on a screen of the display device. Or, the display device can control a predetermined home screen (not depicted) of the broadcast receiver 2120 to be displayed on the screen of the display device.

Figure 22:
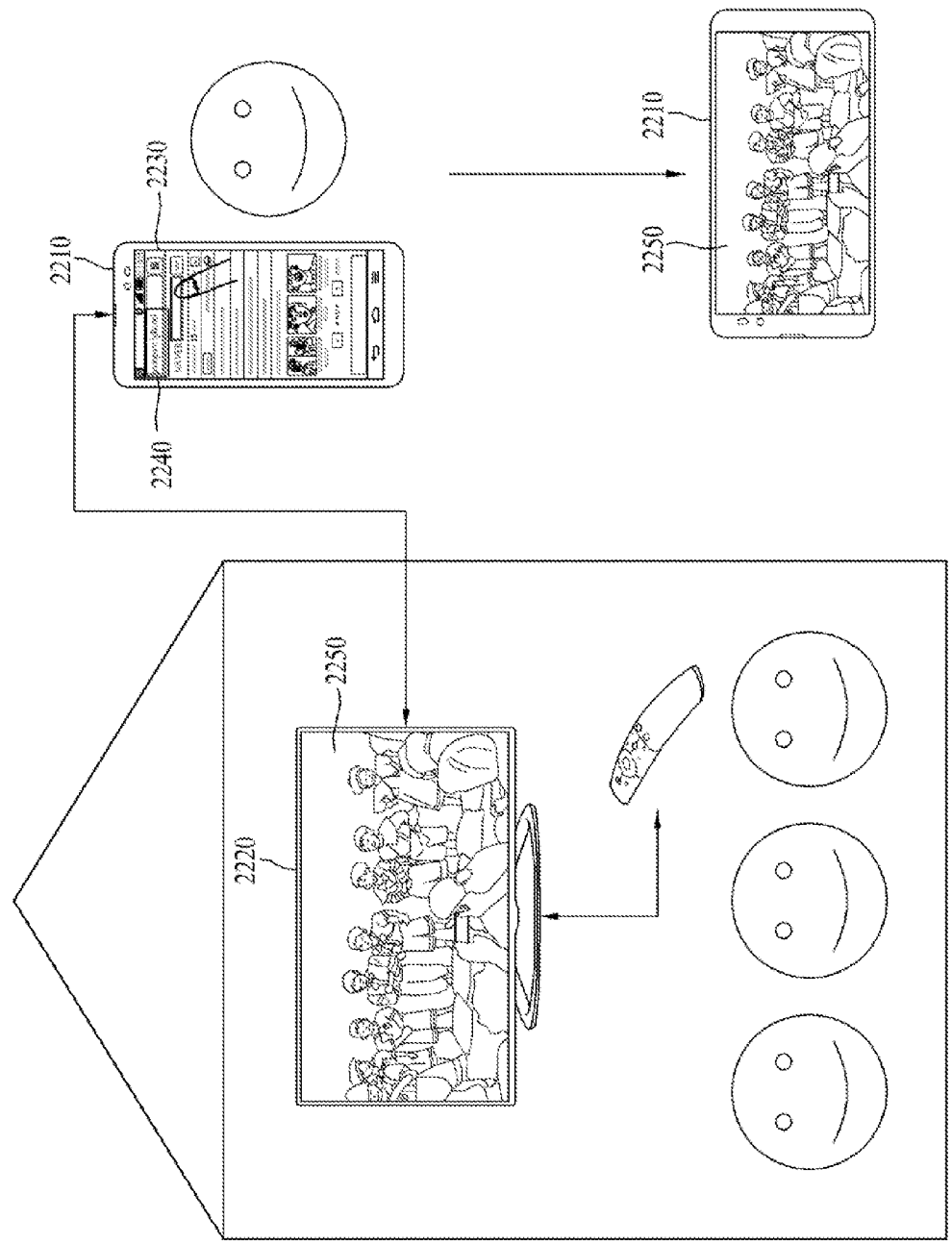
FIG. 22 is a diagram illustrating an example that a display device accesses a broadcast receiver positioned at a long distance according to one embodiment of the present invention.

FIG. 22 is a diagram illustrating an example that a display device accesses a broadcast receiver positioned at a long distance according to one embodiment of the present invention. As shown in FIG. 22, if a user located at the outside of a house inputs a web address corresponding to a broadcast receiver 2220 using a web browser 2240 of a display device 2210 such as a smartphone and accesses the broadcast receiver 2220 located at the inside of the house, the display device can control contents identical to contents 2250 currently displayed on the broadcast receiver 2220 to be displayed on a screen of the display device. Or, the display device can control a predetermined home screen (not depicted) of the broadcast receiver 2220 to be displayed on the screen of the display device.

When designing the display device and the broadcast receiver as mentioned earlier in FIG. 21 and FIG. 22, since a user can access a broadcast receiver using a smartphone or the like irrespective of a distance, the user may use all contents displayed on the broadcast receiver irrespective of a location at which the user is positioned.

Figure 23:
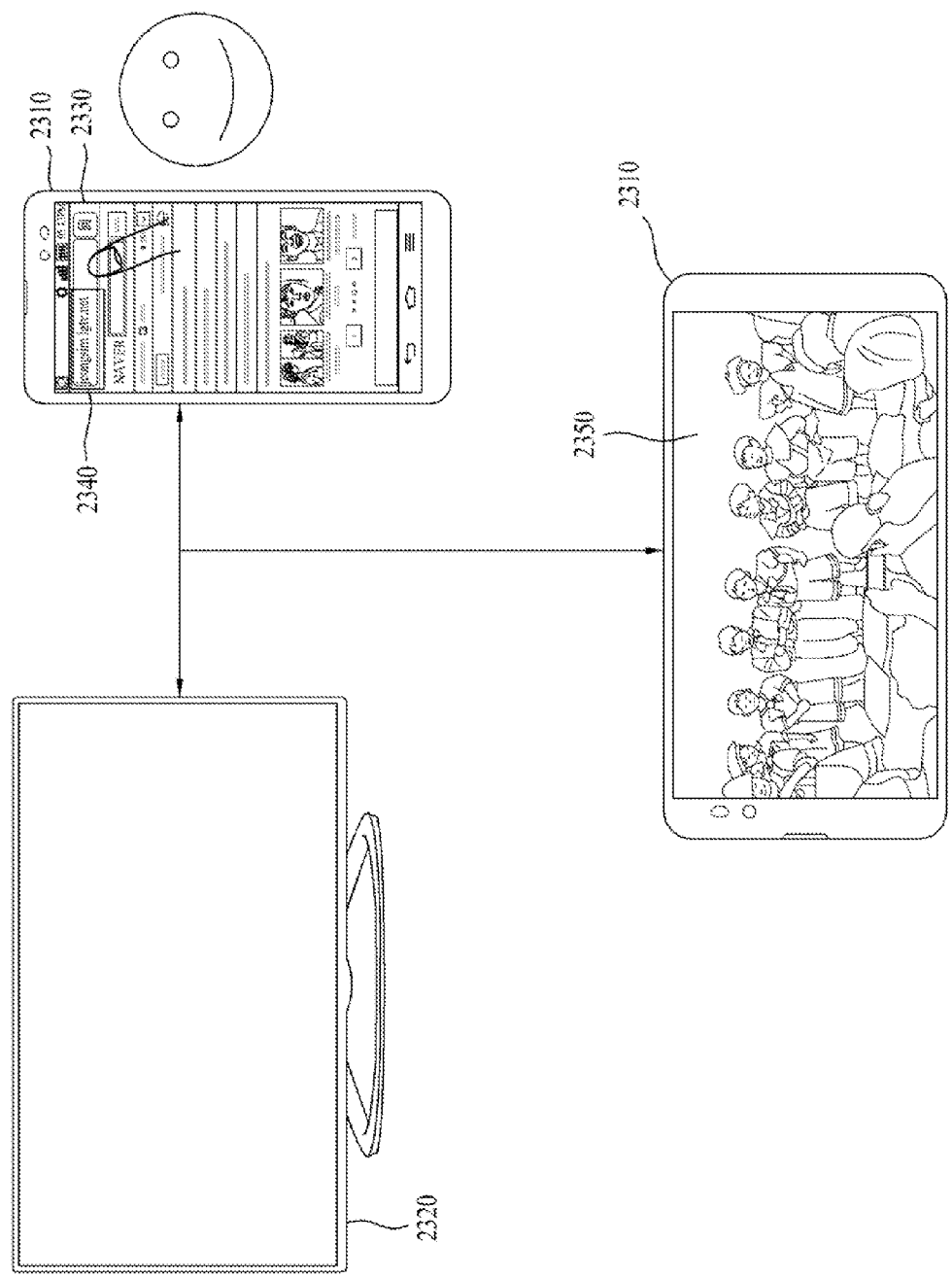
FIG. 23 is a diagram illustrating an example that a display device checks a power mode of a broadcast receiver according to one embodiment of the present invention.

FIG. 23 is a diagram illustrating an example that a display device checks a power mode of a broadcast receiver according to one embodiment of the present invention. A controller of a display device 2310 according to one embodiment of the present invention accesses a web address 2340 corresponding to a broadcast receiver 2320 via a web browser 2330, receives IP address information mapped to the web address 2340 from a DNS, accesses the broadcast receiver 2320 using the received IP address, receives data of contents displayed on the broadcast receiver 2320 and can control the data of the contents to be displayed on a screen of the display device.

The controller checks a power mode of the broadcast receiver 2320. If the power mode of the broadcast receiver 2320 corresponds to an off mode, the controller can control a message indicating that data communication with the broadcast receiver 2320 is not available to be displayed on the screen of the display device. In addition, the controller checks the power mode of the broadcast receiver 2320. If the power mode of the broadcast receiver 2320 corresponds to a sleep mode, the controller can control a signal configured to change power of the broadcast receiver 2320 to an on mode to be transmitted using a Wake-on-Lan (WOL) scheme. The sleep mode may correspond to a mode that the broadcast receiver 2320 performs communication with an external device in a stand-by state.

As show in FIG. 23, when the power mode of the broadcast receiver 2320 corresponds to the off mode or the sleep mode, a user can access the broadcast receiver 2320 using the web browser 2330 of the display device 2310 such as a smartphone. The controller of the display device 2310 can check the power mode of the broadcast receiver 2320. If the power mode of the broadcast receiver 2320 corresponds to the off mode, the controller can control a message (not depicted) indicating that data communication with the broadcast receiver 2320 is not available to be displayed on the screen of the display device. If the power mode of the broadcast receiver 2320 corresponds to the sleep mode, the controller can control a signal configured to change power of the broadcast receiver 2320 to an on mode to be transmitted to the broadcast receiver 2320 using a WOL scheme.

If the power mode of the broadcast receiver 2320 corresponds to the sleep mode, since the broadcast receiver can perform data communication with the display device in a stand-by state, as shown in FIG. 23, contents 2350 can be displayed on a screen of the display device 2310 when the content 2350 of the broadcast receiver such as real-time broadcast program are not displayed on the broadcast receiver 2320. Hence, if the broadcast receiver and the display device are designed as mentioned in the foregoing description, a user accesses the broadcast receiver of a sleep mode positioned at a house using the display device from external and can directly use an application and the like included in the broadcast receiver. Hence, power consumption resulted from using the broadcast receiver can be minimized.

Figure 24:
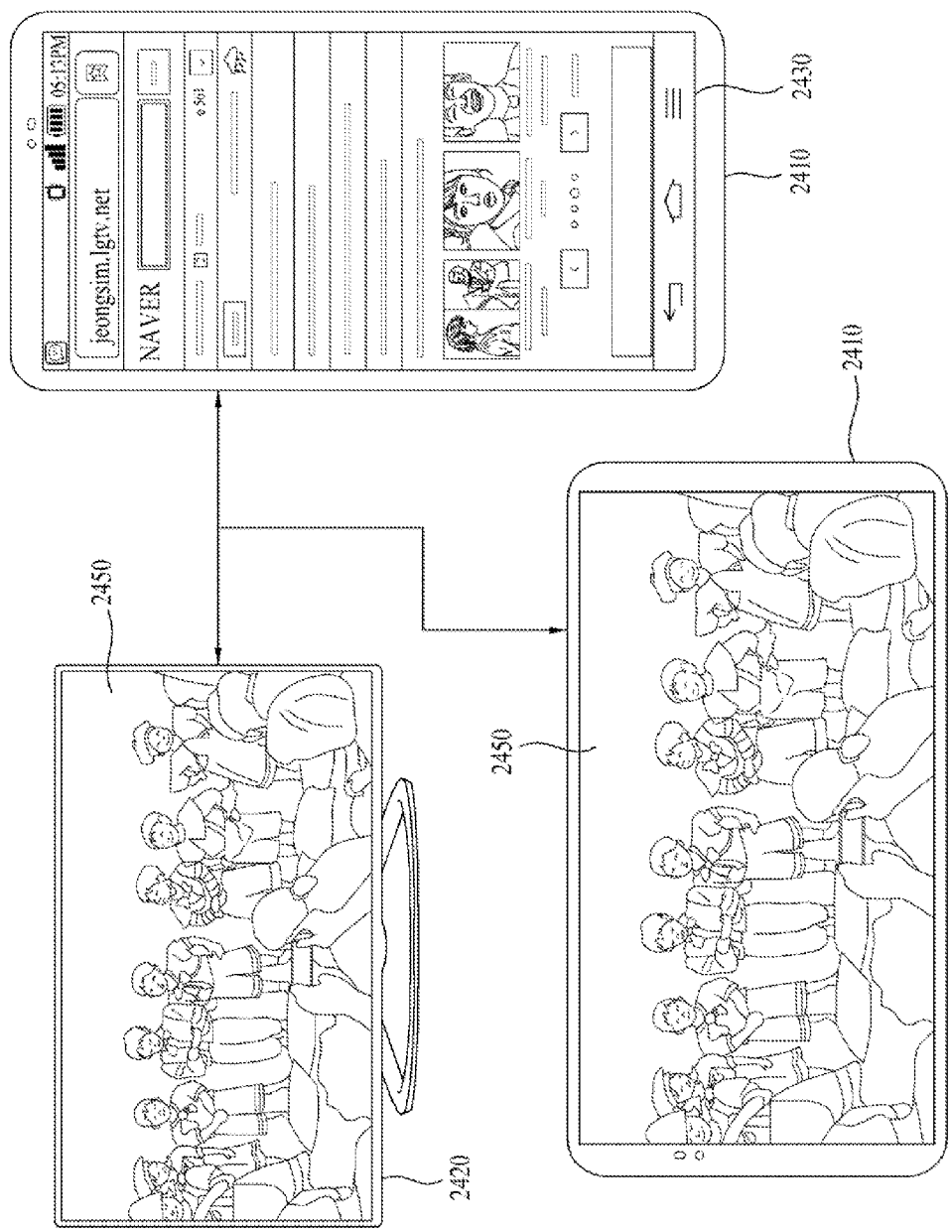
FIG. 24 is a diagram illustrating a different example that a display device accesses a broadcast receiver using a web browser according to a different embodiment of the present invention.

FIG. 24 is a diagram illustrating a different example that a display device accesses a broadcast receiver using a web browser according to a different embodiment of the present invention. As shown in FIG. 24, a display device 2410 according to one embodiment of the present invention can include various digital devices including not only a smartphone but also a tablet PC, a notebook and the like. FIG. 24 is a diagram illustrating a tablet PC as an example of the display device 2410. Similar to the process mentioned earlier in FIG. 19, a user accesses a broadcast receiver 2420 using a web browser 2430 included in the tablet PC and can display content 2450 on a screen of the tablet PC. In addition, the content 2450 of the broadcast receiver can be displayed by being reprocessed according to various screen sizes of the display device 2410.

Figure 25:
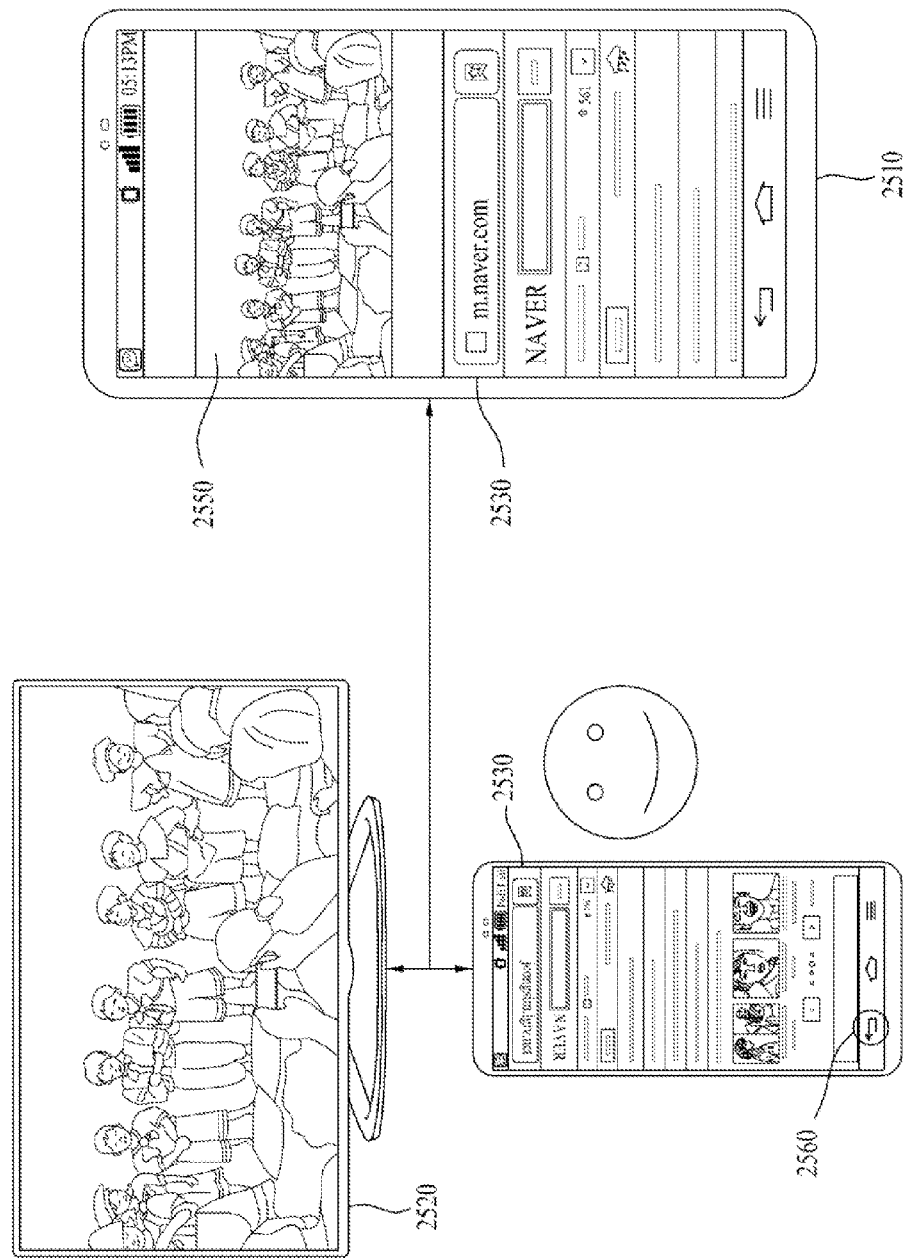
FIG. 25 is a diagram illustrating an example that a display device displays contents using division of screen according to one embodiment of the present invention.

FIG. 25 is a diagram illustrating an example that a display device displays contents using division of screen according to one embodiment of the present invention. As shown in FIG. 25, a display device 2510 according to one embodiment of the present invention accesses a broadcast receiver 2520 using a web browser 2530, receives data of content 2550 displayed on the broadcast receiver 2520 and can control the data of the content to be displayed on a screen of the display device. If the display device 2510 according to one embodiment of the present invention selects a screen division icon (not depicted) or detects a signal inputting a back button 2560 for more than a predetermined time, as shown in FIG. 25, a screen division function can be executed. In this instance, as shown in FIG. 25, a first screen may correspond to the content 2550 displayed on the broadcast receiver 2520 and a second screen may correspond to the web browser 2530. Hence, when designing the broadcast receiver and the display device as mentioned in the foregoing description, a user can use the content of the broadcast receiver 2520 and content of the display device 2510 itself on the first screen and the second screen, respectively.

Figure 26:
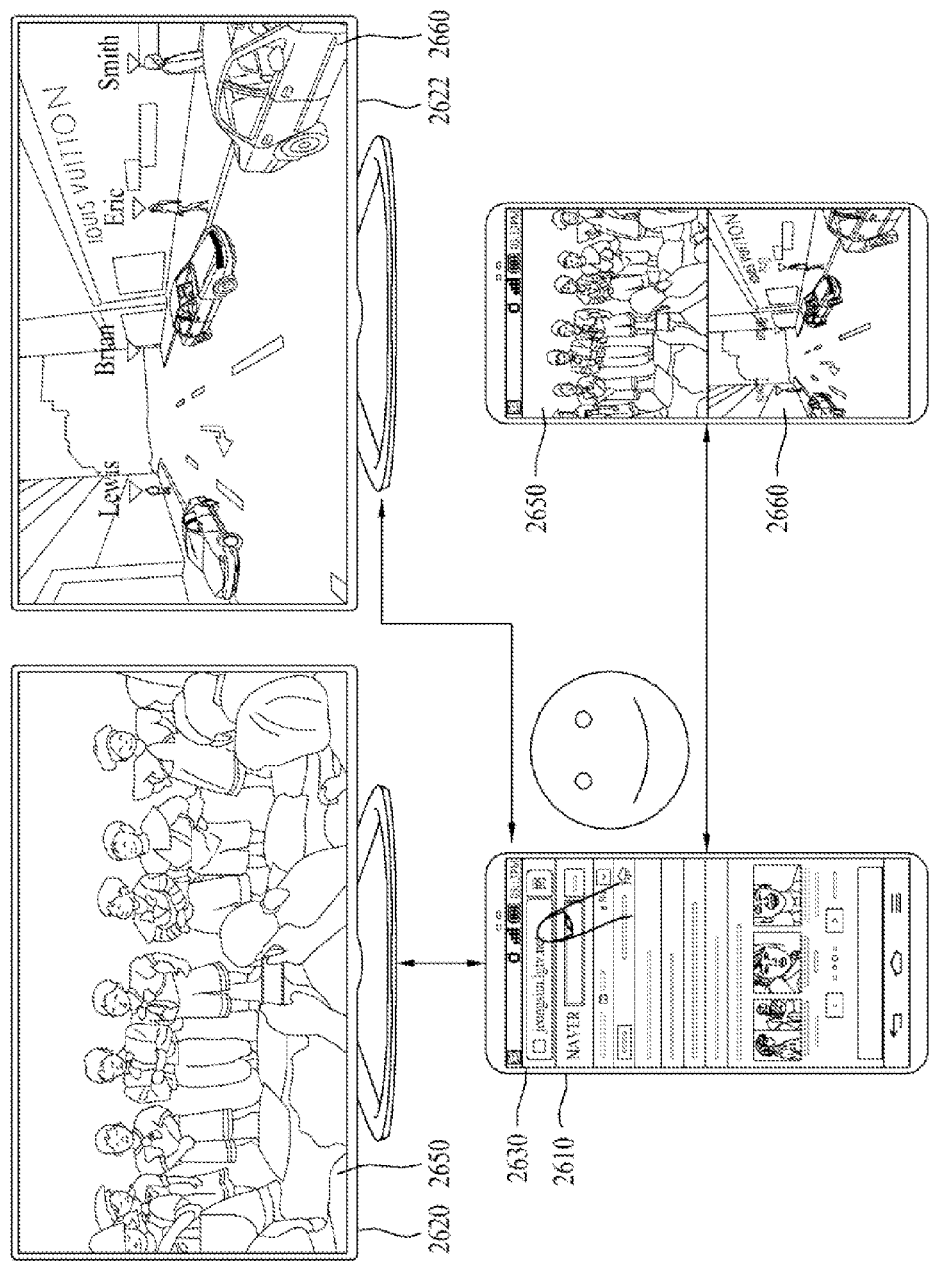
FIG. 26 is a diagram illustrating a different example that a display device displays contents using division of screen according to one embodiment of the present invention.

FIG. 26 is a diagram illustrating a different example that a display device displays contents using division of screen according to one embodiment of the present invention. As shown in FIG. 26, a controller of a display device 2610 according to one embodiment of the present invention can control content 2650 of a first broadcast receiver 2620 to be displayed on a first screen and control a web browser 2630 of the display device 2610 to be displayed on a second screen by executing a screen division function mentioned earlier in FIG. 25. Moreover, if a web address corresponding to a second broadcast receiver 2622 is input using the web browser 2630 displayed on the second screen, as shown in FIG. 26, the controller can control the content 2650 of the first broadcast receiver 2620 and content 2660 of the second broadcast receiver to be displayed on the first screen and the second screen, respectively.

Figure 27:
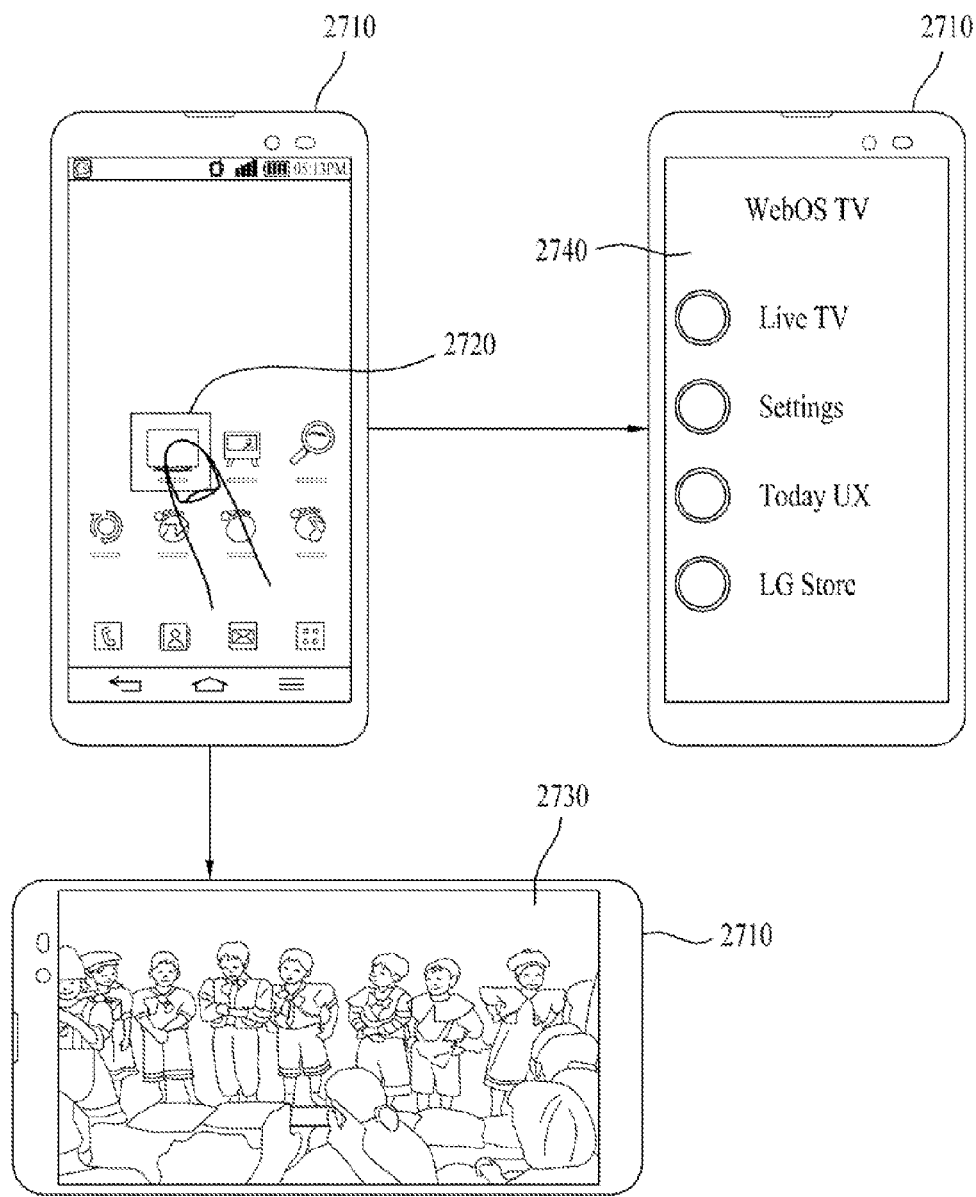
FIG. 27 is a diagram illustrating an example that a display device executes a broadcast receiver application according to one embodiment of the present invention.

FIG. 27 is a diagram illustrating an example that a display device executes a broadcast receiver application according to one embodiment of the present invention. As shown in FIG. 27, a controller of a display device according to one embodiment of the present invention generates a broadcast receiver application 2720 including web address information of a specific broadcast receiver and can control the broadcast receiver application to be displayed on a home screen. If a signal selecting the broadcast receiver application 2720 is received, the controller accesses a broadcast receiver corresponding to the broadcast receiver application 2720 and can immediately display content 2730 displayed on the broadcast receiver on a screen of the display device. In addition, if a signal selecting the broadcast receiver application 2720 is received, the controller can control an application list 2740 including at least one or more application information of a broadcast receiver corresponding to the broadcast receiver application 2720 to be displayed on a screen of the display device. If a signal selecting a specific application included in the application list 2740 is received, the controller receives data of the selected specific application from the broadcast receiver and can control the data to be displayed on the screen of the display device.

Figure 28:
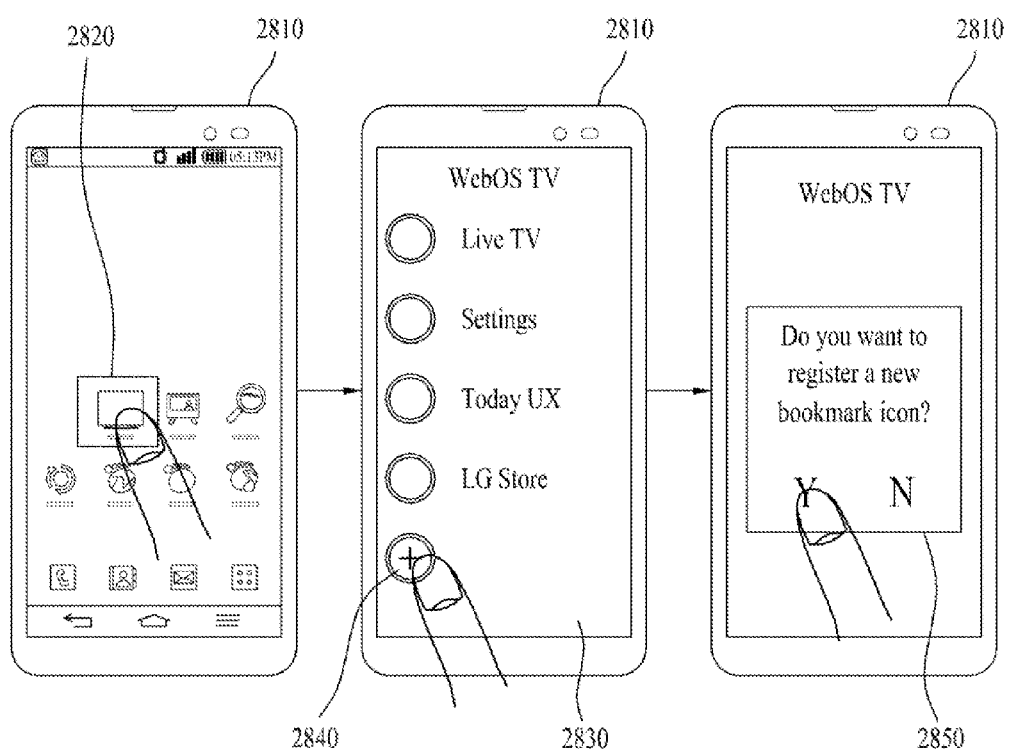
FIG. 28 is a diagram illustrating a different example that a display device executes a broadcast receiver application according to one embodiment of the present invention.

FIG. 28 is a diagram illustrating a different example that a display device executes a broadcast receiver application according to one embodiment of the present invention. As shown in FIG. 28, if a signal selecting a broadcast receiver application 2820 is received, a controller of a display device according to one embodiment of the present invention can control an application list 2830 including at least one or more application information of a broadcast receiver corresponding to the broadcast receiver application 2820 to be displayed on a screen of the display device. In addition, if a signal selecting an application add icon 2840 included in the application list 2830 is received, the controller can control a window 2850, which is configured to register a specific application included in the broadcast receiver at the application list 2830, to be displayed on the screen of the display device. By doing so, a user can register a frequently used application at the application list 2830 and can easily and promptly use an application included in the broadcast receiver by a display device such as a smartphone.

Figure 29:
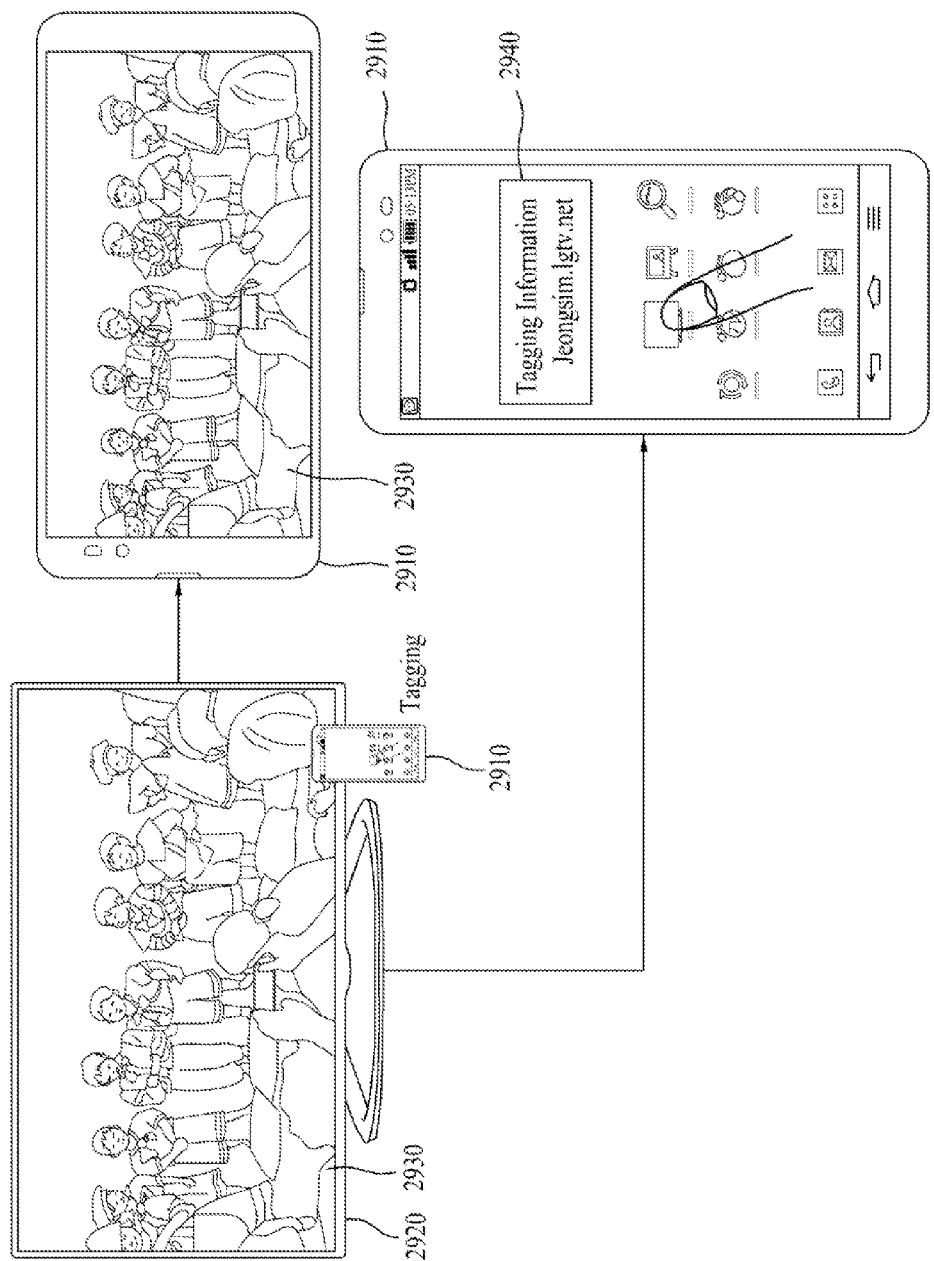
FIG. 29 is a diagram illustrating an example that a display device obtains web address information according to one embodiment of the present invention.

FIG. 29 is a diagram illustrating an example that a display device obtains web address information according to one embodiment of the present invention. As shown in FIG. 29, if a user performs a tagging operation for a broadcast receiver 2920 using a NFC (near field communications) chip, a controller of a display device 2910 according to one embodiment of the present invention can control a message 2940 including web address information of the broadcast receiver 2920 to be displayed on a screen of the display device. Or, if a user performs a tagging operation for a broadcast receiver 2920 using a NFC chip, a controller of a display device 2910 according to one embodiment of the present invention receives data of content 2930 displayed on the broadcast receiver 2920 and can control the data to be immediately displayed on a screen of the display device.

When designing a broadcast receiver and a display device as mentioned earlier in FIG. 29, it is not necessary for a user to memorize each of web address information of a plurality of broadcast receivers and can easily and promptly obtain web address information via a tagging operation.

Figure 30:
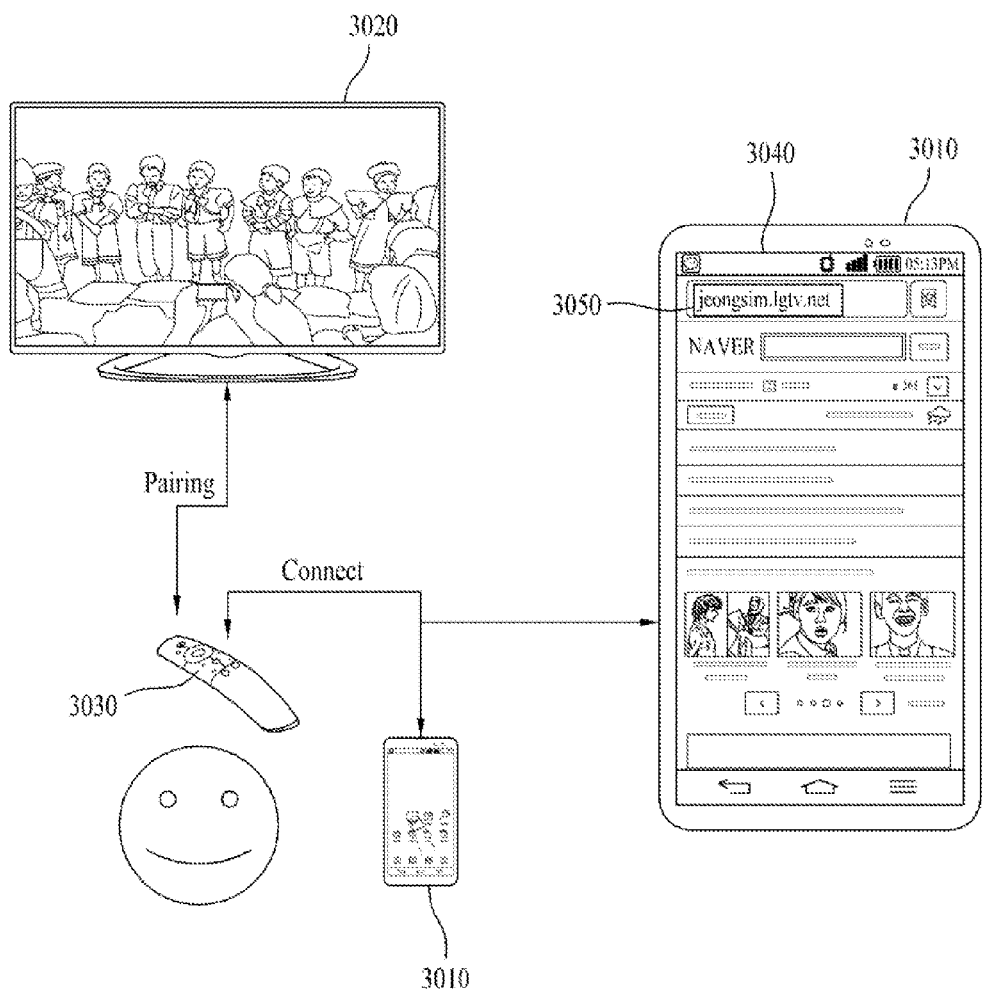
FIG. 30 is a diagram illustrating a different example that a display device obtains web address information according to one embodiment of the present invention.

FIG. 30 is a diagram illustrating a different example that a display device obtains web address information according to one embodiment of the present invention. As shown in FIG. 30, in order to obtain web address 3050 information of a broadcast receiver 3020, a controller of a display device 3010 according to one embodiment of the present invention can perform a device-to-device connection with a remote controller 3030, which is paired with the broadcast receiver 3020. Once the device-to-device connection is performed, the controller can receive the web address 3050 information of the broadcast receiver 3020 from the remote controller 3030. If the web address 3050 information of the broadcast receiver 3020 is received from the remote controller 3030, the controller of the display device 3010 according to one embodiment of the present invention can control a web browser 3040 including the web address 3050 information of the broadcast receiver 3020 to be displayed on a screen of the display device.

Figure 31:
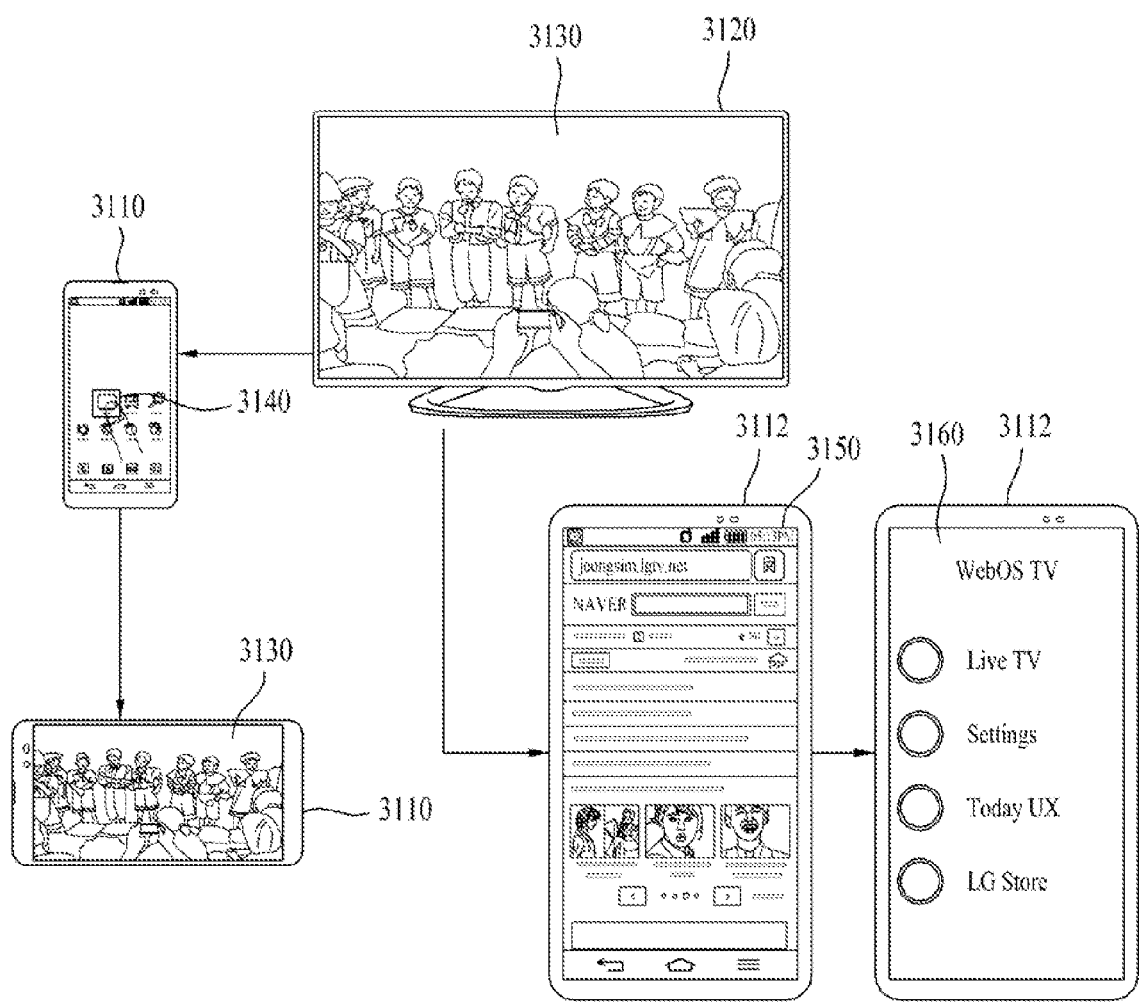
FIG. 31 is a diagram illustrating an example that a plurality of display devices access a broadcast receiver according to one embodiment of the present invention.

FIG. 31 is a diagram illustrating an example that a plurality of display devices access a broadcast receiver according to one embodiment of the present invention. As shown in FIG. 31, a first display device 3110 and a second display device 3112 can access a single broadcast receiver 3120 at the same time. For instance, the first display device 3110 accesses the broadcast receiver 3120 using a broadcast receiver application 3140 generated on a home screen of the first display device and can display content 3130 displayed on the broadcast receiver 3120 on a screen of the first display device. On the contrary, the second display device 3112 can access the broadcast receiver 3120 using a web browser 3150. If the seconds display device 3112 accesses the broadcast receiver 3120, the second display device can display an application list 3160 including at least one or more application information included in the broadcast receiver 3120 on a screen of the second display device.

Figure 32:
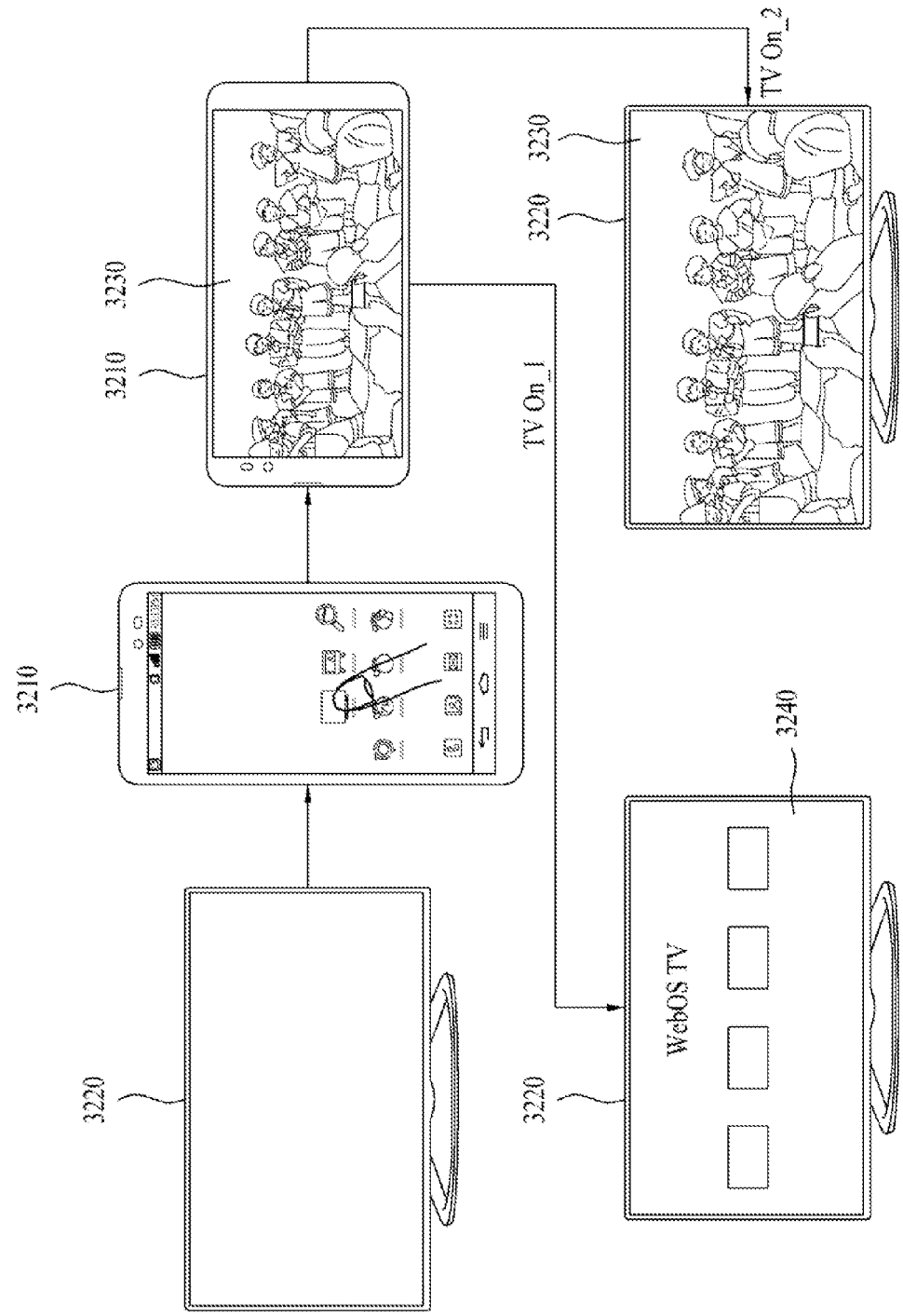
FIG. 32 is a diagram illustrating a different example that a display device checks a power mode of a broadcast receiver according to one embodiment of the present invention.

FIG. 32 is a diagram illustrating a different example that a display device checks a power mode of a broadcast receiver according to one embodiment of the present invention. As shown in FIG. 32, when a power mode of a broadcast receiver 3220 corresponds to an off mode or a sleep mode, a user can access the broadcast receiver 3220 using a web browser 3230 of a display device 3210 such as a smartphone. In addition, a controller of the display device 3210 can check a power mode of the broadcast receiver 3220. If the power mode of the broadcast receiver 3220 corresponds to a sleep mode, the controller receives data of at least one or more contents included in the broadcast receiver 3220 and can control the data to be displayed on a screen of the display device.

While displaying the data of the contents 3230 received from the broadcast receiver 3220 on the screen of the display device, the controller can control a signal configured to change power of the broadcast receiver 3220 to an on mode to be transmitted to the broadcast receiver 3220 using a WOL scheme according to a request of a user. In this instance, the broadcast receiver 3220 can display a predetermined home screen 3240 of the broadcast receiver on a screen of the broadcast receiver or can display contents identical to the contents 3230 displayed on the screen of the display device 3110 on the screen of the broadcast receiver.

Figure 33:
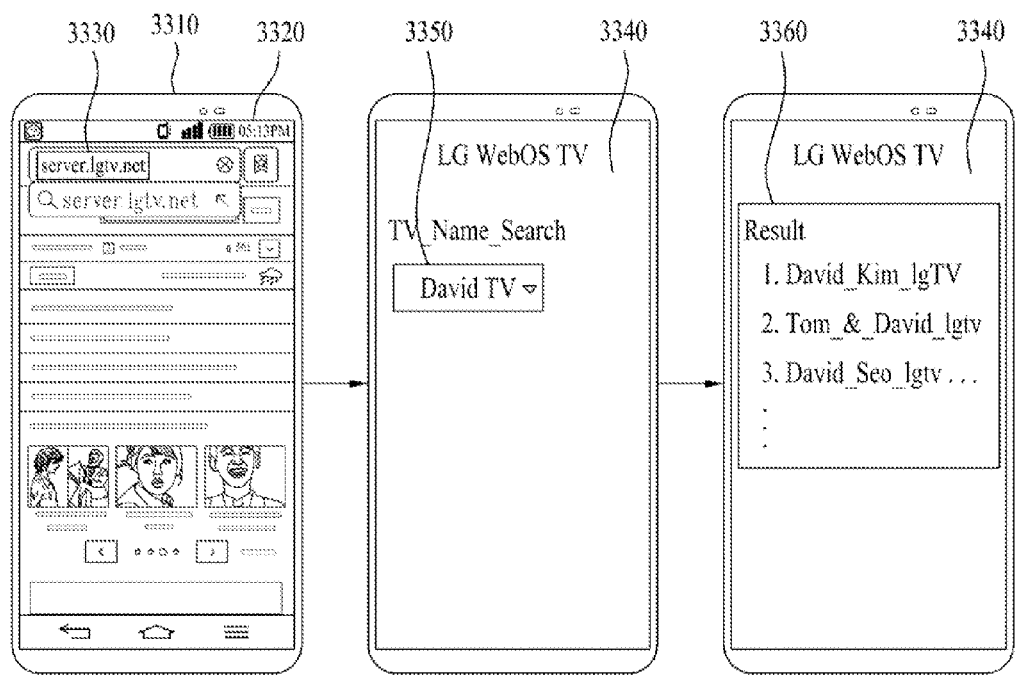
FIG. 33 is a diagram illustrating an example that a display device searches for a web address of a broadcast receiver according to one embodiment of the present invention.

FIG. 33 is a diagram illustrating an example that a display device searches for a web address of a broadcast receiver according to one embodiment of the present invention. As shown in FIG. 33, a user of a display device 3310 according to one embodiment of the present invention can access a broadcast receiver web address search server 3330 via a web browser 3320. If the user of the display device 3310 inputs a name 3350 of a specific user on a screen 3340 of the broadcast receiver web address search server, a web address list 3360 including broadcast receiver web address information related to the name 3350 of the specific user can be displayed on the screen. The web address information of the broadcast receiver included in the web address list 3360 can be displayed only when each broadcast receiver allows a search.

When designing a broadcast receiver and a display device as mentioned earlier in FIG. 33, it is not necessary for a user to memorize web address information and the user can obtain web address information of a plurality of broadcast receivers via a simple search.

Figure 34:
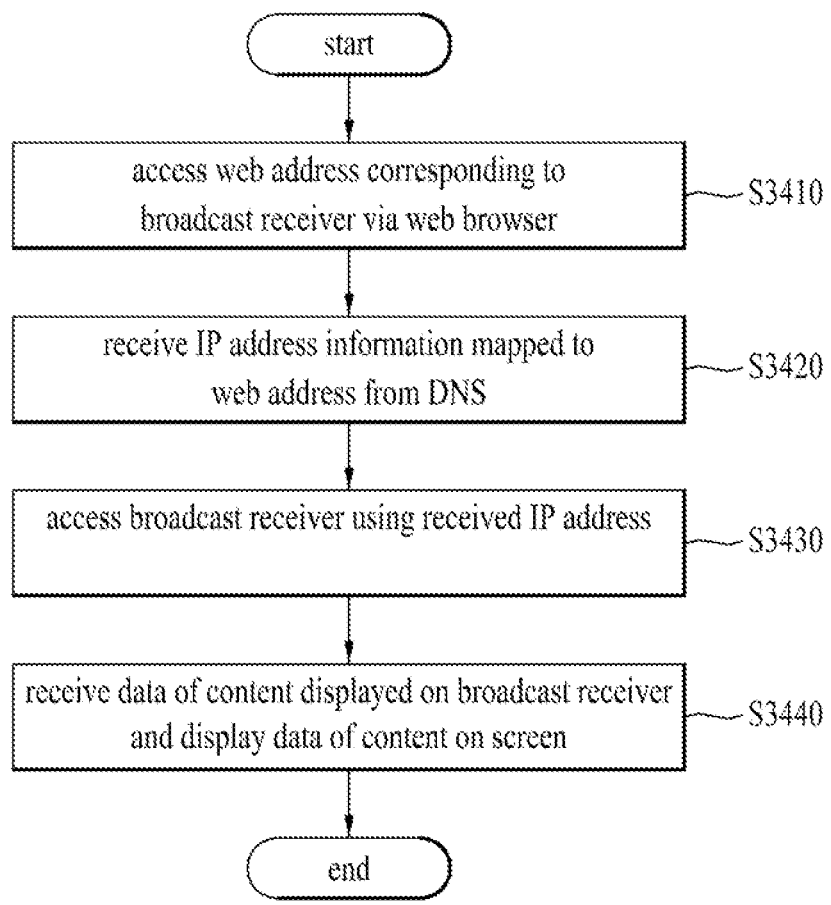
FIG. 34 is a flowchart for a method of controlling a display device according to one embodiment of the present invention.

FIG. 34 is a flowchart for a method of controlling a display device according to one embodiment of the present invention. As shown in FIG. 34, a method of controlling a display device according to one embodiment of the present invention includes the steps of accessing a web address corresponding to a broadcast receiver via a web browser (S3410), receiving IP address information mapped to the web address from a DNS (S3420), accessing the broadcast receiver using the received IP address (S3430) and displaying content displayed on the broadcast receiver on a screen of the display device by receiving data of the content from the broadcast receiver (S3440). Since detail explanation on each step is identical to what is mentioned in the foregoing description, overlapped explanation is omitted at this time.

Figure 35:
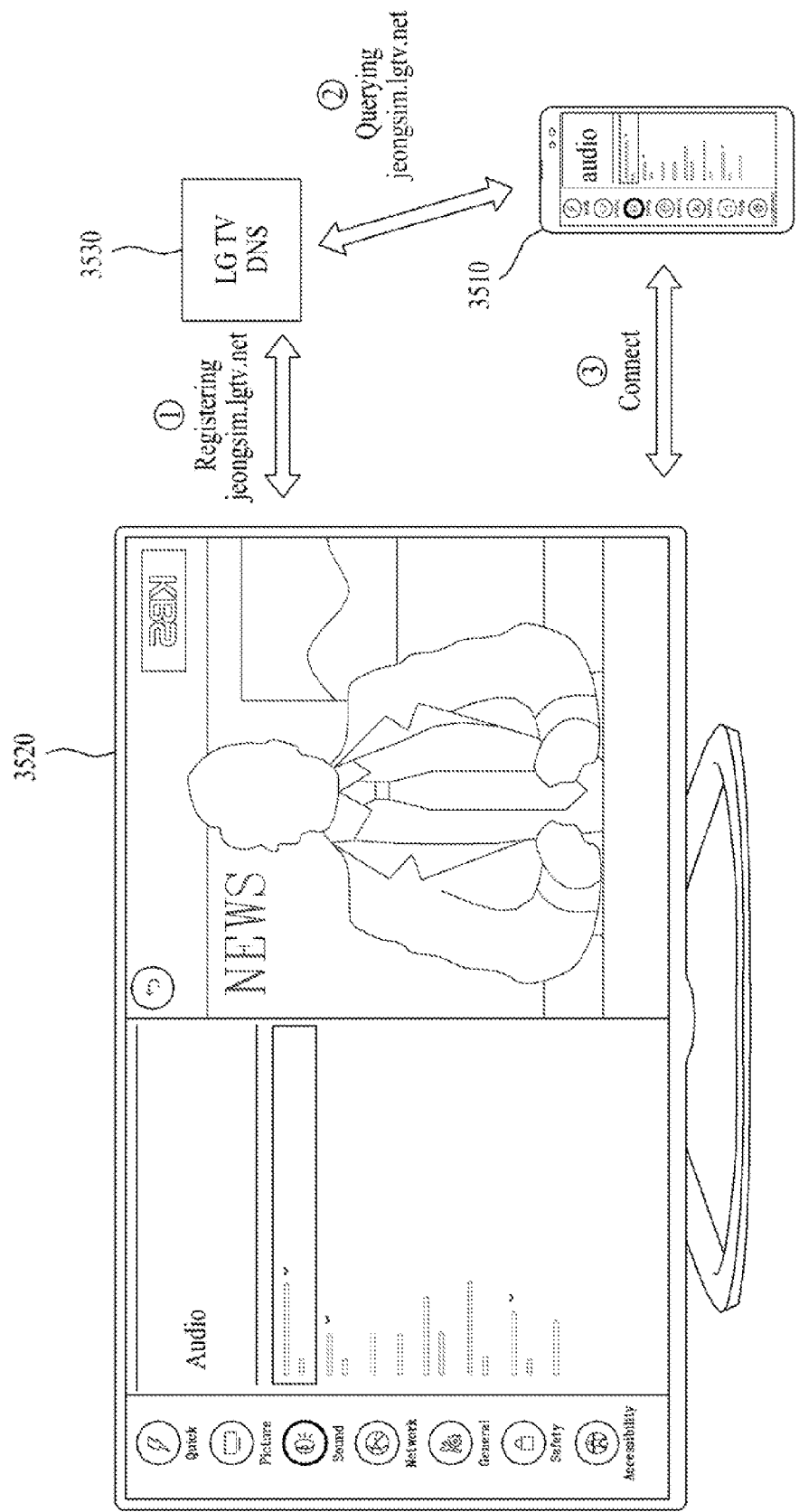
FIG. 35 is a diagram illustrating an example that a display device receives data of an application included in a broadcast receiver according to one embodiment of the present invention.

FIG. 35 is a diagram illustrating an example that a display device receives data of an application included in a broadcast receiver according to one embodiment of the present invention. A controller of a display device 3510 according to one embodiment of the present invention accesses a web address corresponding to an application included in the broadcast receiver via web browser, receives IP address information mapped to the web address from a DNS, accesses the application using the received IP address and can control data of the application to be displayed on a screen of the display device by receiving the data from the broadcast receiver.

The web address can be automatically generated based on a name of a user set to the broadcast receiver. The application can include a real-time broadcast program application, a channel information application, an EPG (electronic program guide) application, a setting application and a user manual setting application. The application can be generated using a web language including Java script, HTML (hypertext markup language) and CSS (cascading style sheets). The DNS can store a MAC address, a web address, and an IP address of the broadcast receiver, a web address and an IP address of the application by mapping to each other.

The DNS receives an IP address of the broadcast receiver from a DHCP (dynamic host configuration protocol) server with a predetermined interval to update the IP address of the broadcast receiver. If a transmission request signal of an IP address corresponding to the web address is received, the DNS receives allocation of the IP address of the broadcast receiver from the DHCP server and can transmit the IP address to the display device.

As shown in FIG. 35, a display device 3510 according to one embodiment of the present invention can perform data communication with a broadcast receiver 3520 via a web browser. A web address of the broadcast receiver 3520 itself can be automatically generated by the device according to a name set to the broadcast receiver 3520. The broadcast receiver 3520 can register the web address of the broadcast receiver itself and web address of at least one or more applications included in the broadcast receiver 3520 at a DNS 3530. If a user inputs the web address corresponding to the application included in the broadcast receiver 3520 by executing a web browser included in the display device 3510, a controller of the display device 3510 according to one embodiment of the present invention can receive IP address information mapped to the web address from to the DNS.

The controller of the display device 3510 according to one embodiment of the present invention can directly perform data communication with the broadcast receiver 3520 using the received IP address. In this instance, the controller of the display device 3510 according to one embodiment of the present invention receives data of a specific application corresponding to the web address and included in the broadcast receiver 3520 and can control the content of the application to be immediately displayed on a screen of the display device. In this instance, a screen identical to a screen displayed on the broadcast receiver 3520 in size can be displayed on the screen of the display device as it is. Or, a screen different from the screen displayed on the broadcast receiver 3520 in size can be displayed on the screen of the display device based on a screen size of the display device 3510. When designing a broadcast receiver and a display device as mentioned earlier in FIG. 35, a user can easily and promptly execute an application included in the broadcast receiver by a display device such as a smartphone and utilize the application.

Figure 36:
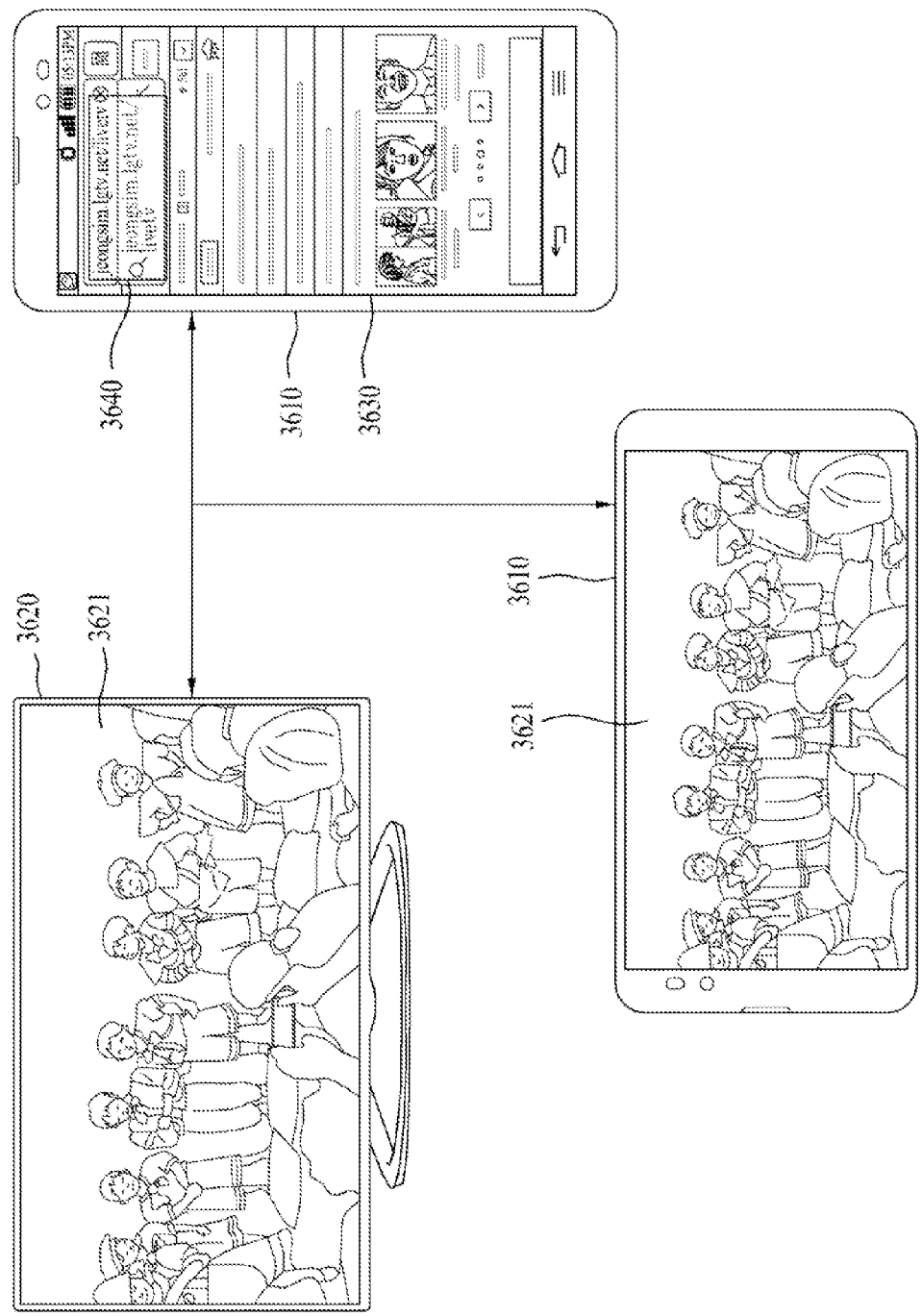
FIG. 36 is a diagram illustrating an example that a display device receives data of a real time broadcast program application from a broadcast receiver and displays the data on a screen according to one embodiment of the present invention.

FIG. 36 is a diagram illustrating an example that a display device receives data of a real time broadcast program application from a broadcast receiver and displays the data on a screen according to one embodiment of the present invention. As shown in FIG. 36, if a user inputs a web address 3640 corresponding to a real-time broadcast program 3621 application included in a broadcast receiver 3620 via a web browser 3630, a controller of a display device 3610 according to one embodiment of the present invention receives data of the real-time broadcast program 3621 application included in the broadcast receiver 3620 and can control the real-time broadcast program 3621 to be displayed on a screen of the display device using the received data of the real-time broadcast program 3621 application.

In this instance, the controller of the display device 3610 according to one embodiment of the present invention can control a horizontal mode screen to be supported according to a type of an application of the broadcast receiver 3620. For instance, as shown in FIG. 36, if the application corresponds to a real-time broadcast program 3621 application, the controller can control the real-time broadcast program to be displayed on the screen of the display device in a horizontal mode.

Moreover, when displaying a real-time broadcast program 3621 on a screen of the display device, a controller of the display device 3610 according to one embodiment of the present invention can display a real-time broadcast program identical to a real-time broadcast program currently watched on a channel of the broadcast receiver 3620. Or, the controller of the display device can display a real-time broadcast program of a predetermined channel on the screen of the display device.

Figure 37:
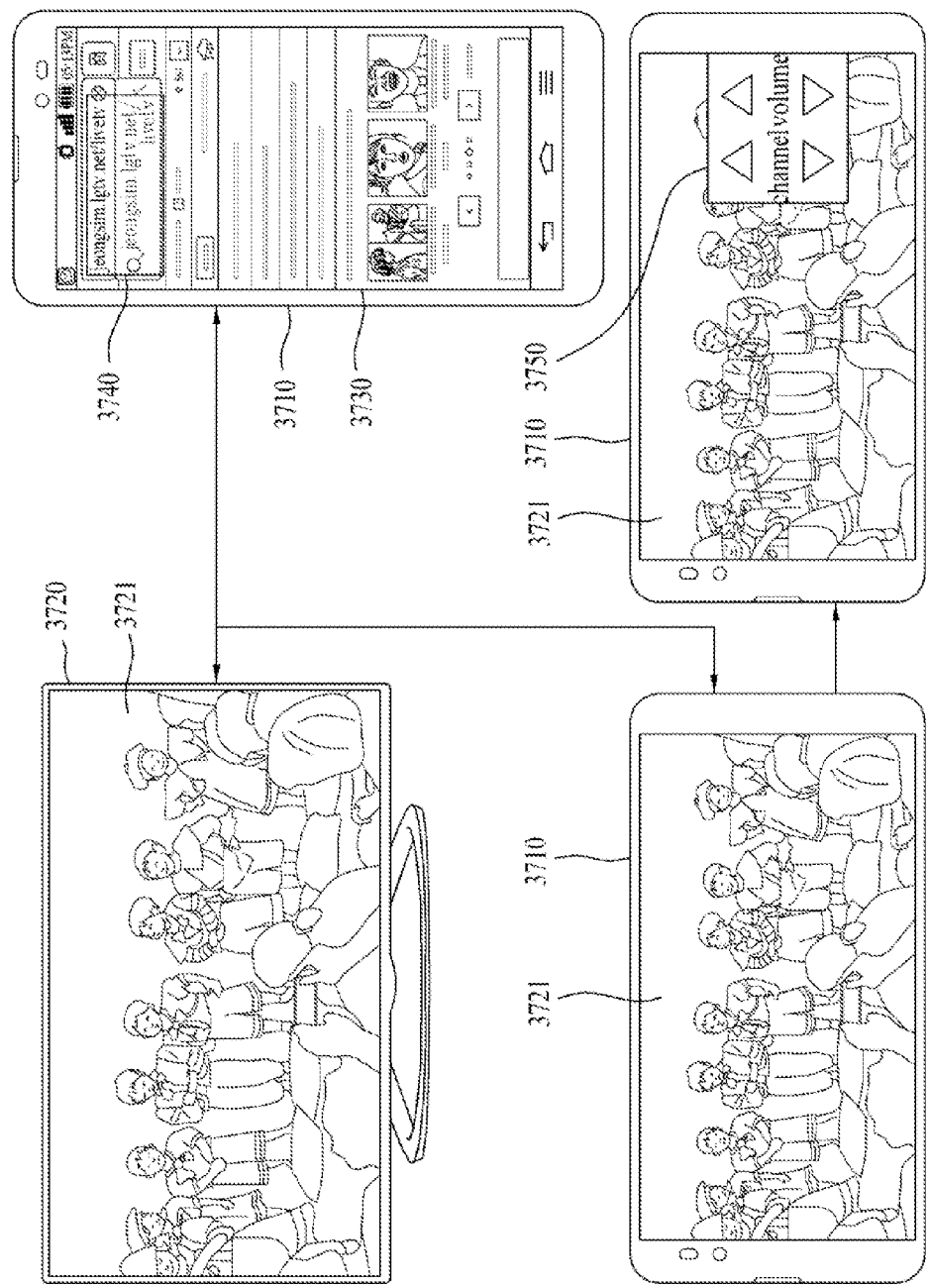
FIG. 37 is a diagram illustrating an example that a display device displays a window configured to control an application on a screen according to one embodiment of the present invention.

FIG. 37 is a diagram illustrating an example that a display device displays a window configured to control an application on a screen according to one embodiment of the present invention. As mentioned earlier in FIG. 36, if a user inputs a web address 3740 corresponding to a real-time broadcast program 3721 application included in a broadcast receiver 3720 using a web browser 3730, a controller of a display device 3710 according to one embodiment of the present invention receives data of the real-time broadcast program 3721 application from the broadcast receiver 3720 and can control the real-time broadcast program 3721 to be displayed on a screen of the display device.

When displaying the data of the real-time broadcast program 3721 application on the screen by receiving the data from the broadcast receiver 3720, the controller of the display device 3710 according to one embodiment of the present invention can control a window 3750 including a control menu to be displayed on the screen of the display device. The window 3750 can include control menus different from each other according to a type of an application received by the display device 3710. For instance, as shown in FIG. 37, when receiving data of a real-time broadcast program 3721 application from the broadcast receiver 3720, a window 3750 including a channel switching menu and a volume control menu can be displayed on the screen of the display device.

Figure 38:
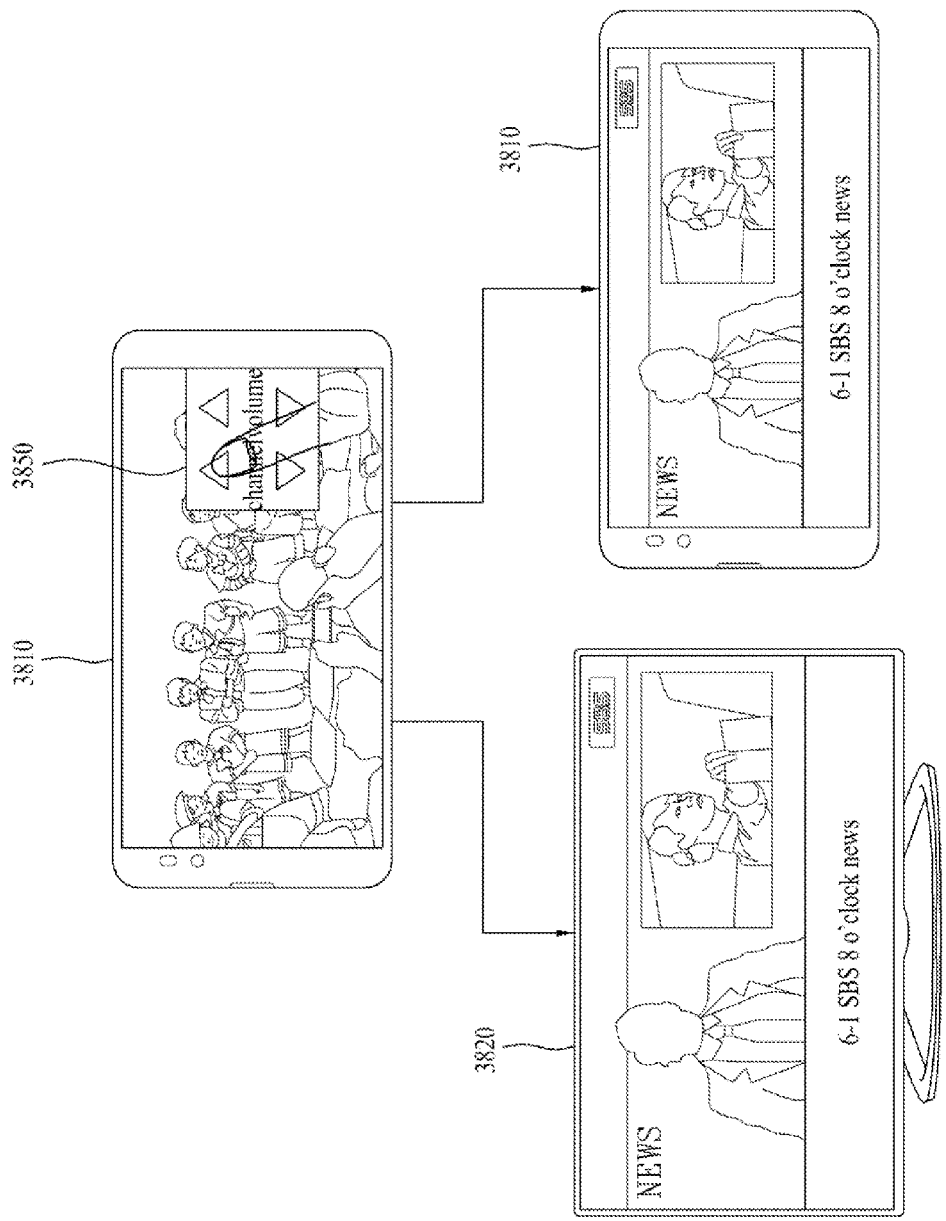
FIG. 38 is a diagram illustrating an example that a display device controls an application using a window according to one embodiment of the present invention.

FIG. 38 is a diagram illustrating an example that a display device controls an application using a window according to one embodiment of the present invention. As mentioned earlier in FIG. 37, when displaying data of an application on a screen by receiving the data of the application from a broadcast receiver 3820, a controller of a display device 3810 according to one embodiment of the present invention can control a window 3850 including a control menu configured to control the application to be displayed together with the data of the application. By doing so, the controller can control the application using the window 3850. For instance, as shown in FIG. 38, when data of a real-time broadcast program application is received from the broadcast receiver 3820 and a window 3850 including a channel switching menu and a volume control menu is displayed on a screen, if a user selects the channel switching menu included in the window 3850, the controller of the display device 3810 according to one embodiment of the present invention can transmit a signal making a channel to be switched to the broadcast receiver 3820 or may control a real-time broadcast program of a different channel to be displayed on the display device itself.

Figure 39:
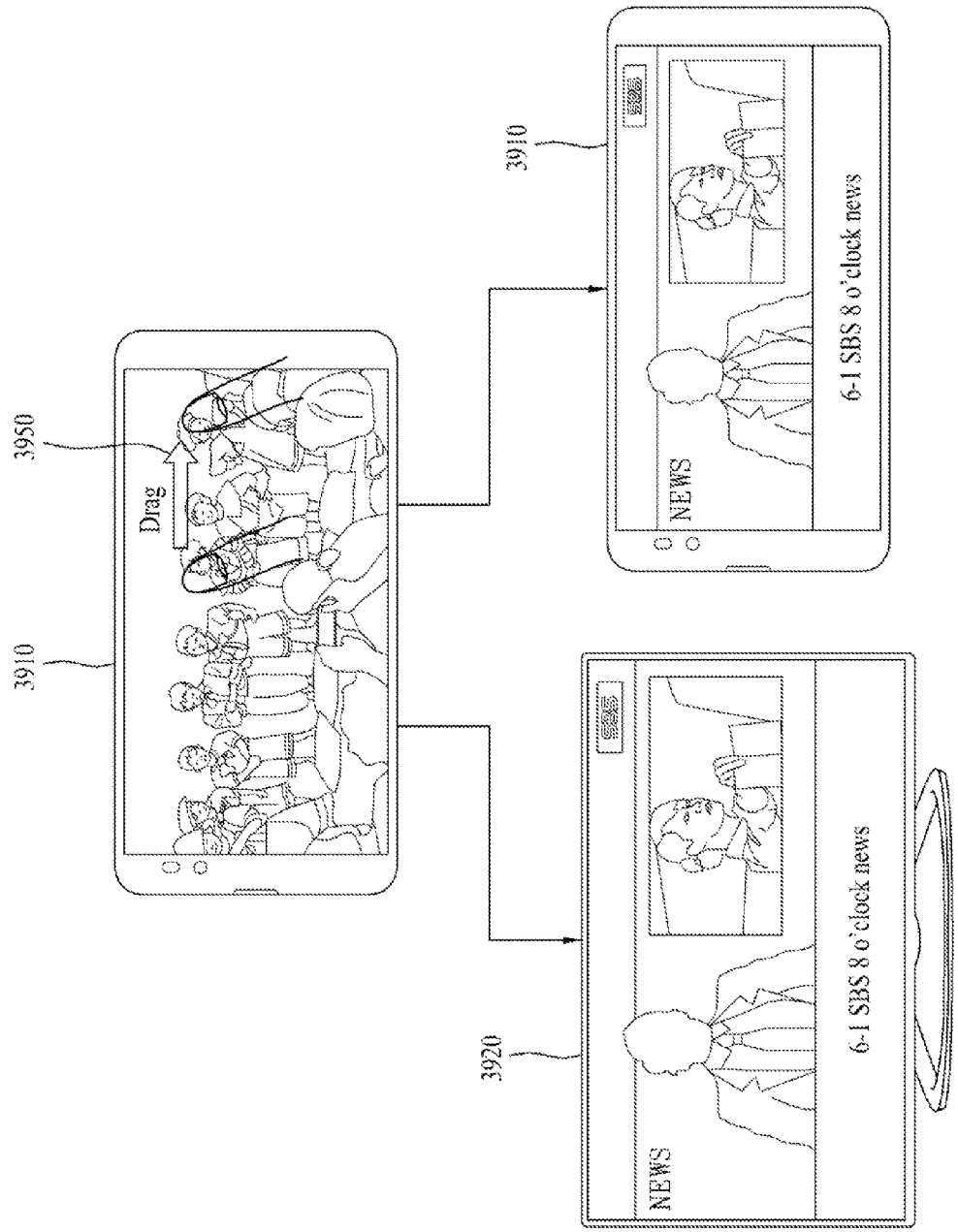
FIG. 39 is a diagram illustrating an example that a display device controls an application using a control signal according to one embodiment of the present invention.

FIG. 39 is a diagram illustrating an example that a display device controls an application using a control signal according to one embodiment of the present invention. As mentioned earlier in FIG. 37, when displaying data of an application on a screen by receiving the data of the application from a broadcast receiver 3920, a controller of a display device 3910 according to one embodiment of the present invention can control the application using a control signal predetermined for every application. For instance, as shown in FIG. 39, when data of a real-time broadcast program application is received from a broadcast receiver 3920 and a real-time broadcast program of a specific channel is displayed on a screen of the display device, if a user inputs a predetermined channel switching signal 3950, the controller of the display device 3910 according to one embodiment of the present invention can transmit a signal making a channel to be switched to the broadcast receiver 3920 or may control a real-time broadcast program of a different channel to be displayed on the display device itself.

Figure 40:
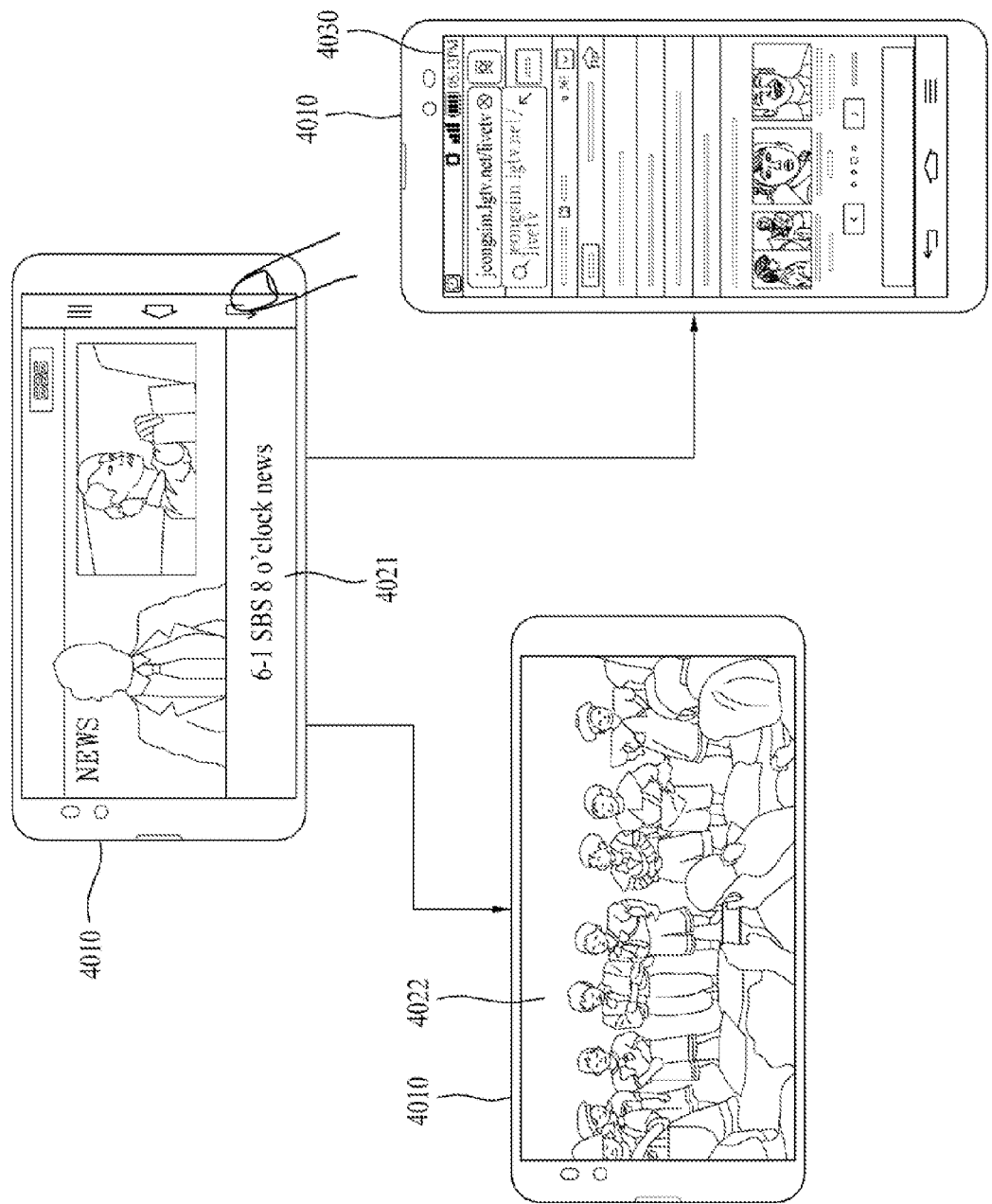
FIG. 40 is a diagram illustrating an example that a display device terminates an application according to one embodiment of the present invention.

FIG. 40 is a diagram illustrating an example that a display device terminates an application according to one embodiment of the present invention. As shown in FIG. 40, a controller of a display device 4010 according to one embodiment of the present invention can control a real-time broadcast program of a specific channel to be displayed on a screen of the display device by receiving data of a real-time broadcast program 4021 application from a broadcast receiver. If a signal selecting a previous menu is received while the real-time broadcast program 4021 is watched using the display device, the controller can control a predetermined main page of the real-time broadcast program 4021 application to be displayed on the screen or can control a web browser 4030 to which a web address corresponding to the real-time broadcast program 4021 application is input to be displayed on the screen.

Figure 41:
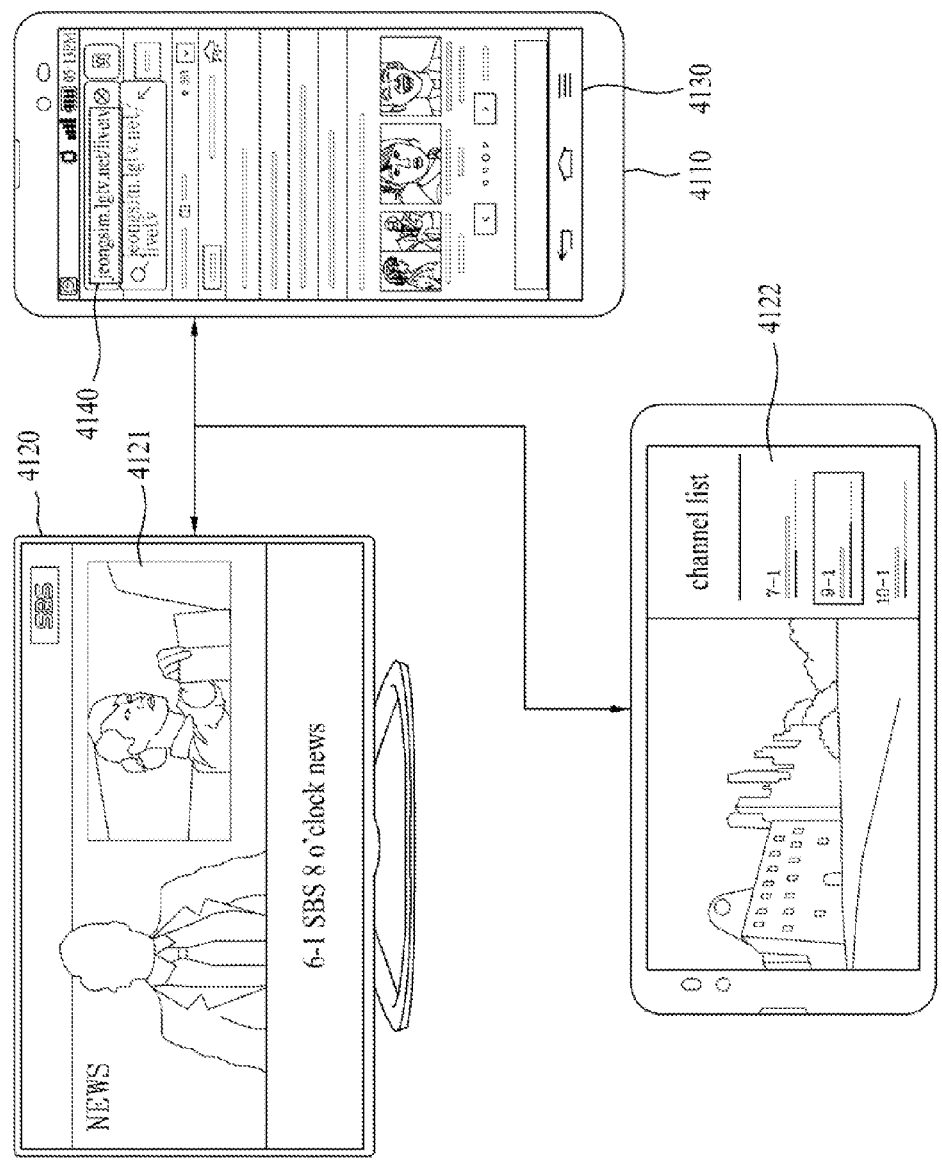
FIG. 41 is a diagram illustrating an example that a display device receives data of a channel information application and displays a channel list on a screen according to one embodiment of the present invention.

FIG. 41 is a diagram illustrating an example that a display device receives data of a channel information application and displays a channel list on a screen according to one embodiment of the present invention. As shown in FIG. 41, while a user is watching a real-time broadcast program 4121 via a broadcast receiver 4120, if the user inputs a web address 4140 corresponding to a channel information application included in the broadcast receiver 4120 via a web browser 4130 of a display device 4110, a controller of the display device 4110 according to one embodiment of the present invention can control a channel list 4122 including channel information of the real-time broadcast program 4121 displayed on the broadcast receiver 4120 to be displayed on a screen of the display device.

Figure 42:
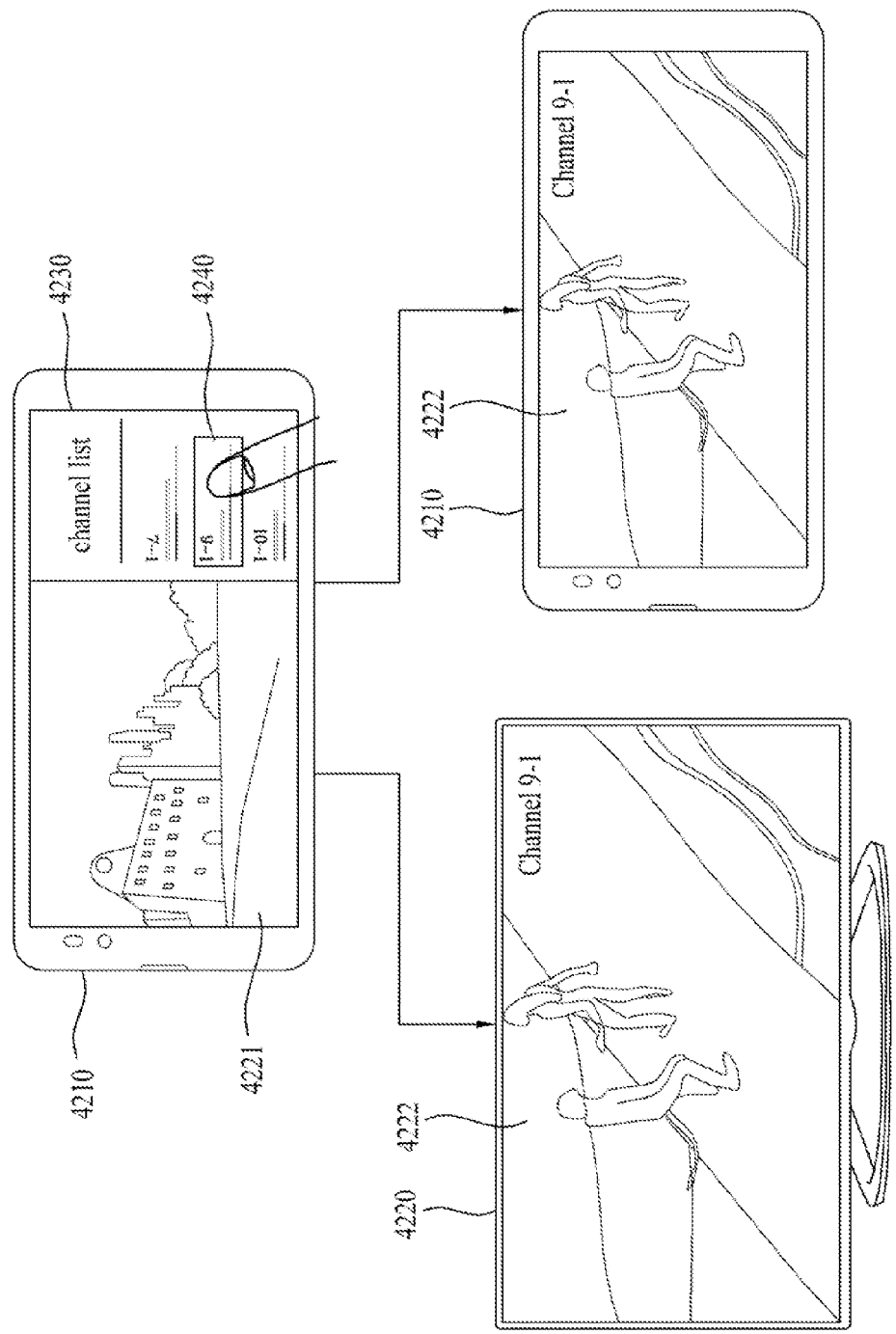
FIG. 42 is a diagram illustrating a different example that a display device receives data of a channel information application and displays a channel list on a screen according to one embodiment of the present invention.

FIG. 42 is a diagram illustrating a different example that a display device receives data of a channel information application and displays a channel list on a screen according to one embodiment of the present invention. As shown in FIG. 42, a display device 4210 according to one embodiment of the present invention can display a real-time broadcast program 4221 of a first channel and a channel list 4230 on a screen. If a signal selecting a second channel icon 4240 included in the channel list 4230 is received, a controller of the display device 4210 according to one embodiment of the present invention can control a signal, which is configured to display a real-time broadcast program 4222 of a second channel by switching a channel of a broadcast receiver 4220 from the first channel to the second channel, to be transmitted to the broadcast receiver 4220 or can control the real-time broadcast program 4222 of the second channel to be displayed on the display device 4210.

Figure 43:
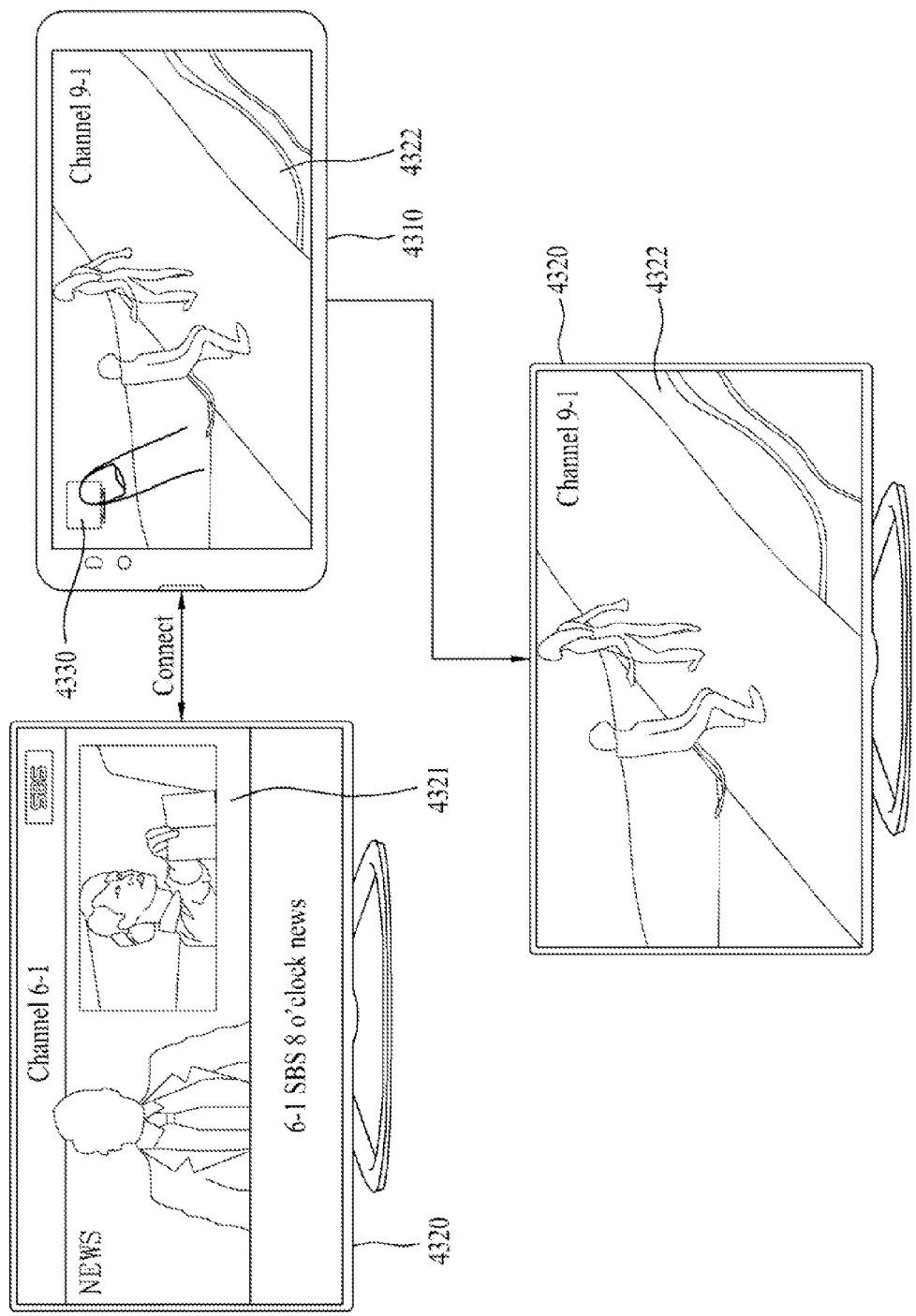
FIG. 43 is a diagram illustrating an example that a display device displays a broadcast receiver synchronization icon according to one embodiment of the present invention.

FIG. 43 is a diagram illustrating an example that a display device displays a broadcast receiver synchronization icon according to one embodiment of the present invention. As shown in FIG. 43, a controller of a display device 4310 according to one embodiment of the present invention can control a real-time broadcast program to be displayed by receiving data of a real-time broadcast program application from a broadcast receiver 4320 or can control a real-time broadcast program of a channel different from a channel displayed on the broadcast receiver 4320 to be displayed on the display device 4310. The controller of the display device 4310 according to one embodiment of the present invention can control a broadcast receiver synchronization icon 4330 to be displayed on a screen while displaying a real-time broadcast program and can control a channel of the display device to be synchronized with a channel of the broadcast receiver 4320 via the broadcast receiver synchronization icon 4330.

For instance, as shown in FIG. 43, when the broadcast receiver 4320 displays a real-time broadcast program 4321 of a first channel and the display device 4310 displays a real-time broadcast program 4322 of a second channel, if a signal selecting the broadcast receiver synchronization icon 4330 is received, the controller can control a signal, which is configured to make the real-time broadcast program 4322 of the second channel displayed on the display device 4310 to be displayed on the broadcast receiver 4320, to be transmitted to the broadcast receiver. Or, when the broadcast receiver 4320 displays a real-time broadcast program 4321 of a first channel and the display device 4310 displays a real-time broadcast program 4322 of a second channel, if a signal selecting the broadcast receiver synchronization icon 4330 is received, the controller can control the real-time broadcast program 4321 of the first channel to be displayed on the display device 4310.

Figure 44:
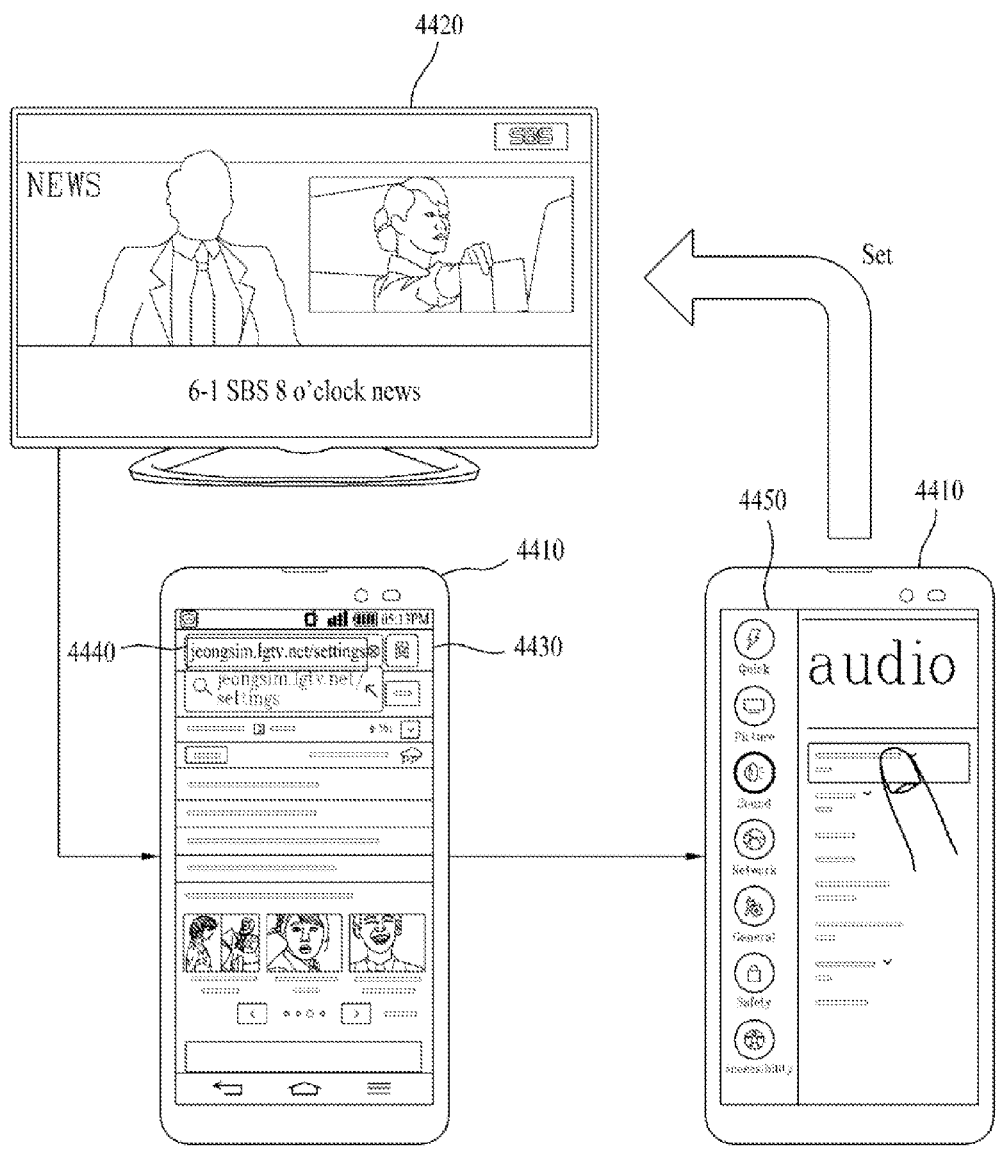
FIG. 44 is a diagram illustrating an example that a display device receives data of a setting application and displays a setting menu on a screen according to one embodiment of the present invention.

FIG. 44 is a diagram illustrating an example that a display device receives data of a setting application and displays a setting menu on a screen according to one embodiment of the present invention. As shown in FIG. 44, if a web address 4440 corresponding to a setting application included in a broadcast receiver 4420 is input via a web browser 4430 of a display device 4410 while a real-time broadcast program is watched via the broadcast receiver 4420, a controller of the display device 4410 according to one embodiment of the present invention can control at least one or more setting menus 4450, which are configured to set the real-time broadcast program 4421 displayed on the broadcast receiver 4420, to be displayed on a screen of the display device. If a user inputs a signal configured to change a specific setting value using the setting menus 4450, the controller can control a signal, which is configured to change a setting value of the broadcast receiver 4420, to be transmitted to the broadcast receiver based on the signal.

Figure 45:
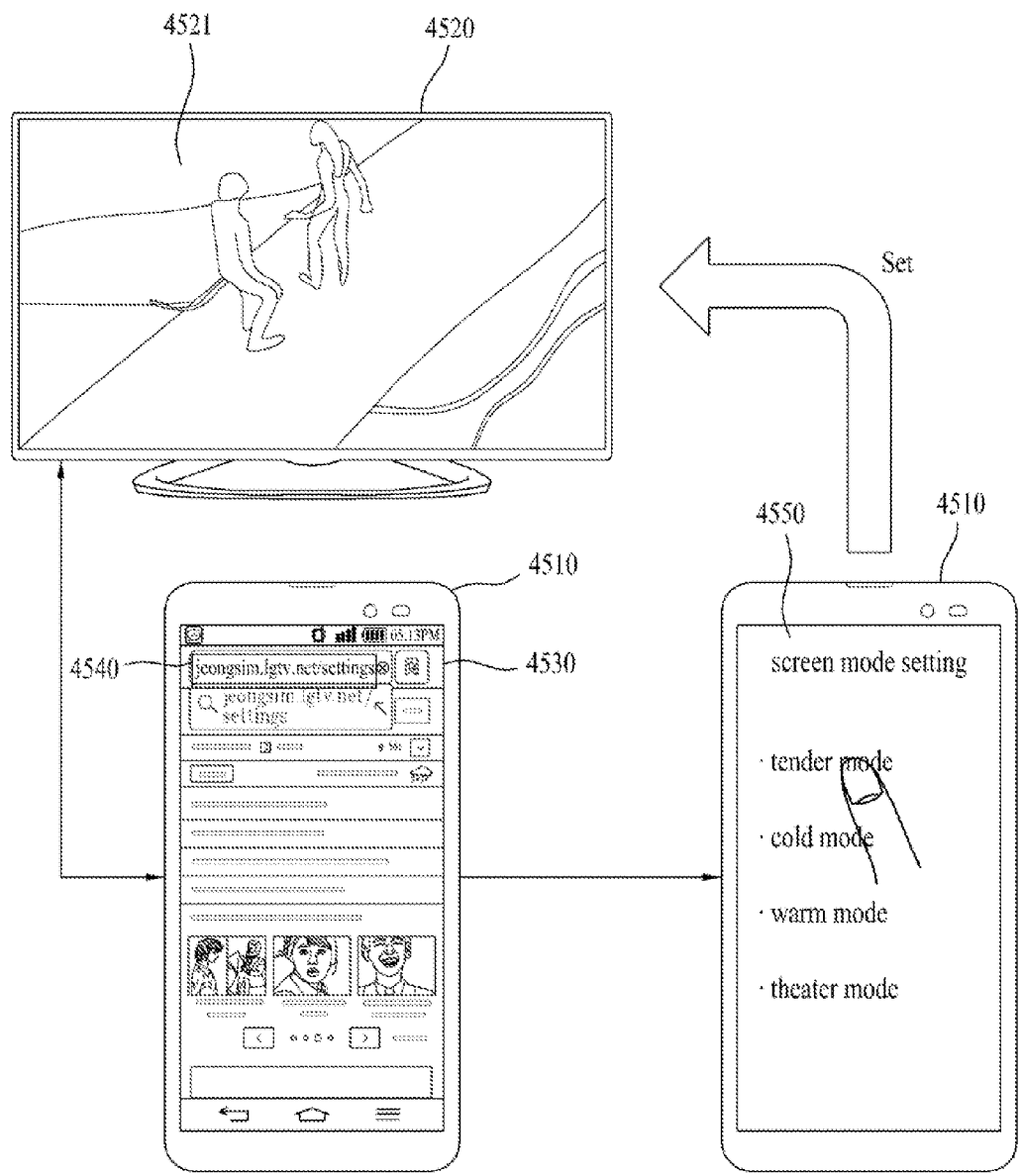
FIG. 45 is a diagram illustrating a different example that a display device receives data of a setting application and displays a setting menu on a screen according to one embodiment of the present invention.

FIG. 45 is a diagram illustrating a different example that a display device receives data of a setting application and displays a setting menu on a screen according to one embodiment of the present invention. As shown in FIG. 45, while a user is watching a movie 4521 via a broadcast receiver 4520, if the user inputs a web address 4540 corresponding to a setting application included in the broadcast receiver 4520 via a web browser 4530 of a display device 4510, a controller of the display device 4510 according to one embodiment of the present invention can control at least one or more predetermined setting menus 4550, which are optimized for the movie 4521 displayed on the broadcast receiver 4520, to be displayed on a screen of the display device.

If the user inputs a signal configured to change a specific setting value using the setting menus 4550, the controller can control a signal configured to change a setting value of the broadcast receiver 4520 to be transmitted to the broadcast receiver based on the signal. When designing a broadcast receiver and a display device as mentioned in the foregoing description, a user can obtain a setting menu optimized for content displayed on the broadcast receiver while watching the content via the broadcast receiver. By doing so, the user can easily and promptly change a setting value of the broadcast receiver.

Figure 46:
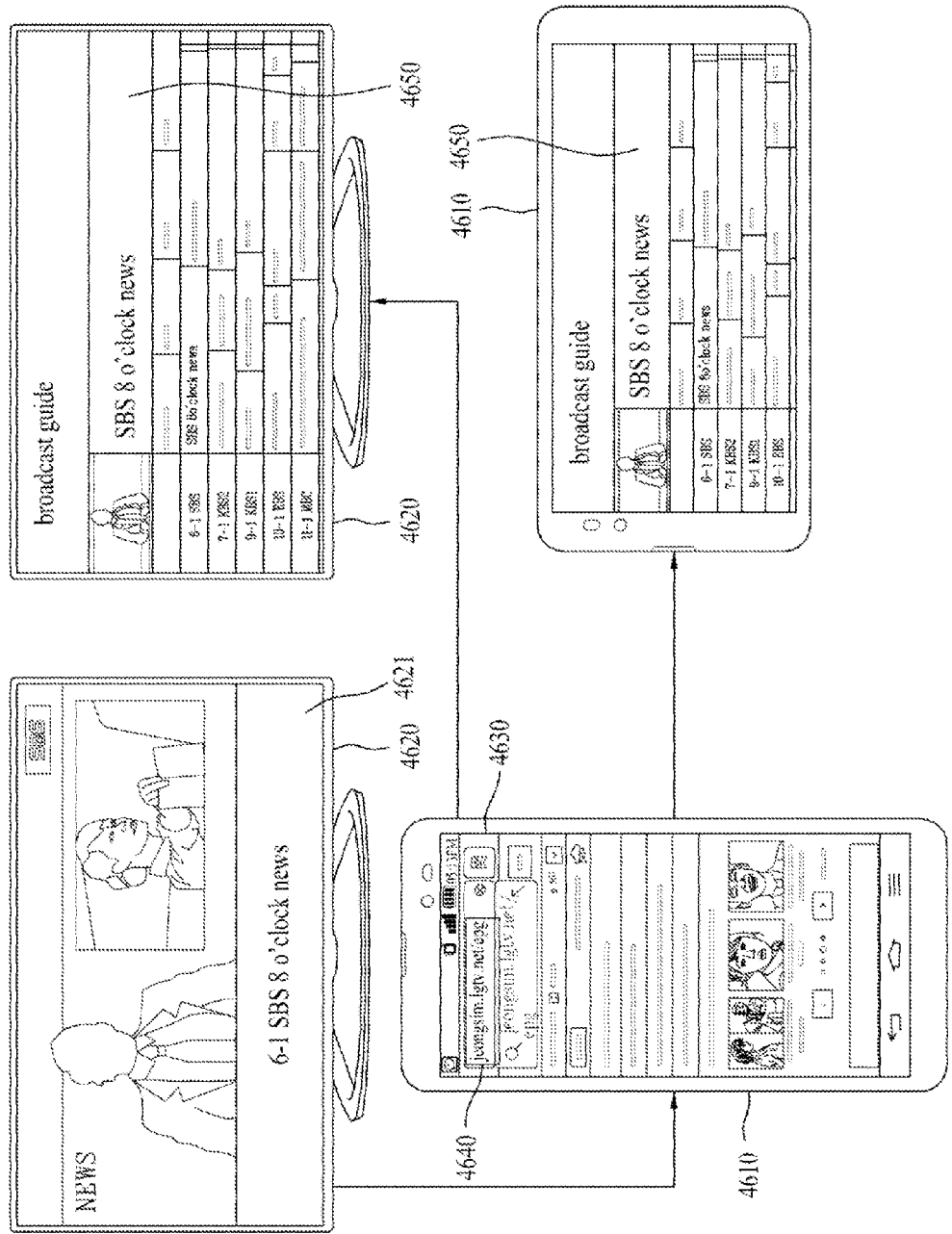
FIG. 46 is a diagram illustrating an example that a display device receives data of an EPG application and displays an EPG on a screen according to one embodiment of the present invention.

FIG. 46 is a diagram illustrating an example that a display device receives data of an EPG application and displays an EPG on a screen according to one embodiment of the present invention. As shown in FIG. 46, if a web address 4640 corresponding to an EPG application included in a broadcast receiver 4620 is input via a web browser 4630 of a display device 4610 while a real-time broadcast program is watched via the broadcast receiver 4620, a controller of the display device 4610 according to one embodiment of the present invention can control an EPG 4650 including the real-time broadcast program 4621 information displayed on the broadcast receiver 4620 to be displayed on a screen of the display device.

Or, if a user inputs a web address 4640 corresponding to an EPG application included in a broadcast receiver 4620 via a web browser 4630 of a display device 4610 while watching a real-time broadcast program 4621 via the broadcast receiver 4620, a controller of the display device transmits a signal, which is configured to make an EPG 4650 including the real-time broadcast program 4621 information displayed on the broadcast receiver 4620 to be displayed on a screen, to the broadcast receiver 4620 and can control the EPG 4650 to be displayed on the broadcast receiver 4620.

Figure 47:
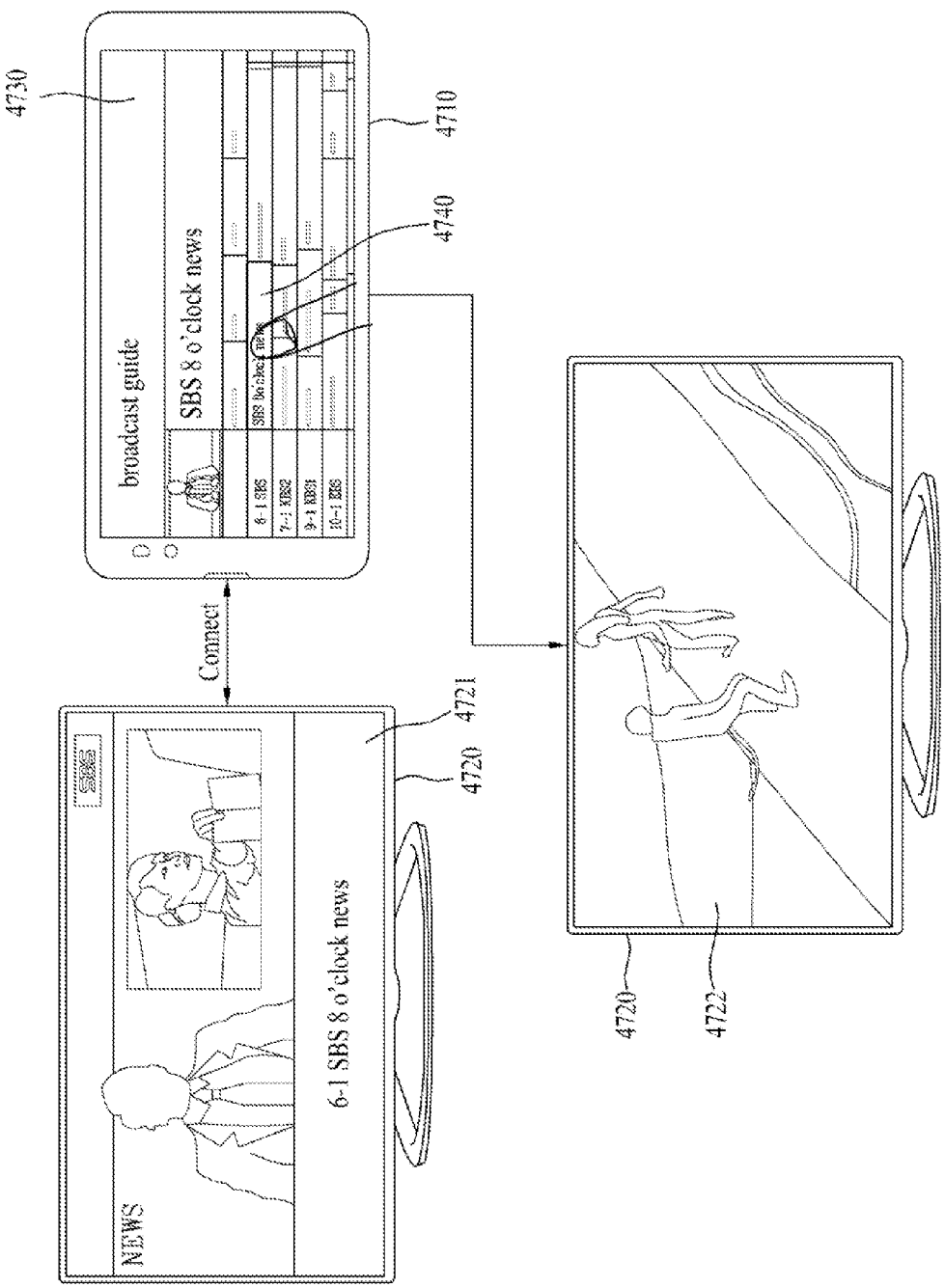
FIG. 47 is a diagram illustrating a different example that a display device receives data of an EPG application and displays an EPG on a screen according to one embodiment of the present invention.

FIG. 47 is a diagram illustrating a different example that a display device receives data of an EPG application and displays an EPG on a screen according to one embodiment of the present invention. FIG. 47 is a diagram illustrating a different example that a display device receives data of an EPG application and displays an EPG on a screen according to one embodiment of the present invention.

As shown in FIG. 47, if a user inputs a web address corresponding to an EPG application included in a broadcast receiver 4720 via a web browser 4730 of a display device 4710 while watching a real-time broadcast program 4721 of a first channel via the broadcast receiver 4720, a controller of the display device 4710 according to one embodiment of the present invention can control an EPG 4730 including information on the real-time broadcast program displayed on the broadcast receiver 4720 to be displayed on a screen of the display device. If a signal selecting a second channel icon 4740 included in the EPG 4730 is received, the controller can control a signal, which is configured to make the broadcast receiver 4720 display a real-time broadcast program 4722 of a second channel, to be transmitted to the broadcast receiver 4720. The broadcast receiver 4720 receives the signal and may be then able to display the real-time broadcast program 4722 of the second channel on a screen of the broadcast receiver.

Figure 48:
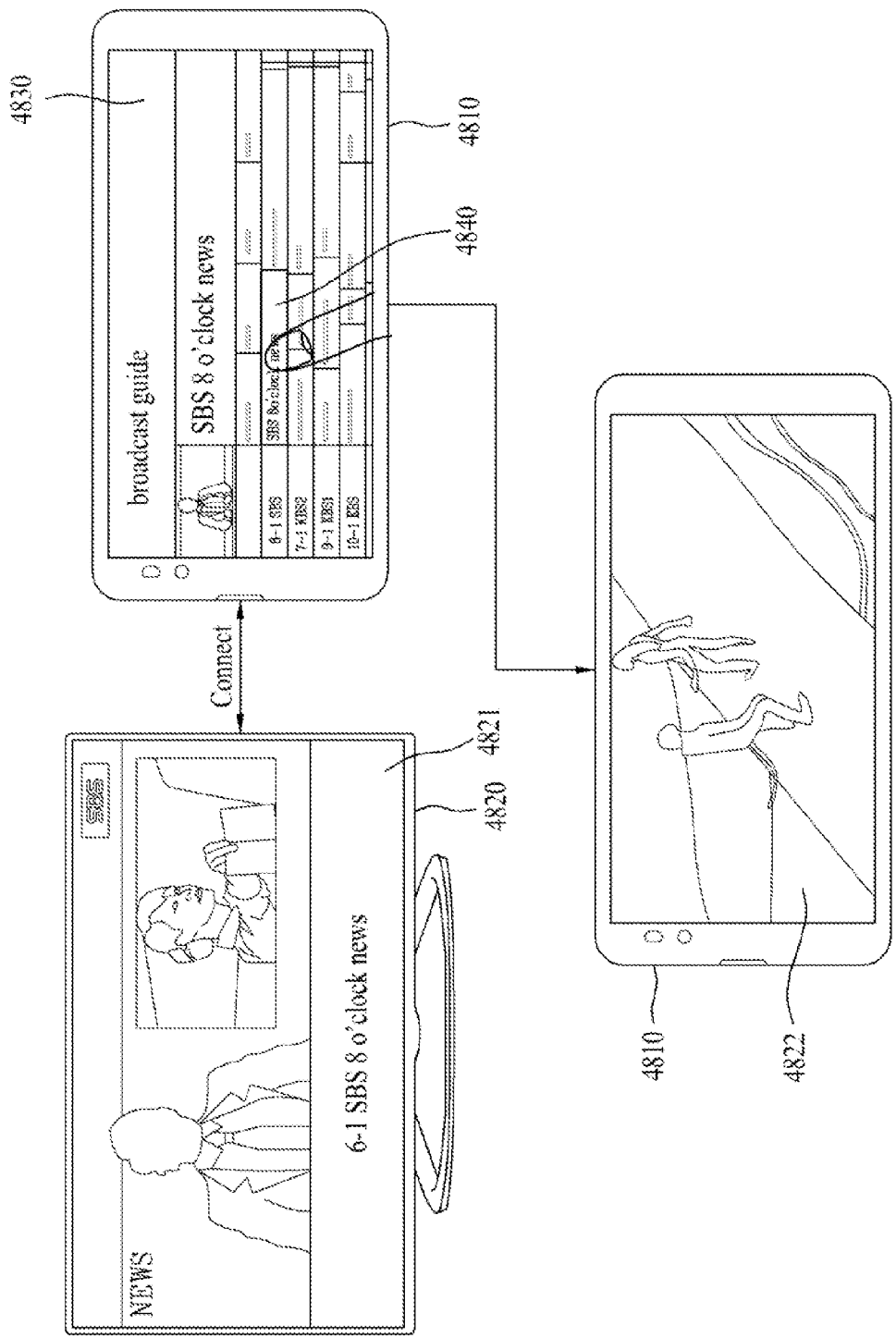
FIG. 48 is a diagram illustrating a further different example that a display device receives data of an EPG application and displays an EPG on a screen according to one embodiment of the present invention.

FIG. 48 is a diagram illustrating a further different example that a display device receives data of an EPG application and displays an EPG on a screen according to one embodiment of the present invention. As shown in FIG. 48, if a user inputs a web address corresponding to an EPG application included in a broadcast receiver 4820 via a web browser 4830 of a display device 4810 while watching a real-time broadcast program 4821 of a first channel via the broadcast receiver 4820, a controller of the display device 4810 according to one embodiment of the present invention can control an EPG 4830 including information on the real-time broadcast program 4821 of the first channel displayed on the broadcast receiver 4820 to be displayed on a screen of the display device. If a signal selecting a second channel icon 4840 included in the EPG 4830 is received, the controller can control a real-time broadcast program 4822 of a second channel to be displayed on a screen of the broadcast receiver.

Figure 49:
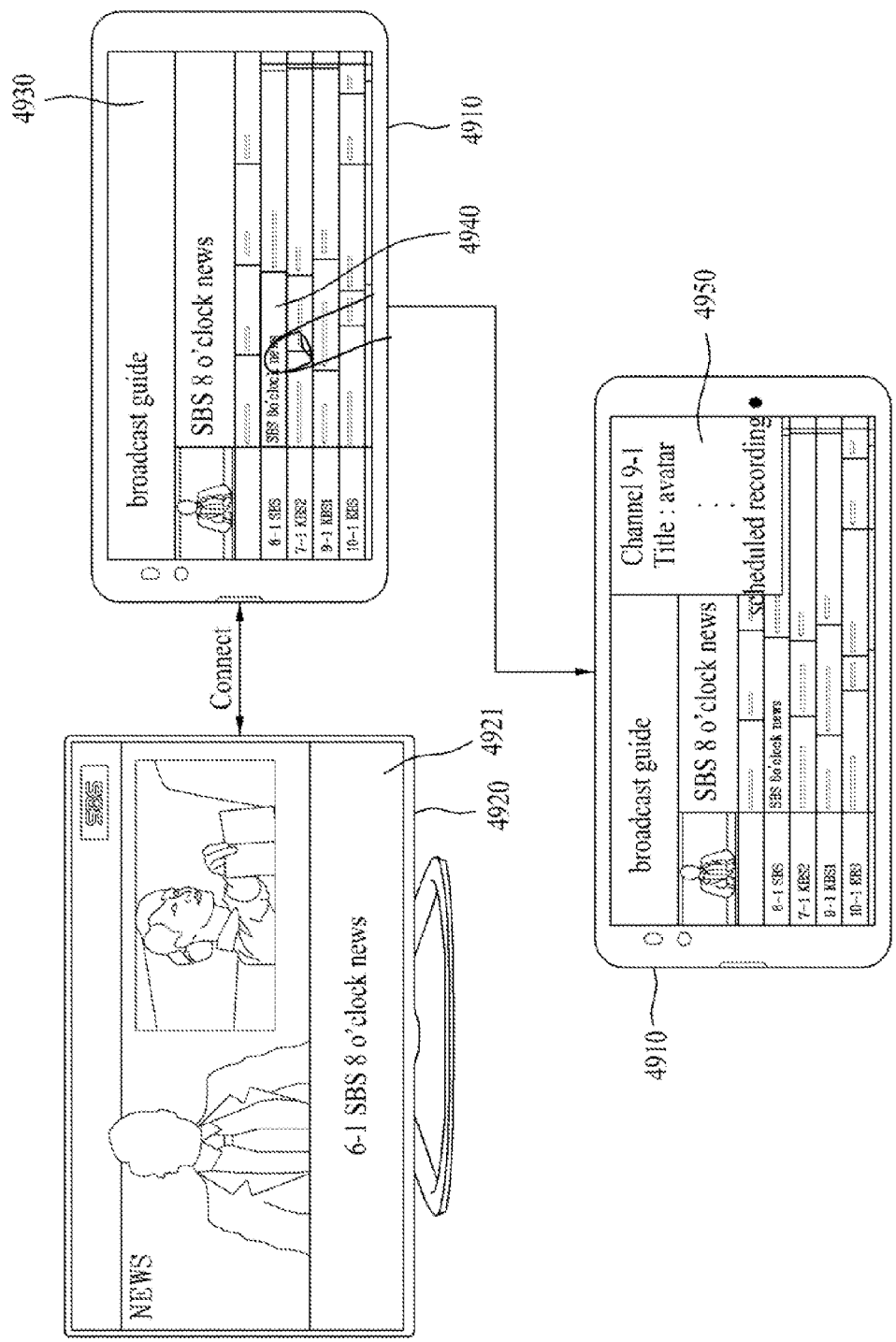
FIG. 49 is a diagram illustrating an example that a display device performs a scheduled recording using an EPG according to one embodiment of the present invention.

FIG. 49 is a diagram illustrating an example that a display device performs a scheduled recording using an EPG according to one embodiment of the present invention. As shown in FIG. 49, if a user inputs a web address corresponding to an EPG application included in a broadcast receiver 4920 via a web browser 4930 of a display device 4910 while watching a real-time broadcast program 4921 of a first channel via the broadcast receiver 4920, a controller of the display device 4910 according to one embodiment of the present invention can control an EPG 4930 including information on the real-time broadcast program of the first channel displayed on the broadcast receiver 4920 to be displayed on a screen of the display device. If a signal selecting a second channel icon 4940 included in the EPG 4930 is received, the controller can control a scheduled recording menu 4950 of a real-time broadcast program 4922 of a second channel to be displayed on the screen of the display device.

Figure 50:
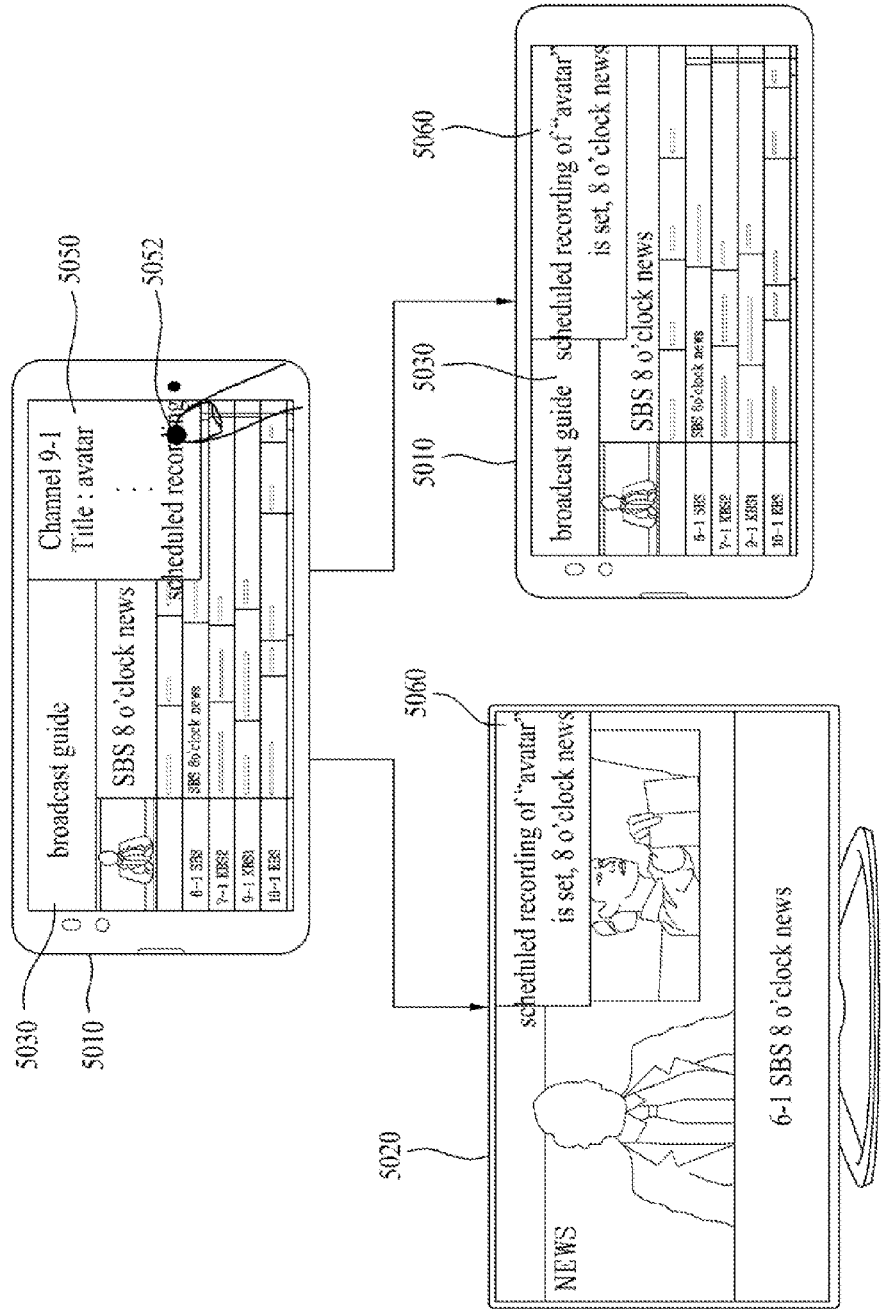
FIG. 50 is a diagram illustrating a different example that a display device performs a scheduled recording using an EPG according to one embodiment of the present invention.

FIG. 50 is a diagram illustrating a different example that a display device performs a scheduled recording using an EPG according to one embodiment of the present invention. As shown in FIG. 50, if a signal selecting a scheduled recording request icon 5052 included in a scheduled recording menu 5050 is received, a controller of a display device 5010 according to one embodiment of the present invention performs a scheduled recording based on channel information included in an EPG 5030 and can control a message 5060 to be displayed on an area of a screen of a broadcast receiver 5020 or an area of a screen of the display device to indicate that the scheduled recording is requested.

Figure 51:
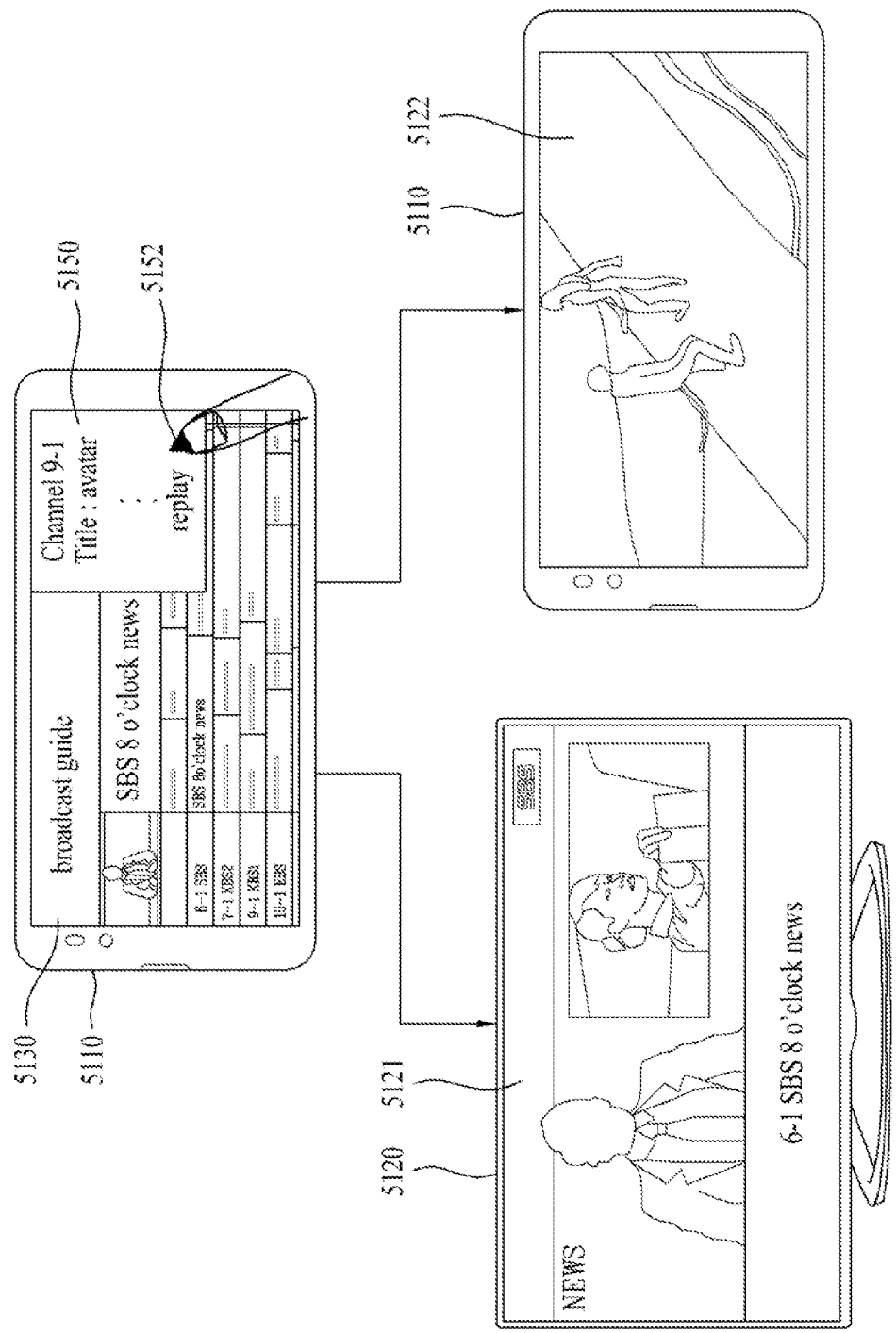
FIG. 51 is a diagram illustrating a different example that a display device performs a replay service using an EPG according to one embodiment of the present invention.

FIG. 51 is a diagram illustrating a different example that a display device performs a replay service using an EPG according to one embodiment of the present invention. As shown in FIG. 51, if a user inputs a web address corresponding to an EPG application included in a broadcast receiver 5120 via a web browser 5130 of a display device 5110 while watching a real-time broadcast program 5121 of a first channel via the broadcast receiver 5120, a controller of the display device 5110 according to one embodiment of the present invention can control an EPG 5130 including information on the real-time broadcast program of the first channel displayed on the broadcast receiver 5120 to be displayed on a screen of the display device. If a signal selecting a second channel icon included in the EPG 5130 is received, the controller can control a replay service menu 5150 of an old broadcast program 5122 of a second channel to be displayed on the screen of the display device. If a signal selecting a replay request icon 5152 included in the replay service menu 5150 is received, the controller of the display device 5110 according to one embodiment of the present invention can control the old broadcast program 5122 of the second channel to be displayed on the screen of the display device based on channel information included in the EPG 5130. By doing so, a user can use a replay service of the broadcast receiver 5120 as it is by the display device 5110 such as a smartphone or the like.

Figure 52:
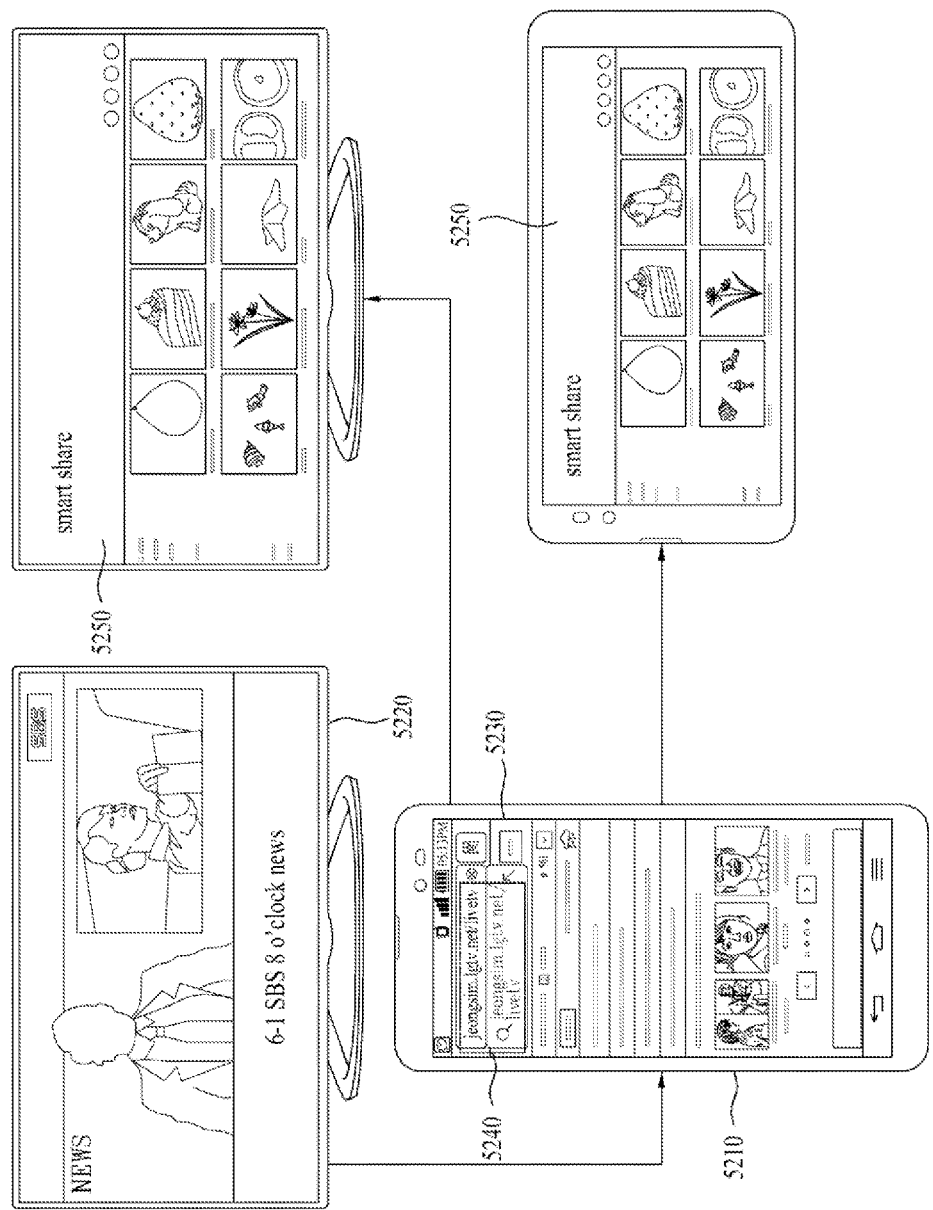
FIG. 52 is a diagram illustrating an example that a display device receives data of a smart share application and displays smart share contents on a screen according to one embodiment of the present invention.

FIG. 52 is a diagram illustrating an example that a display device receives data of a smart share application and displays smart share contents on a screen according to one embodiment of the present invention. As shown in FIG. 52, if a user inputs a web address 5240 corresponding to a smart share application included in a broadcast receiver 5220 via a web browser 5230 of a display device 5210, a controller of the display device 5210 according to one embodiment of the present invention receives data of the smart share application from the broadcast receiver 5220 and can control smart share content to be displayed on a screen of the display device. Or, the controller can control a signal, which is configured to make the broadcast receiver 5220 display the smart share content 5250 on a screen of the broadcast receiver, to be transmitted to the broadcast receiver 5220. The smart share application may correspond to an application configured to make such a multimedia content as a picture, a video and the like included in the broadcast receiver to be watched by an external device connected with the broadcast receiver.

Figure 53:
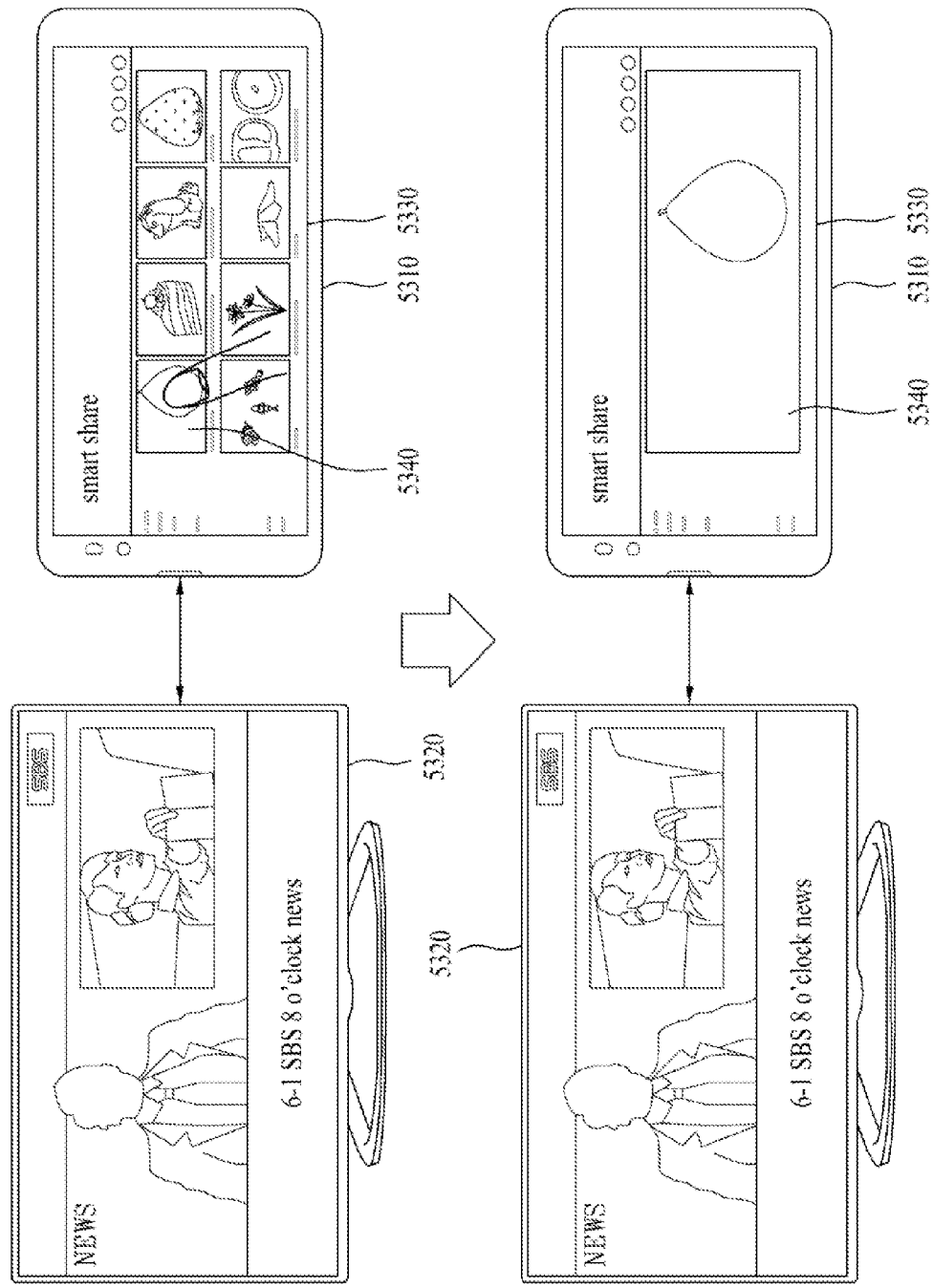
FIG. 53 is a diagram illustrating a different example that a display device receives data of a smart share application and displays smart share contents on a screen according to one embodiment of the present invention.

FIG. 53 is a diagram illustrating a different example that a display device receives data of a smart share application and displays smart share contents on a screen according to one embodiment of the present invention. As shown in FIG. 53, if a signal selecting a picture 5340 included in a smart share content 5330 is received, a controller of a display device 5310 according to one embodiment of the present invention receives data of the picture 5340 from a broadcast receiver 5320 and can control the picture 5340 to be displayed on a screen of the display device. Although it is not depicted in FIG. 53, if a signal selecting a picture 5340 included in a smart share content 5330 is received, a controller of a display device 5310 according to one embodiment of the present invention can transmit a signal, which is configured to make the broadcast receiver 5320 display the picture 5340, to the broadcast receiver 5320.

Figure 54:
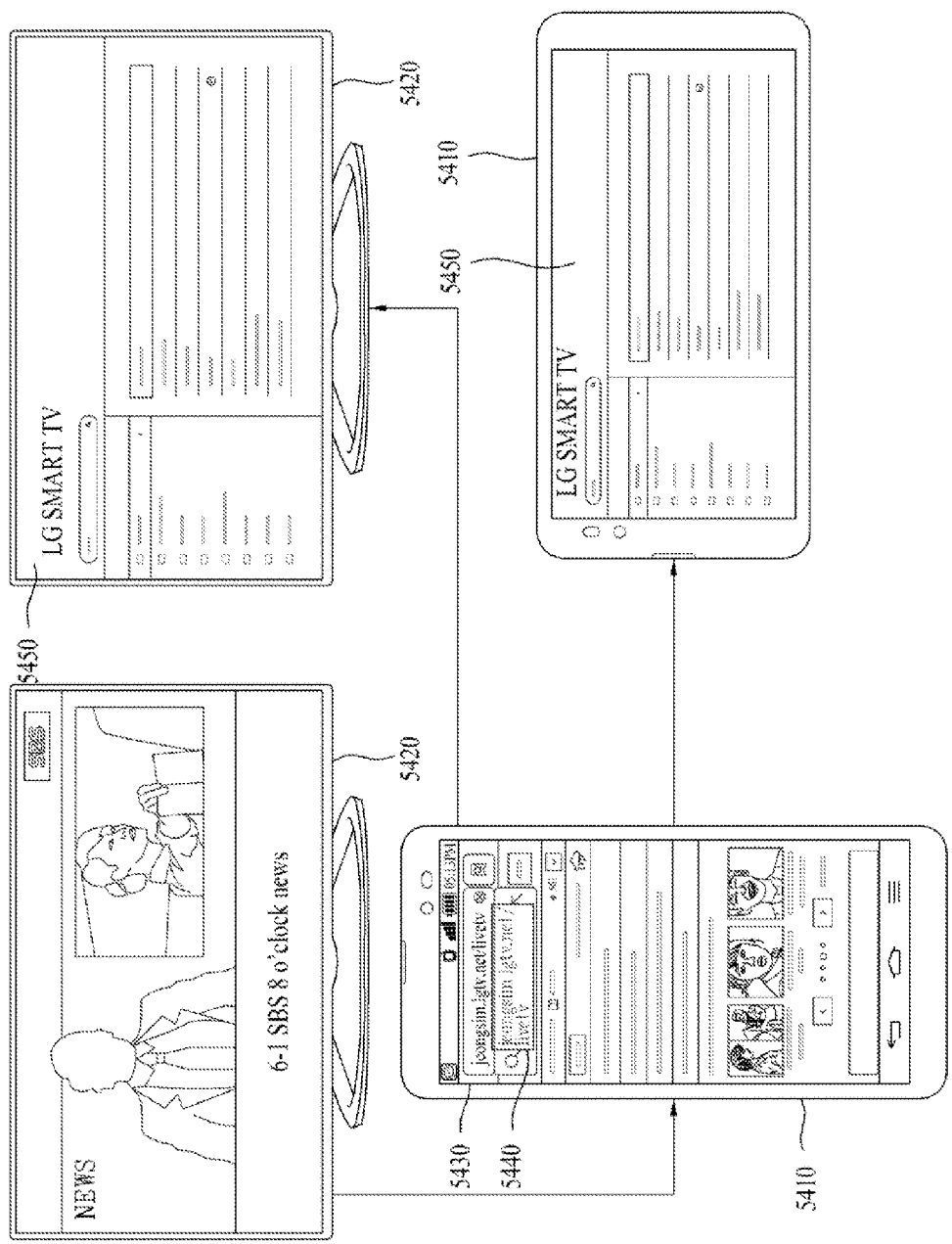
FIG. 54 is a diagram illustrating an example that a display device receives data of a user manual setting application and displays a user manual setting menu on a screen according to one embodiment of the present invention.

FIG. 54 is a diagram illustrating an example that a display device receives data of a user manual setting application and displays a user manual setting menu on a screen according to one embodiment of the present invention. As shown in FIG. 54, if a user inputs a web address 5440 corresponding to a user manual setting application included in a broadcast receiver 5420 via a web browser 5430 of a display device 5410, a controller of the display device 5410 according to one embodiment of the present invention receives data of the user manual setting application from the broadcast receiver 5420 and can control a user manual setting menu 5450 to be displayed on a screen of the display device. Or, the controller can control a signal, which is configured to make the broadcast receiver 5420 display the user manual setting menu 5450 on a screen of the broadcast receiver, to be transmitted to the broadcast receiver 5420. The user manual setting application may correspond to an application configured to control an operation method of a broadcast receiver, a controlling device, a recording function, a basic configuration, connection with an external device, a search function, a manual and the like.

Figure 55:
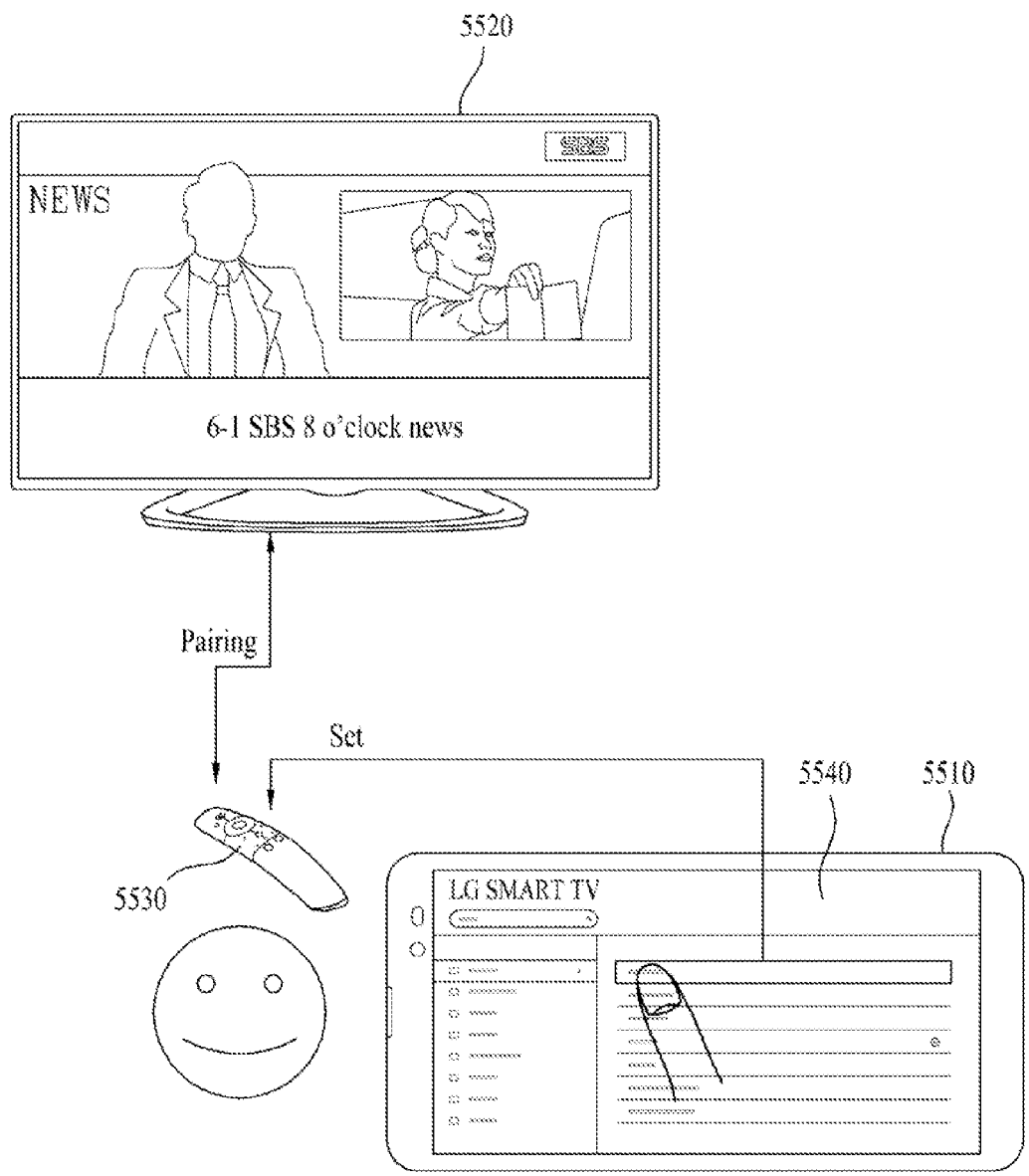
FIG. 55 is a diagram illustrating a different example that a display device receives data of a user manual setting application and displays a user manual setting menu on a screen according to one embodiment of the present invention.

FIG. 55 is a diagram illustrating a different example that a display device receives data of a user manual setting application and displays a user manual setting menu on a screen according to one embodiment of the present invention. As shown in FIG. 55, a user loads a user manual setting menu 5540 of a broadcast receiver 5520 by such a display device 5510 as a smartphone and can change a setting value of a remote controller 5530 paired with the broadcast receiver 5520.

Figure 56:
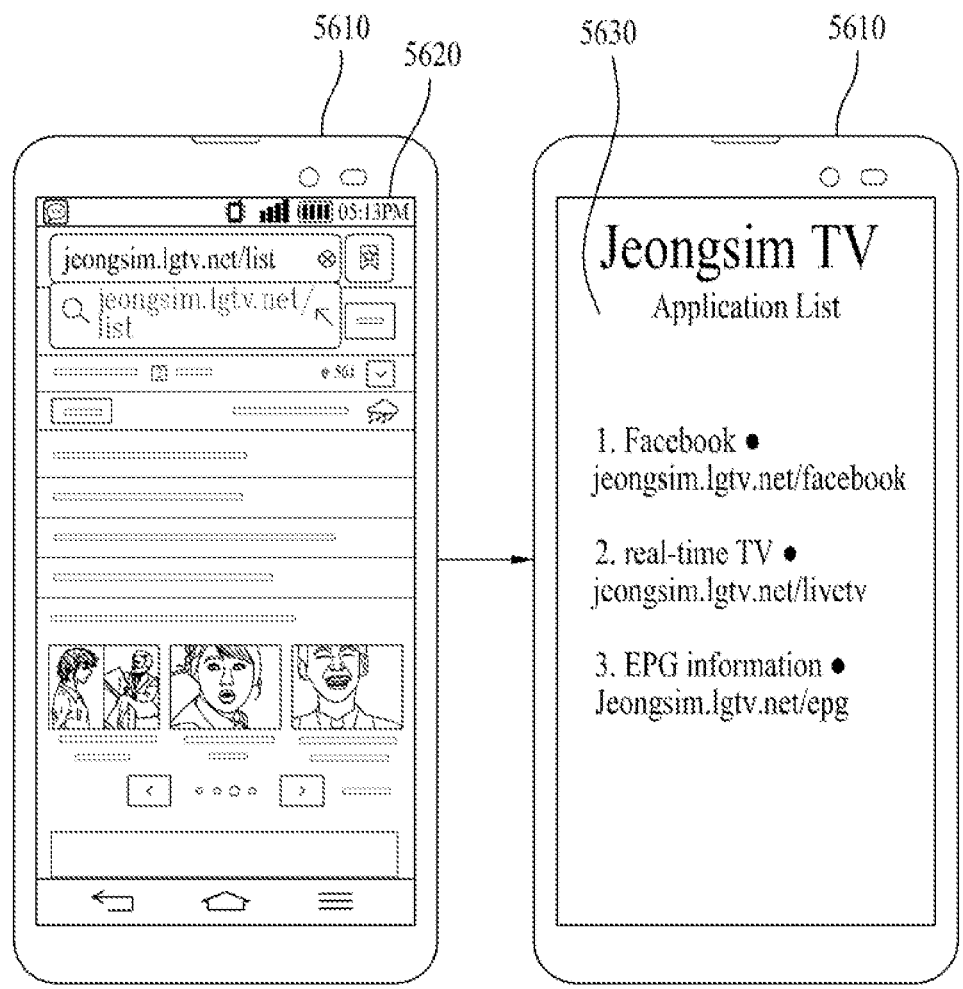
FIG. 56 is a diagram illustrating an example that a display device obtains a web address list of an application included in a broadcast receiver according to one embodiment of the present invention.

FIG. 56 is a diagram illustrating an example that a display device obtains a web address list of an application included in a broadcast receiver according to one embodiment of the present invention. As shown in FIG. 56, a user of a display device 5610 according to one embodiment of the present invention can display a web address list 5630 of at least one or more applications included in a broadcast receiver of a specific user on a screen of the display device using a web browser 5620 included in the display device 5610. If a signal selecting a specific web address from the web address list 5630 of the application is received, a controller of the display device 5610 according to one embodiment of the present invention receives data of an application corresponding to the specific web address from the broadcast receiver and can control content to be displayed on a screen of the display device.

Figure 57:
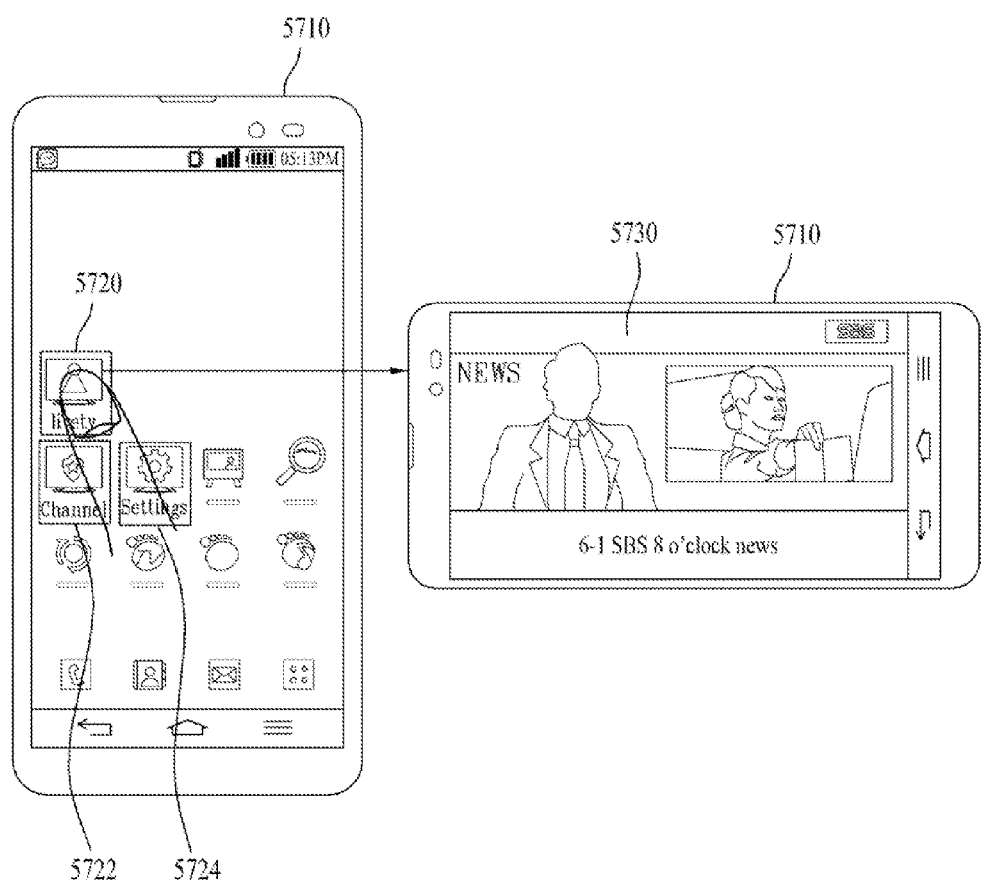
FIG. 57 is a diagram illustrating an example that a display device arranges a broadcast receiver application icon on a home screen according to one embodiment of the present invention.

FIG. 57 is a diagram illustrating an example that a display device arranges a broadcast receiver application icon on a home screen according to one embodiment of the present invention. As shown in FIG. 57, a controller of a display device 5710 according to one embodiment of the present invention can control icons 5720/5722/5724, which are configured to make applications included in a broadcast receiver to be displayed on a screen of the display device, to be arranged on a home screen. A size and a background image of the icons 5720/5722/5724 can be differently generated to distinguish the icons from icons of applications included in the display device 5710. A user can execute an application of the broadcast receiver on the display device 5710 by selecting the icons 5720/5722/5724.

For instance, if a user selects an icon 5720 of a real-time broadcast program application included in the broadcast receiver, the controller of the display device according to one embodiment of the present invention receives data of the real-time broadcast program application from the broadcast receiver using a web address connected with the icon 5720 and can control a real-time broadcast program 5730 to be displayed on a screen of the display device. When designing a broadcast receiver and a display device as mentioned in the foregoing description, a user can conveniently use applications included in a plurality of devices using a single display device.

Figure 58:
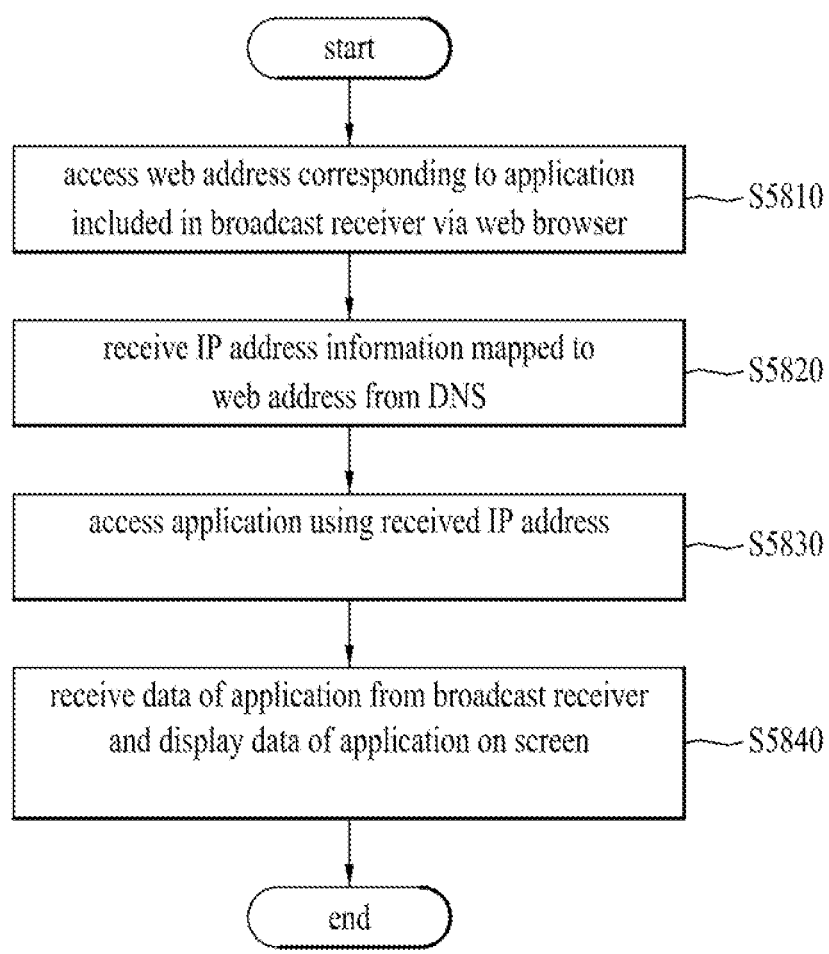
FIG. 58 is a flowchart for a different method of controlling a display device according to one embodiment of the present invention.

FIG. 58 is a flowchart for a different method of controlling a display device according to one embodiment of the present invention. As shown in FIG. 58, a method of controlling a display device according to one embodiment of the present invention can include the steps of accessing a web address corresponding to an application included in a broadcast receiver using a web browser (S5810), receiving IP address information mapped to the web address from a DNS (S5820), accessing the application using the received IP address (S5830) and displaying data of the application by receiving the data of the application from the broadcast receiver (S5840). Since detail explanation on each step is identical to what is mentioned earlier, overlapped explanation is omitted at this time.

According to one embodiment, the present invention increases user convenience by accessing a broadcast receiver using a web browser. According to a different embodiment, the present invention allows a user to easily and promptly access each application using a web browser by assigning web addresses according to a plurality of applications included in a broadcast receiver. According to a further embodiment, the present invention defines a solution that enables a user to control a broadcast receiver via a display device by accessing the broadcast receiver using a web browser and directly communicating with the broadcasting receiver.

For clarity of explanation, each diagram is explained by being divided. Yet, it is possible to design a new embodiment to implement the new embodiment by combining the embodiments, which are described in each of the diagrams. A display device and a method of controlling therefor may not limitedly apply to the composition and method of the aforementioned embodiments. The aforementioned embodiments may be configured by being selectively combined the whole of the embodiments or a part of the embodiments to achieve various modifications.

While the present invention has been described and illustrated herein with reference to the preferred embodiments and diagrams thereof, the present invention may be non-limited to the aforementioned embodiments and it will be apparent to those skilled in the art that various modifications and variations can be made therein without departing from the spirit and scope of the present invention. Thus, it is intended that the present invention covers the modifications and variations of this invention that come within the scope of the appended claims and their equivalents. Further, both an apparatus invention and a method invention are explained in the present specification and the explanation on both of the inventions can be complementally applied, if necessary.

What is claimed is:

1. A method of controlling a display device accessing a broadcast receiver via a web browser, the method comprising:
   accessing a web address corresponding to an application contained in the broadcast receiver via the web browser;
   receiving IP (internet protocol) address information mapped to the web address from a DNS (domain name server);
   accessing the application of the broadcast receiver using the received IP address;
   receiving data of the application from the accessed broadcast receiver; and
   displaying content of the application on a screen of the display device based on the received data of the application,
   wherein the DNS stores a MAC address, a web address and an IP address of the broadcast receiver by mapping the MAC address, the web address and the IP address to each other, and
   wherein, if a transmission request signal of an IP address corresponding to the web address is received, the DNS receives the IP address of the broadcast receiver from a DHCP (dynamic host configuration protocol) server and transmits the IP address of the broadcast receiver to the display device.

2. The method of claim 1, wherein the web address is automatically generated based on a user name set to the broadcast receiver.

3. The method of claim 1, wherein the DNS updates the IP address of the broadcast receiver by receiving the IP address of the broadcast receiver from the DHCP server with a predetermined interval.

4. The method of claim 1, further comprising:
   displaying the screen on the display device to be identical to a screen displayed on the broadcast receiver based on the data of the received content.

5. The method of claim 1, wherein the displayed data is reprocessed based on a size of the screen of the display device.

6. The method of claim 1, further comprising:
   checking a power mode of the broadcast receiver; and
   if the power mode of the broadcast receiver corresponds to an off mode, displaying a message on a screen of the display device to indicate that data communication with the broadcast receiver is not available.

7. The method of claim 1, further comprising:
   checking a power mode of the broadcast receiver; and
   if the power mode of the broadcast receiver corresponds to a sleep mode, transmitting a signal configured to change the power mode of the broadcast receiver to an on mode using a WOL (wake-on-lan) scheme, to the broadcast receiver,
   wherein the sleep mode corresponds to a mode configured to make the broadcast receiver perform data communication with an external device in a stand-by state.

8. A display device, comprising:
   a user interface unit configured to receive an input signal from a user;
   a broadcast service module configured to receive a broadcast signal;
   a communication module configured to perform data communication with a server and a broadcast receiver;
   a memory configured to store a plurality of web address information; and
   a controller configured to:
   access a web address corresponding to an application contained in the broadcast receiver via a web browser,
   receive an IP (internet protocol) address information mapped to the web address from a DNS (domain name server),
   access the application using the received IP address,
   receive data of the application from the accessed broadcast receiver, and
   display content of the application on a screen of the display device based on the received data of the application,
   wherein the DNS stores a MAC address, a web address and an IP address of the broadcast receiver and a web address and an IP address of the application by mapping the MAC address, the web address and the IP address of the broadcast receiver to the web address and the IP address of the application, and wherein the DNS updates the IP address of the broadcast receiver and the IP address of the application by receiving the IP address of the broadcast receiver and the IP address of the application from a DHCP (dynamic host configuration protocol) server with a predetermined interval.

9. The display device of claim 8, wherein the application comprises a real-time broadcast program application, a channel information application, an EPG (electronic program guide) application, a setting application and a user manual setting application.

10. The display device of claim 8, wherein the application is generated using a web language containing Java script, a HTML (hypertext markup language) and CSS (cascading style sheets).

11. The display device of claim 8, wherein the controller is further configured to display the screen to be identical to a screen of the broadcast receiver on which the application is displayed based on the data of the received application.

12. The display device of claim 8, wherein if the data of the application is received from the broadcast receiver and displayed on the screen of the display device, the controller is further configured to display a window containing a control menu on the screen of the display device.

13. The display device of claim 8, wherein if the broadcast receiver displays a real-time broadcast program and the application corresponds to a channel information application, the controller is further configured to display a channel list containing channel information of the real-time broadcast program on the screen of the display device.

14. The display device of claim 13, wherein if a specific channel is selected from the channel list, the controller is further configured to display a real-time broadcast program corresponding to the specific channel on the broadcast receiver.

15. The display device of claim 8, wherein the controller is further configured to display an application list containing at least one or more application information contained in the broadcast receiver on the screen of the display device.

16. The display device of claim 15, wherein the controller is further configured to:
   receive a signal selecting a specific application from the application list,
   receive data of the selected specific application, and
   display the received data on the screen of the display device.

* * * * *